US012605695B2

(12) United States Patent
Kimani et al.

(10) Patent No.: US 12,605,695 B2
(45) Date of Patent: Apr. 21, 2026

(54) MOLECULARLY IMPRINTED FLUORESCENT POLYMERS FOR DIRECT DETECTION OF GLYPHOSATE, ITS DEGRADATION PRODUCTS, AND METABOLITES

(71) Applicant: Bundesrepublik Deutschland, vertreten durch den Bundesminister für Wirtschaft und Energie, dieser, Berlin (DE)

(72) Inventors: Martha Wamaitha Kimani, Berlin (DE); Kornelia Gawlitza, Berlin (DE); Knut Rurack, Berlin (DE); Virginia Valderrey Berciano, Berlin (DE); Victor Pérez Padilla, Berlin (DE)

(73) Assignee: Bundesrepublik Deutschland, vertreten durch den Bundesminister für Wirtschaft und Energie, dieser vertreten durch den Präsidenten der Bundesanstalt für Materialforschung und -prüfung, (BAM), Berlin (DE)

( * ) Notice: Subject to any disclaimer, the term of this patent is extended or adjusted under 35 U.S.C. 154(b) by 495 days.

(21) Appl. No.: 18/265,831

(22) PCT Filed: Nov. 25, 2021

(86) PCT No.: PCT/EP2021/083008
§ 371 (c)(1),
(2) Date: Jun. 7, 2023

(87) PCT Pub. No.: WO2022/122399
PCT Pub. Date: Jun. 16, 2022

(65) Prior Publication Data
US 2024/0066500 A1 Feb. 29, 2024

(30) Foreign Application Priority Data
Dec. 7, 2020 (DE) ......................... 102020132480.4

(51) Int. Cl.
*B01J 20/26* (2006.01)
*B01D 15/38* (2006.01)
(Continued)

(52) U.S. Cl.
CPC ........ *B01J 20/268* (2013.01); *B01D 15/3852* (2013.01); *B01J 20/103* (2013.01);
(Continued)

(58) Field of Classification Search
CPC ... B01D 15/3852; B01J 20/103; B01J 20/268; B01J 20/28007; B01J 20/28011;
(Continued)

(56) References Cited

U.S. PATENT DOCUMENTS

2020/0239768 A1* 7/2020 Lee .................... G01N 21/6428

FOREIGN PATENT DOCUMENTS

WO WO-2018212716 A1 * 11/2018 ............ C08F 220/56

* cited by examiner

*Primary Examiner* — Jennifer Wecker
(74) *Attorney, Agent, or Firm* — Bachman & LaPointe, P.C.

(57) ABSTRACT

A layer structure having a solid substrate having a surface, the surface carrying a layer including a molecularly imprinted polymer, wherein the molecularly imprinted polymer is adapted to bind a glyphosate analyte, wherein the glyphosate analyte is selected from glyphosate, a glyphosate degradation product, a metabolite of glyphosate or a metabolite of the degradation product of glyphosate, wherein a fluorescence characteristic of the molecularly imprinted polymer changes upon binding of the glyphosate analyte. Further, a method for detecting a glyphosate analyte in a sample includes: providing the layer structure having the molecularly imprinted polymer; providing a fluidic contact of the layer structure with the sample or an organic extract of the sample; measuring a fluorescence property of (Continued)

the layer structure; and estimating a concentration of glyphosate or of the glyphosate related analyte at least semi-quantitatively.

18 Claims, 20 Drawing Sheets

(51) Int. Cl.
*B01J 20/10* (2006.01)
*B01J 20/28* (2006.01)
*B01J 20/285* (2006.01)
*C09K 11/06* (2006.01)
*G01N 21/64* (2006.01)

(52) U.S. Cl.
CPC ... *B01J 20/28007* (2013.01); *B01J 20/28011* (2013.01); *B01J 20/28016* (2013.01); *B01J 20/285* (2013.01); *C09K 11/06* (2013.01); *G01N 21/6428* (2013.01); *C09K 2211/1466* (2013.01); *C09K 2211/1475* (2013.01)

(58) Field of Classification Search
CPC ............ B01J 20/28016; B01J 20/28097; B01J 20/285; B01J 20/3204; B01J 20/3282; B01J 20/3293; B01J 2220/49; C09K 11/06; C09K 2211/1466; C09K 2211/1475; G01N 21/6428; G01N 31/22
See application file for complete search history.

I II III IV

I II III IV

MOLECULARLY IMPRINTED FLUORESCENT POLYMERS FOR DIRECT DETECTION OF GLYPHOSATE, ITS DEGRADATION PRODUCTS, AND METABOLITES

FIELD AND BACKGROUND

The present invention relates to detection of glyphosate. In particular, the present invention relates to the detection of glyphosate using a thin layer of molecularly imprinted polymers (MIPs) on a solid carrier substrate.

The detection of glyphosate (GPS) is challenging due to its high polarity and solubility in water, as well as the absence of any absorption or fluorescence. Commonly used multi-residue analysis methods such as QuEChERS (sample clean-up methods that are Quick, Easy, Cheap, Efficient, Rugged, Safe) are not well suited. The structural similarity of glyphosate and its degradation products and metabolites further complicate sensitive and selective detection.

Current methods of analysis involving the use of gas or liquid chromatography coupled to mass spectrometry or fluorescence detection after derivatization are instrumentally demanding (Okada et al., 2018). Molecularly imprinted polymers have been developed for preconcentration of glyphosate from samples before analysis by chromatographic techniques (Gomez-Caballero et al. 2016) or for direct gravimetric and/or electrochemical analysis (Mazouz et al. 2017). Fluorescent and magnetic nanoparticles (NPs) coupled to antibodies or single strand DNA have also been applied (Lee et al. 2013, Wang et al. 2016). In particular, Lee et al. use magnetic core/fluorescent shell NPs decorated with GPS-terminated DNA and antibodies coated onto a substrate in a competitive assay, whereas Wang et al. use magnetic NPs decorated with GPS and fluorescently labelled antibodies in a competitive assay. In one case, quantum dots were coated with silica coupled to calix[6]arene, and the uptake of glyphosate resulted in a fluorescence increase of the particles (Li et al. 2012). However, in Li et al. no MIPs are involved. Magnetic nanocomposites comprising $Fe_3O_4$-nanoparticles of around 56 nm with a MIP shell resulting in particles having an average size around 70 nm and their application on the recognition and separation of glyphosate have also been developed (Duan et al. 2017). The assay requires use of a redox mediator (hexacyanoferrate) for operation, and hence, is directed towards indirect glyphosate detection.

SUMMARY OF THE INVENTION

Against this background a layer structure is suggested, the layer structure comprises a solid substrate and a layer of a molecularly imprinted polymer (MIP) that is disposed on a surface of the solid substrate, wherein the MIP layer is adapted to bind glyphosate and/or a degradation product thereof and/or a metabolite thereof. Glyphosate and glyphosate degradation products as well as their metabolites which can be specifically bound by the MIP layer are herein collectively called glyphosate analytes. The layer structure is configured to change its optical characteristic, particularly its fluorescence upon binding of the glyphosate analyte to be detected by the molecularly imprinted polymer. Said glyphosate analyte(s) can be bound specifically by corresponding MIPs. Thus, according to preferred embodiments, by measuring a fluorescence property of the layer structure or its change over time in contact with a solution (or an organic extract thereof) containing a glyphosate analyte, at least one of the questions can be answered, whether any glyphosate analyte, which type of, and/or how much thereof is present in a given sample. The intensity of the measured fluorescence signal allows for detecting qualitatively and at least semi-quantitatively glyphosate or its degradation products (e.g. metabolites) in an aqueous solution, e.g. in a surface water sample, or in an organic extract thereof, typically after a corresponding calibration of the equipment used.

According to an embodiment the solid substrate is selected from a nanoparticle and/or a microparticle, which is completely covered by the MIP, the corresponding particle serving as a core. As the MIP typically comprises a single thin layer which is evenly disposed on the outer surface of the particle and covers it completely, the resulting layer-on-substrate structure can be regarded as core/shell particle, with the MIP comprising a shell on a core particle. However, other layer architectures comprising the MIP on a planar substrate can be used as well.

According to an embodiment the solid substrate of the suggested layer structure comprises a planar or curved surface, e.g., a channel wall, an inner wall of a tube or capillary. The solid substrate can also encompass a recess, a slot, an open cavity, a groove, wherein at least a portion of their surface is covered with the MIP layer.

According to an embodiment a method for detecting a glyphosate analyte in a sample is suggested, wherein the method comprises: providing a layer structure as described herein; providing a fluidic contact of the layer structure with the sample or a liquid extract of the sample, particularly an organic extract of the sample; measuring a fluorescence property of the layer structure; and estimating the concentration of the glyphosate analyte in the sample at least semi-quantitatively.

According to an embodiment a molecularly imprinted polymer is suggested which comprises a fluorescence property that changes upon binding of a glyphosate analyte, wherein the fluorescence property is a characteristic of a fluorescent indicator within the molecularly imprinted polymer. The fluorescent indicator comprises a fluorescent unit F which is covalently linked via a polymerized binding site P to or within the molecularly imprinted polymer, or which is sterically entrapped within the molecularly imprinted polymer. The fluorescent indicator (or probe) further comprises a binding site R which is able to form at least one, typically two hydrogen bonds with the glyphosate analyte (e.g. it's oxoanion), and is able to change its fluorescence characteristic upon analyte binding.

According to an embodiment a sensor for detection of a glyphosate analyte is suggested. The sensor comprises at least a molecularly imprinted polymer comprising a fluorescent indicator or a layered structure, comprising the fluorescent indicator, wherein a fluorescence property of the molecularly imprinted polymer changes upon a binding of a glyphosate analyte. Thus, the molecularly imprinted polymer is adapted to change a fluorescence property depending on a concentration of a glyphosate analyte. Accordingly, the sensor may advantageously be set-up for detection and/or quantification of a glyphosate analyte or several glyphosate analytes.

According to an embodiment a method for producing a molecularly imprinted polymer is suggested. The method comprises polymerizing a mixture of a structural monomer, a structural crosslinker, a glyphosate analyte, a phase transfer catalyst comprising a tetrabutylphosphonium or a tetrahexylphosphonium cation, and a fluorescent indicator, wherein the fluorescent indicator comprises a polymerizable group (unit), a fluorescent entity (unit), a binding site (or receptor or functional unit R described further below), which is able to form at least one hydrogen bond with the glyphosate analyte (with an oxoanion thereof). Unit R thus provides a binding site for the analyte molecule. Upon binding the fluorescent indicator changes its fluorescence property.

Each embodiment described above may be combined with any other embodiment or embodiments unless clearly indicated to the contrary.

BRIEF DESCRIPTION OF THE DRAWINGS

A full and enabling disclosure of the present invention, including the best mode thereof, to one of ordinary skill in the art, is set forth more particularly in the remainder of the description, including reference to the accompanying figures.

Figure 1:
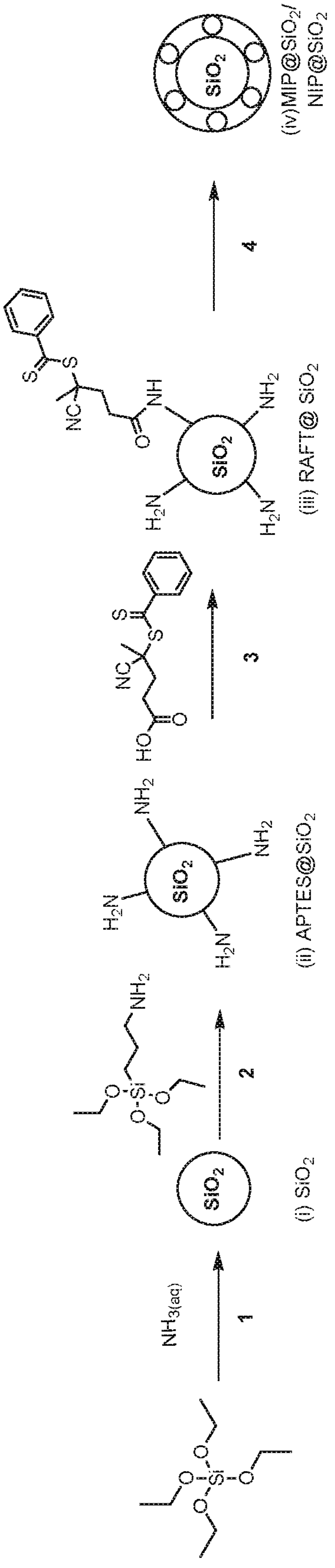
FIG. 1 is a schematic representation of the method for obtaining silica core/fluorescent MIP or NIP shell particles (MIP@$SiO_2$, NIP@$SiO_2$) according to example 1, 2 and 3: condensation and hydrolysis of TEOS for production of submicron silica particles (1), introduction of amino groups on silica surface (2), introduction of RAFT groups on silica surface (3), preparation of fluorescent imprinted polymer layer (4).

In the following detailed description, reference is made to the accompanying figures, which form a part hereof, and in which show by way of illustration specific embodiments and features of the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

DETAILED DESCRIPTION

As used in this description (above and below) and claims, the use of the word "a" or "an" when used in conjunction with the term "comprising" in the claims and/or the specification may mean "one", but it is also consistent with the meaning of "one or more", "at least one", and "one or more than one".

As used in this description (above and below) and claims, the use of the word "or" in the claims is used to mean "and/or" unless explicitly indicated to refer to alternatives only or the alternatives are mutually exclusive, although the disclosure supports a definition that refers to only alternatives and "and/or".

As used in this description (above and below) and claims, the used word "about" before a numerical value indicates a range of numerical values encompassing, i.e. including, a statistical deviation from the indicated numerical value by±5%.

As used in this description (above and below) and claims, the words "comprising" (and any form of comprising, such as "comprise" and "comprises"), "having" (and any form of having, such as "have" and "has"), "including" (and any form of including, such as "includes" and "include"), "containing" (and any form of containing, such as "contains" and "contain") or "encompassing" (and any form of encompassing, such as "encompass" and "encompasses") are inclusive or open-ended and do not exclude additional, unrecited elements or method steps.

As used in this description (above and below) and claims, a degradation product of glyphosate is considered to be generated as a result of physical and/or chemical environmental factors interacting with glyphosate or a glyphosate containing herbicide formulation as applied to a crop, a soil and/or any plant. These factors are measurable, e.g., as moisture, temperature, light intensity or, e.g., UV exposure.

As used in this description (above and below) and claims, a metabolite of glyphosate is considered to be generated by biochemical processes known from living organisms. Such comprise, e.g., microorganisms, plants, especially (cultivated) plants which are intentionally treated with glyphosate, algae in a soil or a water body as well as animals such as, e.g., annelids and arthropods or even fish having contact with herbicide formulations comprising glyphosate, with glyphosate, and/or glyphosate residues. Thus, a metabolite may comprise an intermediate or a final product of a biological activity of a living entity selected from a cell, a microorganism, a fungus, a plant, an alga, an archaeon, an animal or a human or a combination thereof.

Glyphosate analytes considered herein comprise glyphosate (GPS), methylphosphonic acid (MPA), aminomethylphosphonic acid (AMPA), 3-methylphosphinicopropionic acid (MPPA), butylphosphonic acid (BPA), N-methylglyphosate (MGPS), N-(phosphonomethyl)iminodiacetic acid (PMIDA), hydroxymethylphosphonic acid (HMPA), and bisphosphonomethylamine (BPMA) as shown in the schemes below.

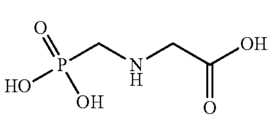

glyphosate
(GPS)

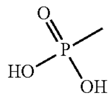

methylphosphonic
acid
(MPA)

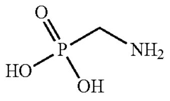

aminomethyl-
phosphonic acid
(AMPA)

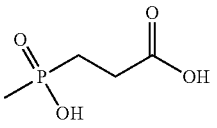

3-methylphosphonico-
propionic acid
(MPPA)

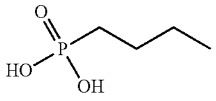

butylphosphonic
acid
(BPA)

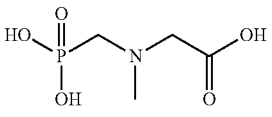

N-methylglyphosate
(MGPS)

-continued

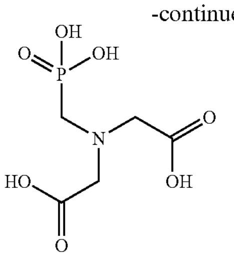

N-(phosphonomethyl) iminodiacetic acid (PMIDA)

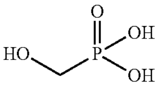

Hydroxymethyl-phosphonic acid (HMPA)

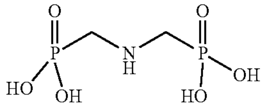

Bisphosphonomethyl-amine (BPMA)

As used in this description (above and below) and claims the substance glyphosate itself, its metabolites and its degradation products can alternatively be referred to as glyphosate residues, as the term pesticide residue is defined by the World Health Organization as any substance or mixture of substances resulting from the use of a pesticide and includes any specified derivatives, such as degradation and conversion products, metabolites, reaction products, and impurities that are considered to be of toxicological significance (cf. Encyclopedia of Food and Health, Elsevier Ltd. 2016; ISBN 978-0-12-384953-3; www.sciencedirect.com/topics/agricultural-and-biological-sciences/pesticide-residue). Thus, the subject of the present application may alternatively be described as the detection of glyphosate residues using a layer structure as described herein: a MIP coating of a solid substrate, e.g. a core/MIP-shell nano- or microparticle, a slide, a channel of a microfluidic system, or a well of a microtiter plate which is at least partially coated with a MIP-layer, wherein the MIP is a polymer which has been molecularly imprinted with the glyphosate analyte to be detected or a salt of the glyphosate analyte to be detected.

As used in this description (above and below) and claims, the term “nanoparticle” is to be understood as encompassing typically a solid body of spherical or nearly spherical shape having an arithmetically detectable mean diameter between 1 nm and 1000 nm. Typically, the nanoparticles as used in the present description and claims are selected from carbon nanodots (CNDs), spherical polystyrene (PS) particles, spherical silica ($SiO_2$) particles, and spherical polystyrene core/silica shell particles. The layered structure fabricated on any of these cores comprises said core and an analyte specific MIP layer. Thus, the molecularly imprinted polymer (MIP) layer can be considered as a thin organic shell which covers the core and, accordingly, the layered structure is a CND/MIP core/shell particle, a PS/MIP core/shell particle, a $SiO_2$/MIP core/shell particle or a PS/$SiO_2$/MIP core/shell particle.

The latter one might also be considered as polymer core/MIP shell particle comprising a structural inorganic layer ($SiO_2$) between the innermost polymer core and the outermost MIP shell.

As used in this description (above and below) and claims, the term “micro-particle” is to be understood as encompassing typically spherical objects, e.g. core/shell-particles having an arithmetically calculated median outer diameter between 1 μm and 10 μm. The outer diameter of nano- and microparticles can typically be detected by using, e.g., electron microscopy or light scattering techniques.

The term “structural inorganic layer ($SiO_2$)” as used herein designates a shell which covers the core and which comprises silica ($SiO_2$) nanoparticles formed, e.g. by hydrolysis, from a silicon containing precursor in a so-called sol-gel process.

Usually, the term “molecularly imprinted polymer” relates to polymer networks comprising quasi inorganic building blocks and/or organic polymers consisting of the elements carbon, oxygen, hydrogen, and possibly nitrogen, phosphorus, sulphur, and silicon which have been generated in the presence of a special molecular template. Purely inorganic MIPs do not really exist, except for the very first examples of ca. 100 years ago (which yet had not been termed “MIP” then), in which only tetraethyl orthosilicate (TEOS) was used so that the resulting polymer was only a $SiO_2$ polymer. Imprinted silicas today are “quasi-inorganic” MIPs because, at least up to now, always various organically modified silanes are used as monomer and/or crosslinker units.

For the sake of clarity, in the present description and claims molecularly imprinted silicas, referred to as MISs instead of MIPs, are not a subject of the present application. Against this background MIPs as used in this description, drawings, and claims will be understood to comprise only organic polymers which typically are prepared without any functional silanes. Generally, MIPs are highly cross-linked polymers which are prepared from monomers and cross-linkers in the presence of a target molecule serving as template. The organic polymers consist typically of chemical elements selected from C, H, O, N, S, and P. After removal of the template molecule, a specific three-dimensional recognition site, cavity, or ‘pocket’ that is complementary in size, shape, and specific interaction signature to the template molecule is retained in the polymer network. MIPs thus can combine strong affinity to the template molecule with high selectivity, mimicking natural receptors such as antibodies or substrate recognition sites of enzymes. However, especially the chemical and thermal stabilities make MIPs (and MISs) more suitable for many applications compared to their natural analogues. In addition, starting materials for MIPs (and MISs) are often abundant and considerably cheap and preparation times are on the order of days rather than weeks or months typically required for obtaining high-performance biological receptors. Various methods including radical polymerization, metathesis, and living polymerization such as reversible addition-fragmentation chain transfer (RAFT) and metal-catalyzed atom transfer radical polymerization (ATRP) have been adopted for MIP preparation and can be used here as well.

As used in this description (above and below) and claims, the terms “fluorescence”, “fluorescent”, “fluorescence measurement”, “fluorescent dye”, “fluorescent particle”, “fluorescent indicator”, “fluorescent probe”, “fluorescent monomer”, “fluorescent probe monomer”, “fluorescent indicator monomer”, “fluorescent crosslinker”, “fluorescent probe crosslinker”, “fluorescent indicator crosslinker” and any related thereto term is to be understood as comprising an optical property or its detection, e.g., an excitation wavelength, an emission wavelength, a fluorescence intensity, a fluorescence quantum yield, a fluorescence lifetime or decay, a fluorescence quenching or bleaching and/or a ratio of any of their values and its(their) detection. Especially fluorescent dyes, fluorescent indicators, fluorescent probes, fluorescent monomers, fluorescent probe monomers, fluorescent indicator monomers, fluorescent crosslinkers, fluorescent probe crosslinkers and fluorescent indicator crosslinker comprise a compound that comprises a fluorophore (or fluorescent unit or entity) and at least one other functional group selected from an electron-rich substituent (e.g., N,N-dimethylamino or methoxy), an electron-poor substituent (e.g., cyano or trifluoromethyl), a receptor unit (or binding site or unit) and a polymerizable unit (or group) and that displays an absorption and a fluorescence in the wavelength range of 350 nm to 1050 nm. Especially inorganic emitters such as rare-earth ions or quantum dots comprise a luminescence and/or are frequently termed “luminescent”. Inorganic emitters as, e.g., rare-earth ions or quantum dots can also be used to specifically label a core of the suggested core/shell particles, the shell comprising an analyte specific MIP. Put differently, a fluorescence and a luminescence comprise an excitation and an emission as well as an excitation wavelength (and/or wavelength range) and an emission wavelength (and/or wavelength range) and hence, corresponding substances can be used in addition to the entities listed in Table 1 below.

In particular, a fluorescence of an entity, e.g. a chemical substance or ion, is typically characterized by an excitation wavelength (to be precise, typically an excitation wavelength range) and an emission wavelength (to be precise, typically an emission wavelength range). Typically, each of the indicated ranges has at least a distinct maximum. Accordingly, a “first fluorescence” as used herein comprises a “first excitation wavelength” or “first excitation wavelength range” and/or a “first emission wavelength” or “first emission wavelength range” and, respectively, a “second fluorescence” as used herein comprises a “second excitation wavelength” or “second excitation wavelength range” and/or a “second emission wavelength” or “second emission wavelength range”. Typically, the first fluorescence relates to the MIP-shell (or the core) and the second fluorescence relates to the core (or the MIP-shell). Their different fluorescence pattern can advantageously be used, e.g., for multiplexed detection of different glyphosate analytes.

As used herein, an indicator (at least for a chemical species as discussed here) always contains a group that can react or bind with an analyte and a group that shows a different property, the expression of which is influenced by the analyte binding event. This could be a fluorophore group for a fluorescent indicator or a redox-active group for a redox indicator, e.g., a compound that comprises a ferrocene. If an indicator is only sterically incorporated into the MIP of the suggested layer structure, it does not need to have a polymerizable group. If incorporation is attempted covalently, it should also contain a polymerizable group.

According to an embodiment a layer structure is suggested, comprising a solid substrate and a layer carried by the solid substrate, wherein on a surface of the solid substrate a molecularly imprinted polymer is disposed, which is adapted to specifically bind to a glyphosate analyte. Further, the molecularly imprinted polymer comprises a fluorescent indicator having a fluorescence property, which changes upon binding of the glyphosate analyte. Therefore, the fluorescence of the molecularly imprinted polymer changes upon binding of the glyphosate analyte.

Thus, advantageously, the fluorescence indicates the presence of a glyphosate analyte and, with a suitable calibration, allows establishing a concentration of the glyphosate analyte in a fluid which is wetting the layer structure, i.e. the molecularly imprinted polymer layer. By measuring a fluorescence property, such as e.g. the intensity at an emission wavelength peak or emission band maximum, a concentration of the glyphosate analyte in a sample can be detected.

More specifically, a layer structure, i.e. a sensor, is suggested which comprises a molecularly imprinted polymer disposed on a surface of a solid substrate, wherein the molecularly imprinted polymer specifically binds glyphosate or a degradation product of glyphosate or a metabolite of glyphosate or a metabolite of a degradation product of glyphosate. The molecularly imprinted polymer is generated by polymerizing a monomer with a crosslinker in presence of the glyphosate analyte. The molecularly imprinted polymer is configured to change an inherent fluorescence property of a constituent of the molecularly imprinted polymer originating from a fluorescent monomer or from a fluorescent crosslinker. Said constituent of the molecularly imprinted polymer changes an inherent fluorescence property upon binding of at least one of the glyphosate analytes and is therefore called a fluorescent indicator (fluorescent probe). In particular, as described in more detail further below, the fluorescence property is provided by the fluorescent indicator.

According to an embodiment the glyphosate analyte is selected from: Glyphosate (GPS), methylphosphonic acid (MPA), aminomethylphosphonic acid (AMPA), 3-methylphosphinicopropionic acid (MPPA), butylphosphonic acid (BPA), N-methylglyphosate (MGPS), N-(phosphonomethyl) iminodiacetic acid (PMIDA), hydroxymethyl phosphonic acid (HMPA), and bis-(phosphonomethyl)amine (BPMA).

These substances comprise typical residues in environmental samples. In view of controversial discussion about their effects on the environment and human health their detection using a rugged assay format and allowing for short analysis times is important.

Figure 38:
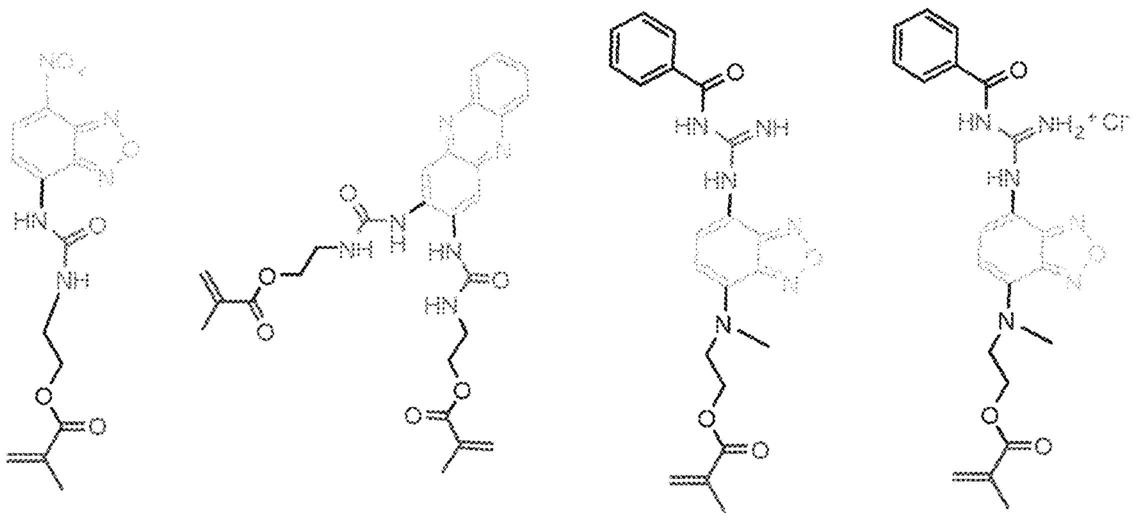
FIG. 38 shows the architecture of suggested polymerizable indicators used for the preparation of glyphosate-specific MIPs. F denotes the fluorophore unit or fluorescent entity, R the receptor or binding unit and P the polymerizable unit or polymerizable group.
Figure 38:
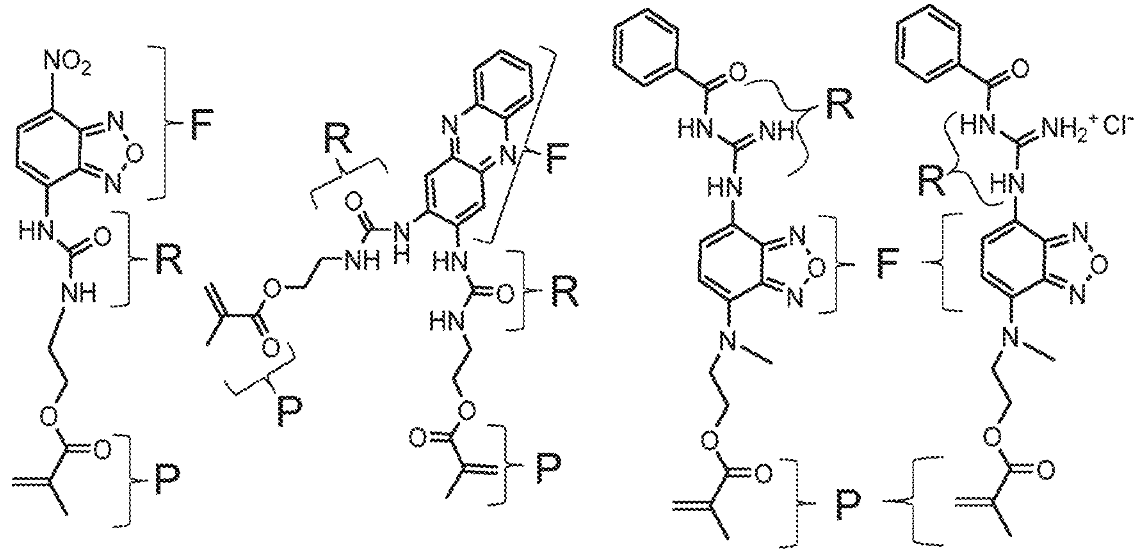

According to an embodiment a layer structure is suggested, wherein the fluorescence is caused by the fluorescent indicator which advantageously is covalently linked within a polymer network comprising the molecularly imprinted polymer or which is sterically entrapped within the polymer network of the molecularly imprinted polymer. Preferably, the fluorescent indicator comprises a fluorescent entity F selected from the substances listed in classes #1 through #3 of Table 2 below or an entity F as shown in FIG. 38, see class #4 of Table 2.

According to an embodiment in the suggested layer structure said fluorescent indicator in the molecularly imprinted polymer comprises a fluorescent entity F originating from: a Coumarin; a Dipyrromethene or a BODIPY; a Pyrromethane; a Benzofuran; a Pyridine; a Naphthalimide; a Benzoxazole; a Benzoxadiazole; a Benzindole; a Oxazine; a Phenazine; a Perylene; an Azulene; a Squaraine; a Pyrylium perchlorate, tetrafluoroborate or hexafluorophosphate; a Thiopyrylium perchlorate, tetrafluoroborate or hexafluorophosphate; a Ruthenium complex with any combination of three ligands (2,2'-bipyridine) or tri-(1,10-phenanthroline) or two ligands (2,2':6',2"-terpyridine) and two counterions perchlorate, tetrafluoroborate or hexafluorophosphate; an Osmium complex with any combination of three ligands (2,2'-bipyridine) or tri-(1,10-phenanthroline) or two ligands (2,2':6',2"-terpyridine) and two counterions perchlorate, tetrafluoroborate or hexafluorophosphate; a bis(2-(pyridin-2-yl)phenyl)iridium complex with any combination of a third ligand (2,2'-bipyridine) or tri-(1,10-phenanthroline) and a counterion perchlorate, tetrafluoroborate or hexafluorophosphate. Alternatively, the fluorescent indicator comprises a substance comprising a structure according to formula I, II, III, and IV:

I

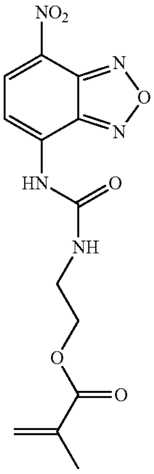

II

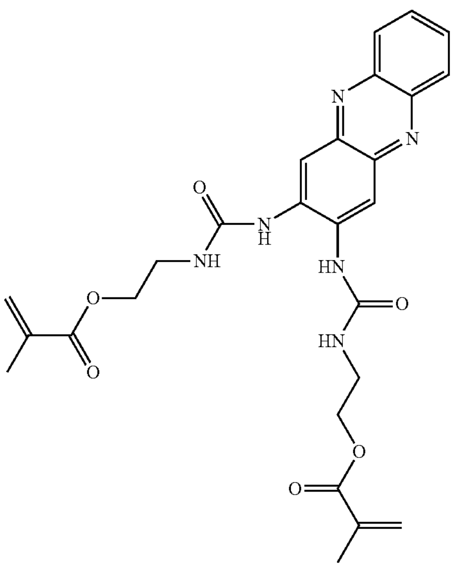

III

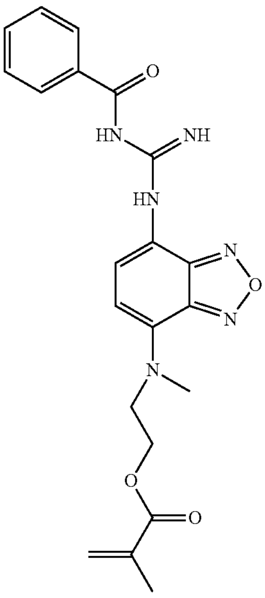

-continued

IV

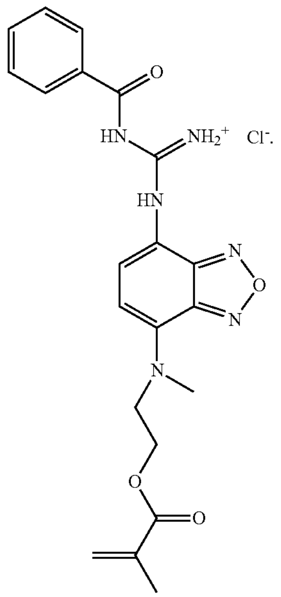

As to the substances comprising a structure according to formula I, II, III, or IV and all other fluorescent indicators comprising an entity selected from the indicated fluorescent dyes and complexes, they further favorably comprise at least one polymerizable group which takes part in the formation of the polymer network comprising the molecularly imprinted polymer or are covalently linked thereto. It is apparent, that said fluorescent indicators are no longer monomers (comprising one polymerizable group) or crosslinkers (comprising at least 2 polymerizable groups), once the polymer network is formed by polymerization. They rather can be regarded as building units or constituents, originating from crosslinkers or monomers. Notwithstanding, for the sake of brevity, they will be called monomers and crosslinkers herein, even after their inclusion into the polymer network of the molecularly imprinted polymer. The fluorescent indicator further comprises a binding unit R which is adapted to form hydrogen bonds with the glyphosate analytes.

According to embodiments substances comprising a structure according to formulae I, III, and IV are suggested as fluorescent monomers for the preparation of a MIP specifically adapted for detection of glyphosate analytes; and substances comprising the structure II are suggested as fluorescent crosslinker for the preparation of a MIP specifically adapted for detection of glyphosate analytes. The corresponding MIPs are used in the suggested layer structure. Detecting and/or measuring that change of the inherent fluorescence property upon binding of at least one of the glyphosate analytes allows their detection qualitatively and/or quantitatively but at least semi-quantitatively in aqueous and/or organic liquid samples.

According to an embodiment said fluorescent indicator is configured to be linked with the polymer network comprising the molecularly imprinted polymer during its synthesis and is selected from a substance according to formula I, III, and IV; or is configured to serve as a crosslinker during the synthesis of the molecularly imprinted polymer and selected from a substance according to formula II as indicated above.

Advantageously, said substances I, II, III, and IV have one or more receptor units that are able to form hydrogen bonds with oxoanions in liquid solution.

According to an embodiment the molecularly imprinted polymer of the layered structure is an organic polymer comprising elements selected from the group consisting of: C, H, N, O, P, and S; more preferably of: C, H, N, and O.

According to an embodiment beside the fluorescent monomer agent (fluorescent monomer) or the fluorescent crosslinking agent (fluorescent crosslinker) a further structural monomer (structural monomer) and/or a further structural crosslinking agent (structural crosslinker) is used for the synthesis of the molecularly imprinted polymer. A structural monomer and/or a structural crosslinker is/are advantageously used, because the fluorescent monomer or the fluorescent crosslinker should not be used in high quantities. High concentrations of fluorescent monomer and of fluorescent crosslinker might entail unwanted crosstalk between two adjacent dye units, e.g. within the distance of dimer formation or within the distance of typical energy transfer processes, or other spectroscopically detrimental effects. Thus, using the structural crosslinker simultaneously with the fluorescent crosslinker allows to avoid crosstalk or even quenching.

According to an embodiment said structural monomer is selected from: an acrylamide, a vinyl pyridine, a N-isopropylacrylamide, a 2-hydroxyethyl methacrylate, a methyl methacrylate, a benzyl methacrylate, a methacrylate, a methacrylamide, a N,N-dimethyl methacrylamide, a trifluoromethyl acrylate, a 2-aminoethyl methacrylate, a vinylalcohol, a vinylimidazole, a vinylphenyl boronic acid, an amino-substituted vinylphenyl boronic acid, a vinyl benzaldehyde, and/or a vinyl aniline.

Advantageously, said substances are commercially available. Further, the polarity and hence, wettability of obtainable polymers can be tuned according to the chemical nature of either a liquid (sample) or an extract thereof to be analyzed with respect to the glyphosate analyte(s). Of course, solid samples such as a sediment, a mud, a sewage sludge, a soil or a foodstuff can be extracted with an organic solvent as well and the glyphosate analyte(s) can then be detected in the organic extract as described. Further, using the structural monomer simultaneously with the fluorescent monomer allows to avoid crosstalk or even quenching.

According to an embodiment said structural crosslinking agent is selected from: ethylene dimethacrylate, ethylene glycol dimethacrylate, N,N'-methylenediacrylamide, divinylbenzene, tetramethylene dimethacrylate, poly(acrylic acid), a bis(-hydroxyethyl) sulfone, trimethylolpropane trimethacrylate, and pentaerythritol triacrylate.

Advantageously, using the structural crosslinker simultaneously with the fluorescent crosslinker allows to avoid crosstalk or even quenching. Further, by either one of the approaches described above, the fluorescence intensity and the sensitivity of the analyte specific molecularly imprinted polymer layer can be adapted to a relevant concentration range of the analyte or be adapted for optimal measurement conditions in a multiplex assay format. Typically, one either uses a fluorescent monomer plus (at least) a structural monomer and a structural crosslinker (M/M/CL composition) or a fluorescent crosslinker plus (at least) a structural monomer and a structural crosslinker (CL/M/CL composition). Of course, also more than one structural monomer can be used to tailor the polymer.

According to an embodiment the fluorescence of the molecularly imprinted polymer and a fluorescence of the solid substrate are distinguishable from each other by an excitation and/or by an emission wavelength or wavelength range or ranges.

Advantageously, that allows to set-up multiplex assay formats using core/shell particles with different analyte specificities. That difference can also be used for internal referencing via analyte-responsive fluorescence in MIP shell and fluorescence of the solid substrate which is insensitive to the analyte and the environment.

According to an embodiment the thickness of the molecularly imprinted polymer layer in a dry state is selected from 2 nm to 100 nm, particularly from 5 nm to 25 nm, preferably from 5 nm to 10 nm.

As to the thickness of the MIP layer is noted, that indicated values are measured at dried samples using electron microscopy, e.g. TEM. Advantageously, small molecules like the glyphosate analytes penetrate the MIP-layer within seconds by diffusion. Therefore, equilibrium (i.e. stable signal) is reached already after 10-30 seconds. Furthermore, a signal/noise ratio is stable after 10-30 seconds of contact between the particles and the sample solution.

According to an embodiment a layer structure is suggested, wherein the solid substrate is selected from a nanoparticle and a microparticle, wherein the nanoparticle and the microparticle are forming a core of a core/shell layer structure, and wherein the molecularly imprinted polymer covers the core as a single closed layer, i.e. as the shell of a core/shell particle.

In case of the mentioned core/shell particles, the growth i.e. synthesis of the MIP-polymer starts at the surface of the core (see experimental section). Usually, amino groups are fixed on the surface of the core and a RAFT-agent, which allows grafting the polymer from the surface. For other embodiments, e.g. a thin MIP film on a planar substrate, a bulk MIP nanoparticle, a MIP nanogel, and a plain or composite MIP membrane—each comprising the polymer which has been imprinted with a glyphosate analyte, appropriate modifications of the described process are used.

For example, the planar substrate will first be modified with the amino groups and the RAFT-agent before the polymer is synthesized. In case of the mentioned nanoparticle and nanogel crosslinking molecules are modified to carry the amino groups and RAFT-agents. In case of a composite membrane, a planar and typically porous or net-like scaffold structure is modified to carry the amino groups and RAFT-agents used for polymer synthesis.

According to an embodiment the solid substrate is a particle, preferably a spherical particle and a median arithmetic diameter of the particle as measured with an electron microscope lies in a range selected from 20 nm to 10 μm, preferably from 80 to 2000 nm, more preferably from 100 to 1200 nm. Thus, for a core particle in the dry state with a median arithmetic diameter of 1000 nm, the resulting core/shell-particle—the shell comprising the analyte specific MIP—has a median arithmetic diameter between 1004 nm and 1200 nm, particularly, between 1010 nm and 1050 nm, preferably between 1010 nm and 1040 nm. For a core particle in the dry state with a median arithmetic diameter of 100 nm, the resulting core/shell-particle—the shell comprising the analyte specific MIP—has a median arithmetic diameter between 104 nm and 200 nm, particularly, between 110 nm and 150 nm, preferably between 120 nm and 140 nm. It is noted that the shell thickness is not truly independent of the core size, yet giving an all-encompassing relationship might be confusing. In principle, for cores with a diameter$\leq$100 nm, shells hardly exceed 10 nm. For cores up to 1 μm, shell thickness can go up to 30 nm. Larger cores can also carry thicker shells of up to 100 nm. It is further noted that the shell network formation relates to curvature and surface roughness, because one can only graft a finite number of anchor groups (RAFT) to a particle surface and crosslinking depends on the interplay of linear chain growth and crosslinking.

According to typical embodiments the suggested layered structure is a core/shell particle, wherein the core is selected from the list consisting of: a polymer particle, a silica particle, a carbon nanodot, a quantum dot, and a ferromagnetic particle.

However, the core can also be selected from the list consisting of: a carbon nanodot, a dye labelled polymer particle, a dye labelled micelle, a quantum dot labelled polymer particle, a rare earth metal ion labelled polymer particle, a rare earth ion labelled solid particle, an alkaline earth metal oxide nanoparticle, or an alkaline earth metal fluoride nanoparticle.

The indicated different cores allow designing different cohorts of core/shell particles, which are optically distinguishable, wherein each cohort of core/shell particles comprises another specificity of its molecularly imprinted polymer layer. Therein the molecularly imprinted polymer layer of core/shell particles having different specificities is specific for different analytes. Advantageously, several glyphosate analytes can be detected simultaneously in one (multiplex) assay. Also, other analytes can be detected simultaneously with (a) glyphosate analyte(s) by using said multiplex assay, if suitable core/shell particles comprising molecularly imprinted polymers of different specificity are applied as a mixture with the core/shell particles suitable for detecting the glyphosate analyte(s) as described.

According to an embodiment the solid substrate of the suggested layer structure comprises a planar or curved surface, e.g., a channel wall, an inner wall of a tube or capillary. The solid substrate can also encompass a recess, a slot, an open cavity, a groove, wherein at least a portion of their surface is covered with the MIP layer.

In contrast to spherical particles which are completely covered with the MIP, i.e. in contrast to the core/shell particles mentioned, a planar or curved surface of the solid substrate may be covered by the MIP only partially. The planar or curved surface can encompass: a polymer such as, e.g., polystyrene, poly(vinyl chloride), polycarbonate, polyethylene, polypropylene, poly(methyl methacrylate), poly (ethylene terephthalate)—to name a few; a crystal, e.g., a semiconductor wafer; and/or a glass, e.g., quartz glass, borosilicate glass.

Advantageously said materials can be selected to be transparent for at least a wavelength or wavelength range which is used during measurement, either for excitation or as emission light.

According to an embodiment the material comprising the planar or curved surface is optically transparent for a wavelength which relates to a fluorescence measurement of the molecularly imprinted polymer, i.e. transparent in the excitation wavelength range and/or in the emission wavelength range.

Advantageously that allows different measurement setups to be arranged. For instance, epi-fluorescence measurements or fluorescence-transmission measurements can be accomplished allowing a compact design of the set-up, e.g. a handheld pocket device.

According to an embodiment a method for detecting a concentration of glyphosate is suggested, the method comprising the steps: providing a layer structure according to any of the previous embodiments; providing a fluidic contact of the layer structure with a liquid sample or an organic extract of the sample; measuring a fluorescence property, e.g. a fluorescence intensity, of the layer structure; and estimating the concentration of glyphosate or of the glyphosate related analyte at least semi-quantitatively. Typically detecting the concentration comprises a calibration or applying a calibration curve for the fluorescence property of the layer structure in fluidic contact with the glyphosate analyte. Typical limits of detection (LODs) that can be reached with for instance a typical MIP particle batch is 1 μM. This LOD can be lowered for instance by combination with enrichment methods.

Advantageously, a mean linear detection range of glyphosate concentrations in 2 mL chloroform containing 1 mg $mL^{-1}$ particles can be reached to cover in chloroform GPS concentrations from about 2.5 μM to 80 μM. In a biphasic (water/chloroform) system GPS concentrations in the range of about 5 μM to 80 μM can reliably be detected.

According to an embodiment, the suggested method comprises a simultaneous detection of different glyphosate analytes selected from glyphosate (GPS); methylphosphonic acid (MPA); aminomethylphosphonic acid (AMPA); 3-methylphosphinicopropionic acid (MPPA); butylphosphonic acid (BPA); N-methylglyphosate (MGPS); N-(phosphonomethyl) iminodiacetic acid (PMIDA), hydroxymethyl phosphonic acid (HMPA) and bis-(phosphonomethyl)amine (BPMA), and hence, allows for performing a multiplex assay.

According to an embodiment different layer structures with each layer structure encompassing a molecularly imprinted polymer layer which comprise a specificity for different analytes are provided together in the suggested method. Accordingly, the method further comprises: measuring the fluorescence properties of the different layer structures; and estimating the concentration of the different analytes by using corresponding calibration curves for each of the fluorescence properties of the different layer structures.

Advantageously, the measurement time required for performing different analyses and hence costs can be reduced.

According to an embodiment different layer structures of the suggested assay comprise a wall of a well of a microtiter plate, wherein the microtiter plate comprises 96 or 384 wells. Alternatively, the suggested layer structures comprising core/shell particles comprise core/shell nanoparticles or core/shell microparticles, the shell being the glyphosate analyte specific MIP, are fixed to a wall of a well of a microtiter plate comprising 96 or 384 wells. For fixing said core/shell particles within the well a thin layer of a hydrogel, e.g. poly(vinyl alcohol), can be used. Thus, the wells are modified to specifically bind a glyphosate analyte. As already indicated, the analyte specific MIP can also be fixed to a glass slide or a channel wall of a microfluidic system. Alternatively, different MIPs may be synthesized by grafting specific polymer layers to the wells by imprinting said polymers with, e.g., GPS THA, MPPA THA, BPA THA, and MPA THA similarly to the method described above in the experimental section. According to a modification, a microtiter plate comprising any number of wells between 6 and 3456 may be used together with the suggested core/shell particles. According to another modification of the above methods, the assay comprising simultaneous detection of different glyphosate analytes with different core/shell particles described herein comprises a flow-through system or even a fully automated microfluidic system.

Advantages are high throughput, high accuracy and lower costs, to name a few.

According to an embodiment the GPS related analyte detected with the suggested method is selected from: Glyphosate (GPS); methylphosphonic acid (MPA); aminomethylphosphonic acid (AMPA); 3-methylphosphinicopropionic acid (MPPA); butylphosphonic acid (BPA); N-methylglyphosate (MGPS); N-(phosphonomethyl) iminodiacetic acid (PMIDA); hydroxymethyl phosphonic acid (HMPA); and bis-(phosphonomethyl)amine (BPMA).

Those are the main glyphosate analytes which are relevant for monitoring environmental matrices such as soil, water, crop, and food products.

According to an embodiment a molecularly imprinted polymer is suggested, wherein the molecularly imprinted polymer comprises a fluorescence property that changes upon binding of a glyphosate analyte, wherein the fluorescence property is a characteristic of the fluorescence indicator which is covalently linked to or within the molecularly imprinted polymer, or which is sterically entrapped within the molecularly imprinted polymer, and wherein a binding unit (R) is adapted to form a hydrogen bond with the glyphosate analyte.

Advantageously said molecularly imprinted polymer can be anchored to different optically transparent substrates while preserving its susceptibility towards the glyphosate analyte, and thus turn them responsive towards a glyphosate analyte.

According to an embodiment the fluorescent indicator is either sterically entrapped within a polymer network of the molecularly imprinted polymer, or covalently linked to said polymer network, or represents itself a constituent (a structural unit) of said polymer network. It comprises a fluorescent entity selected from: a Coumarin; a Dipyrromethene or a BODIPY; a Pyrromethane; a Benzofuran; a Pyridine; a Naphthalimide; a Benzoxazole; a Benzoxadiazole; a Benzindole; a Oxazine; a Phenazine; a Perylene; an Azulene; a Squaraine; a Pyrylium perchlorate, tetrafluoroborate or hexafluorophosphate; a Thiopyrylium perchlorate, tetrafluoroborate or hexafluorophosphate; a Ruthenium complex with any combination of three ligands (2,2'-bipyridine) or tri-(1,10-phenanthroline) or two ligands (2,2':6',2"-terpyridine) and two counterions perchlorate, tetrafluoroborate or hexafluorophosphate; an Osmium complex with any combination of three ligands (2,2'-bipyridine) or tri-(1,10-phenanthroline) or two ligands (2,2':6',2"-terpyridine) and two counterions perchlorate, tetrafluoroborate or hexafluorophosphate; a bis(2-(pyridin-2-yl)phenyl)iridium complex with any combination of a third ligand (2,2'-bipyridine) or tri-(1,10-phenanthroline) and a counterion perchlorate, tetrafluoroborate or hexafluorophosphate; or the fluorescent indicator comprises a substance comprising a structure according to formula I, II, III, or IV:

I

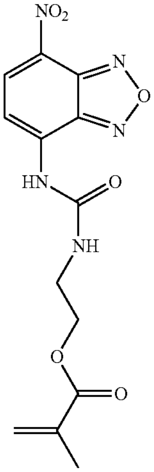

II

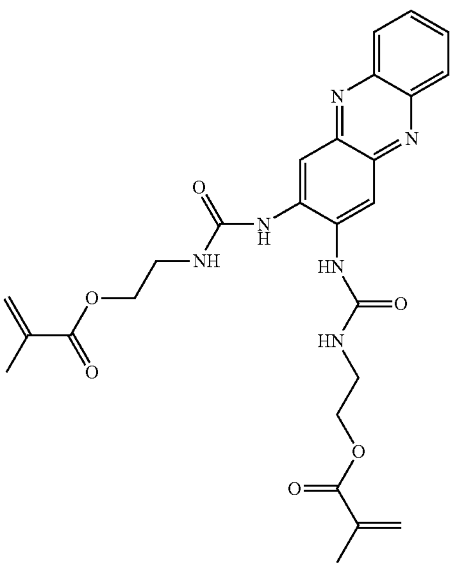

III

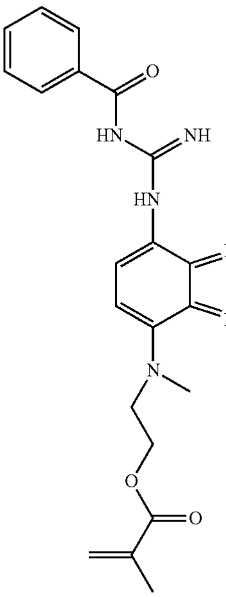

-continued

IV

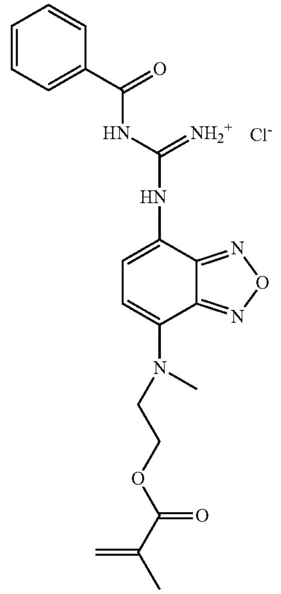

Advantageously the listed substances are able to form a hydrogen bond with a glyphosate analyte and, as a result of the hydrogen bond formation with the glyphosate analyte, change their fluorescence characteristic. Such change can easily be measured and used for analytical purposes.

According to an embodiment the suggested imprinted polymer comprises a fluorescent monomer, selected from a substance according to formula I, III or IV; or a fluorescent crosslinker according to formula II:

I

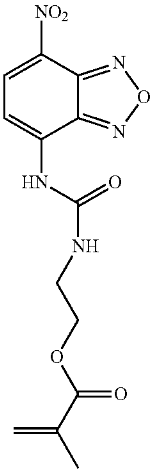

-continued

II

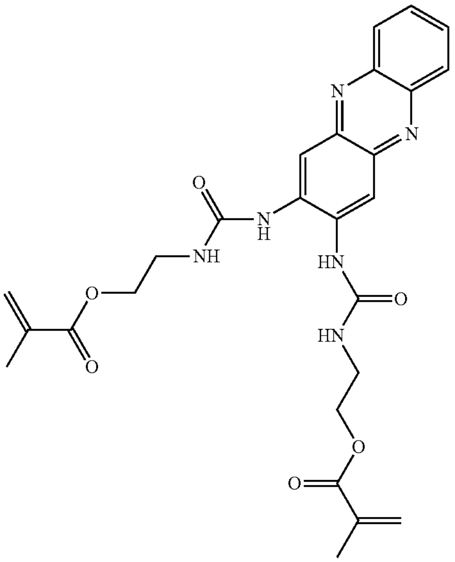

III

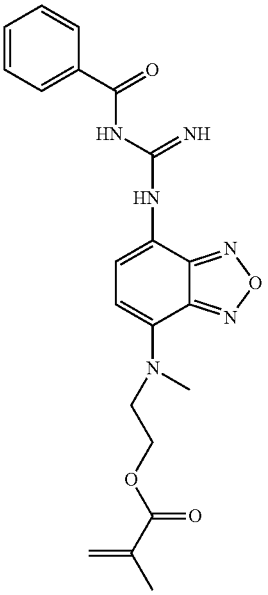

-continued

IV

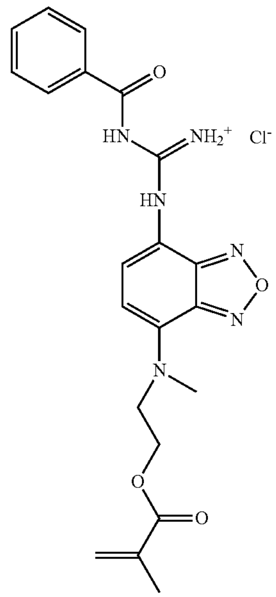

Advantageously said molecularly imprinted polymer can be adapted to be analyte-specific and be applied to any solid surface to generate analyte sensitive surfaces whose optical properties, especially fluorescence properties can be measured in order to detect a glyphosate analyte and to estimate its concentration.

According to an embodiment a sensor and a sensor set-up are suggested. The sensor and the sensor set-up comprise the molecularly imprinted polymer described above or a layer structure encompassing it.

Advantageously, all the parts for fluid handling can be incorporated into a microfluidic "chip" architecture, a 3D microfluidic tubing architecture or a 3D-printed assembly. Materials of such systems may comprise inorganic and organic ones, e.g., borosilicate glass, quartz, ceramic, silicon, Teflon, poly(dimethylsiloxane) (PDMS), poly(lactic acid) (PLA), polyethylene (HDPE, LDPE), polystyrene, poly(methyl methacrylate) (PMMA), cyclic olefin copolymer (COC), acrylonitrile Butadiene Styrene (ABS), glycol-modified polyethylene terephthalate (PETG), polycarbonate (PC), different elastomers, etc. Advantageously the polymer is selected to resist the used organic solvents, e.g. chloroform. Alternatively, the polymer is selected to be coated with a Teflon layer to resist the used organic solvents, e.g. chloroform. The sensor set-up may comprise for instance a sample port or sample intake, a measurement section comprising a measurement window, which is transparent for at least an excitation wavelength and an emission wavelength; and a measurement device, e.g. a photodiode. The set-up may further comprise a light source, e.g. an LED, and optionally an optical filter and/or a lens.

Furthermore, the sensor set-up may comprise or be adapted to be connected to a control unit, wherein the control unit is configured to output a current measurement value or even to digitally store several measurement values. The sensor set-up may be designed as a flow-through arrangement or as an in-line sensor adapted, e.g., for monitoring a fluid stream. Advantageously, such and similar measuring devices, whether stationary or mobile—preferably configured as a hand-held pocket device. Preferably, at least the control unit may comprise an appropriately configured telecommunication terminal such as a mobile phone or smart phone.

Typically, the suggested molecularly imprinted polymer is anchored to the substrate, especially to a surface of the substrate, by functionalization of the substrate with a RAFT agent and synthesis of the fluorescent MIP which is responsive to the respective glyphosate analyte in the presence of the selected glyphosate analyte to be detected and at least one of a fluorescent indicator comprising a fluorescent entity as described above. Additionally, mentioned structural monomers (e.g. acrylamide, vinyl pyridine, N-isopropylacrylamide, 2-hydroxyethyl methacrylate, methyl methacrylate, benzyl methacrylate, methacrylate, methacrylamide, N,N-dimethyl methacrylamide, trifluoromethyl acrylate, 2-aminoethyl methacrylate, vinylalcohol, vinylimidazole, vinylphenyl boronic acid, an amino-substituted vinylphenyl boronic acid, a vinyl benzaldehyde, and/or a vinyl aniline) and/or crosslinkers (e.g. ethylene dimethacrylate, ethylene glycol dimethacrylate, N,N'-methylenediacrylamide, divinylbenzene, tetramethylene dimethacrylate, poly(acrylic acid), bis(-hydroxyethyl) sulfone, trimethylolpropane trimethacrylate, and pentaerythritol triacrylate) are also used in a concentration suitable to suppress any cross-talk and/or self-quenching of the fluorescent crosslinker and fluorescent monomer molecules.

According to an embodiment a method for producing a molecularly imprinted polymer is suggested. Said method comprises polymerizing a mixture of monomers and cross-linkers together with 1) the glyphosate analyte; 2) a phase transfer catalyst comprising a tetrabutylphosphonium or a tetrahexylphosphonium cation and 3) a fluorescent indicator which is adapted to form a hydrogen bond with the glyphosate analyte and to change its fluorescence upon binding the glyphosate analyte. In other words, the method for producing a molecularly imprinted polymer comprises: polymerizing a mixture of at least one monomer, at least one crosslinker, a glyphosate analyte, a phase transfer catalyst comprising a tetrabutylphosphonium or a tetrahexylphosphonium cation, and a fluorescent indicator comprising a fluorescent entity, wherein the fluorescent indicator is able to form at least one hydrogen bond with the glyphosate analyte and to change its fluorescence property upon forming of said hydrogen bond(s) with the glyphosate analyte.

Advantageously, the mentioned phase transfer catalysts, said cations, are available, e.g., as constituents of corresponding halogenide salts, e.g. a corresponding iodide, chloride, bromide or of methansulfonate, p-toluenesulfonate, malonate or as a hydroxide solution. Said structural monomers are selected from, e.g., acrylamide, vinyl pyridine, N-isopropylacrylamide, 2-hydroxyethyl methacrylate, methyl methacrylate, benzyl methacrylate, methacrylate, methacrylamide, N,N-dimethyl methacrylamide, trifluoromethyl acrylate, 2-aminoethyl methacrylate, vinylalcohol, vinylimidazole, vinylphenyl boronic acid, an amino-substituted vinylphenyl boronic acid, a vinyl benzaldehyde, and/or a vinyl aniline. Said structural crosslinkers are selected from, e.g., ethylene dimethacrylate, ethylene glycol dimethacrylate, N,N'-methylenediacrylamide, divinylbenzene, tetramethylene dimethacrylate, poly(acrylic acid), bis(-hydroxyethyl) sulfone, trimethylolpropane trimethacrylate, and pentaerythritol triacrylate. Said fluorescent indicator can be sterically entrapped within the polymer network of the molecularly imprinted polymer. Said fluorescent indicator may also be covalently linked to the polymer network and thus, comprise a constituent thereof. It even may take part in the formation of the polymer network, i.e. of the very molecularly imprinted polymer, if it has or if it is furnished with at least one polymerizable group, e.g. with one, two or even three vinyl groups. A modification of a fluorescent entity of the fluorescent indicator by introducing a polymerizable group does not change the ability of the fluorescent indicator to form a hydrogen bond with the glyphosate analyte. It also does not eliminate the ability of the fluorescent entity (i.e. indicator) to change its fluorescence characteristic upon binding of the glyphosate analyte.

According to typical embodiments the fluorescent entity of the fluorescent indicator is selected from a Coumarin; a Dipyrromethene or a BODIPY; a Pyrromethane; a Benzofuran; a Pyridine; a Naphthalimide; a Benzoxazole; a Benzoxadiazole; a Benzindole; a Oxazine; a Phenazine; a Perylene; an Azulene; a Squaraine; a Pyrylium perchlorate, tetrafluoroborate or hexafluorophosphate; a Thiopyrylium perchlorate, tetrafluoroborate or hexafluorophosphate; a Ruthenium complex with any combination of three ligands (2,2'-bipyridine) or tri-(1,10-phenanthroline) or two ligands (2,2':6',2"-terpyridine) and two counterions perchlorate, tetrafluoroborate or hexafluorophosphate; an Osmium complex with any combination of three ligands (2,2'-bipyridine) or tri-(1,10-phenanthroline) or two ligands (2,2':6',2"-terpyridine) and two counterions perchlorate, tetrafluoroborate or hexafluorophosphate; a bis(2-(pyridin-2-yl)phenyl)iridium complex with any combination of a third ligand (2,2'-bipyridine) or tri-(1,10-phenanthroline) and a counterion perchlorate, tetrafluoroborate or hexafluorophosphate. Alternatively, the fluorescent indicator comprises a substance comprising a structure according to formula I, II, III, and IV:

I

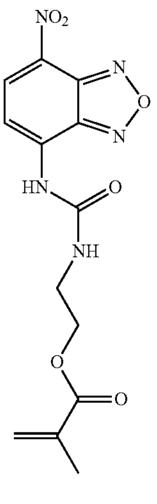

-continued

II

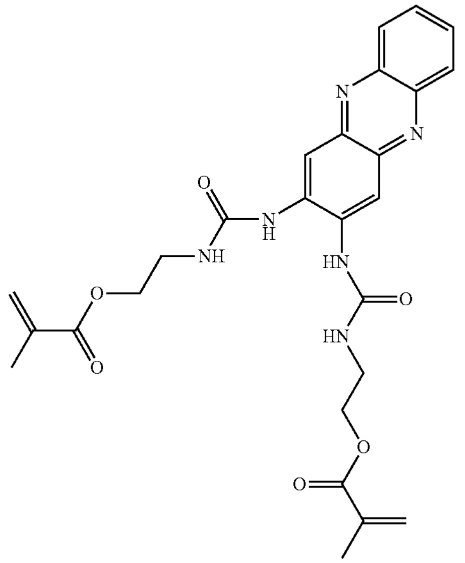

III

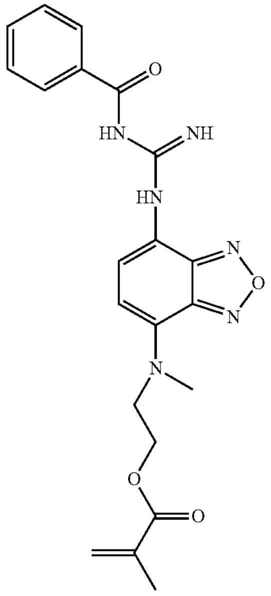

-continued

IV

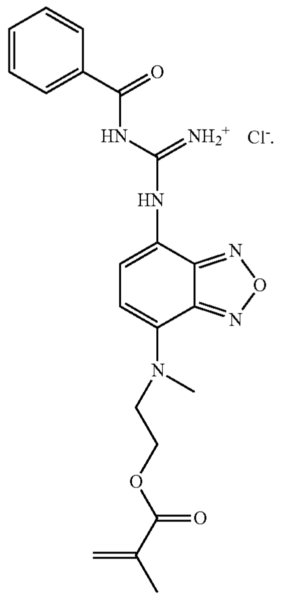

According to a modification of the embodiment comprising a substrate selected from a polystyrene particle which results in a layered structure comprising a core shell particle, a structural inorganic layer is placed in between the core and the MIP shell. It comprises $SiO_2$ which may be deposited on the core, e.g. by a TEOS based technique according to or resembling Stöber (W. Stöber, A. Fink, E. J. Bohn, J. Colloid Interf. Sci. 26(1968) 62).

Advantageously, the inorganic structural layer allows increasing the surface of the solid substrate (especially if such is serving as a core) and to conveniently provide e.g. reactive groups carried, e.g., by silanes such as (3-aminopropyl) triethoxysilane (APTES) for anchoring the MIP layer. For inorganic emitters, CNDs, and ferromagnetic particles, coupled or included into this structural layer or shell, the structural layer or structural shell provides a conjugation layer from which the MIPs can be grown, e.g. by the described RAFT technique. That allows also for reliable fixation of these entities within the MIP.

For dye-labelled polymer beads used as a core, the inorganic structural layer additionally shields the polymer core so that during the further synthetic attachment of reagents and MIP, the polymer core is not dissolved and/or a sterically embedded dye is prevented from leaching out. In a complex sample, the inorganic structural layer also shields the core from attack by small species that might alter the fluorescence of a core such as protons, as many of the inorganic cores show a certain pH dependence of their fluorescence.

In other words, for dye-labelled (or even non-labelled) polymer beads, an insulating silica shell as disclosed in DE 10 2019 115 136 B3 may be advantageously used. If such protecting intermediate shell is not applied, organic solvents used while polymerizing the MIP shell onto a polymer core might lead to its dissolution.

Remarkably, the size and fluorescence properties of the MIP layer are adapted for application with measuring devices "in-the-field" or "on-the-spot", wherever detection of the glyphosate analyte(s) is desired. In particular, no centrifugation or sophisticated optical equipment is required during analysis, as the layer structure, e.g., a core/shell particle or, e.g., a channel wall of a microfluidic system can easily be distinguished or separated from a liquid phase (sample matrix). Double fluorescent particles as disclosed in DE 10 2019 115 136 B3 may be used as core/shell particles as well. Even with non-fluorescent cores and fluorescent MIP shells, there is no need for separation of the core/shell particles ("beads") from the liquid sample, because the analyte is typically non-fluorescent and a change of the optical pattern generated by the fluorescent MIP layer would only occur if the analyte is bound by the MIP.

However, if the core/shell particles shall be separated from the sample fluid (matrix), the use of core/shell particles comprising ferromagnetic cores would be preferred over filtration or centrifugation, because filtration and centrifugation are too tedious and time consuming. In a microfluidic channel, optical detection is usually happening directly in the flow. If the channel walls are coated with fluorescent MIPs one would also not have to separate the sample fluid from MIP, but one would only have to monitor the channel which comprises an analyte-responsive MIP coating, wherein the analyte response encompasses a change of fluorescence property of the MIP coating.

Advantageously, the suggested approach complies with the WHO's ASSURED principle: (Affordable, Sensitive, Specific, User-friendly, Rapid and robust, Equipment-free and Deliverable to end-users).

Whether working with discrete microfluidic "chips" (i.e. a microfluidic channel system) or with modular tube-based so-called 3D microfluidics, the fluorescence properties of the layer structure, i.e. the excitation and/or emission wavelengths of the fluorescent indicator present within the MIP, are selected such as to be applicable with a hand-held measurement device which is preferably equipped with a battery driven light source. A light source, such as an LED, an OLED or a laser diode can be used. The light source can also comprise an optical filter and/or a lens. On the detection side, commonly a lens, a filter and a sensitive photodiode or photomultiplier are employed.

If the fluorescent MIP is combined with a luminescent, a fluorescent or a dyed substrate, e.g. a spherical particle, which together with the MIP comprise the layered structure, advantageously, a multiplex assay format can be accomplished. The multiplex assay allows to simultaneously measure (i.e. to detect qualitatively and/or at least semi-quantitatively) several different analytes in one sample in a single run. Said several different analytes measured in the multiplex assay may comprise different glyphosate analytes. Simultaneous to the glyphosate analytes other analytes can be detected in the multiplex assay as well, if suitably configured particles which allow for detecting these other analytes are provided.

According to an embodiment, each of the layered structures used for the multiplex assay comprises a core which is covered by an analyte specific MIP, each MIP forming a shell on the core, wherein the layered structures, i.e. the multiple core/shell particles, have—at least after binding of the respective analyte—a characteristic optical property or pattern of a luminescence or a fluorescence. Said property or pattern is distinctive for the MIP comprising the specific analyte being bound to the MIP of the core/shell particle, i.e. coordinatively bound by the suggested herein fluorescent indicator or fluorescent crosslinker within the polymer network of the MIP.

Typically, the selectivity of the MIP for a given analyte is defined by the molecular template it was generated with, i.e. imprinted with.

According to a typical embodiment, an optical property of the core, i.e. its luminescence, fluorescence or color is distinguishable from the fluorescence of the MIP, at least after a fluidic contact between the MIP and the analyte.

Non-fluorescent or colorless cores and planar substrates may be labelled as well—whether with a non-fluorescent dye, by a material having a specific dielectric constant, a specific size, a specific density, or a ferromagnetic property. Each type of a resulting core can be combined with an analyte-specific MIP which optionally comprises—in addition to a fluorescent crosslinker—a shell marker with another specific fluorescence property which is different from the fluorescence property of the fluorescent crosslinker.

Thus, resulting core/shell particles or otherwise shaped layered structures are suitable for the proposed detection of glyphosate analytes in environmental samples such as surface water, groundwater or organic extracts thereof, or extracts of a soil or, e.g., a sewage sludge. Different cohorts of core/shell particles, each cohort comprising a MIP distinguishable marked and/or imprinted with another glyphosate analyte, can be mixed with each other to allow for the multiplex assay format—i.e. simultaneous and parallel detection of different analytes in one sample.

As to the MIP, the choice of monomers and crosslinkers used to produce the MIP is adapted to the chemical nature of the analyte. Chemically closely related analytes may be targeted with the same combination of monomers and crosslinkers, chemically different analytes with different combinations, i.e. other component mixtures used for the synthesis of the MIP.

The same holds for the signaling event. All oxoanions (carboxylate, phosphate, etc.) can usually be targeted with the same fluorescent monomer or the same fluorescent crosslinker, whereas an analyte without any oxoanion, e.g., another pesticide or a metabolite thereof with, e.g., amine groups requires also a different fluorescent monomer or fluorescent crosslinker, respectively.

As to the mentioned above Ruthenium, Osmium and Iridium complexes, the following remarks apply:

The structure of the ruthenium and osmium complexes is usually as follows: $[M^{II}L_3]X_2$, wherein $M^{II}$ is the divalent metal ion $Ru^{II}$ or $Os^{II}$, L is an uncharged ligand with two coordination sites (e.g. 2,2'-bipyridine) and X is a monovalent anion such as $ClO_4^-$ or $PF_6^-$. Any ligand can be combined with any counterion, but two monovalent counterions are always necessary.

The structure of iridium complexes is usually as follows: $[M^{III}L^1_2L_2]X$, wherein $M^{III}$ is the trivalent metal ion $Ir^{III}$, $L^1$ is a ligand covalently connected to the metal ion, $L^2$ is a third ligand with two coordination sites (e.g. 2,2'-bipyridine) and X is a monovalent anion such as $ClO_4^-$ or $PF_6^-$:

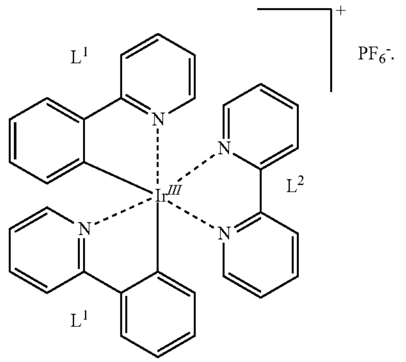

Every ligand $L^2$ can be combined with every counterion, but only one counterion is necessary.

Advantageously, the use of fluorescent MIPs as herein suggested is a toolbox-type approach which may be adapted to specific requirements, e.g. for monitoring specific analytes in environmental samples or process streams.

According to an embodiment, the layered structures used for the multiplex assay each comprise the same solid substrate—preferably the planar or curved surface described above—but are different with respect to their MIP.

Typically, as in the core/shell particles of the previous embodiment, each analyte-specific MIP disposed on the solid substrate has—at least after binding of the respective analyte—a characteristic optical property or pattern of a luminescence or a fluorescence which indicates binding of the specific analyte. The different MIPs may be disposed adjacently to each other on the surface of the planar or curved solid substrate, e.g., along a flow direction of the sample on a channel wall of a microfluidic system. They can also be arranged to form a specific pattern on a section of the channel wall, e.g. an array.

According to an embodiment, the specific position of different analyte specific MIPs on the surface of the solid substrate allows for distinguishing the binding of different glyphosate analytes in a liquid sample passing the channel. The described configuration of a solid substrate comprising adjacently disposed different analyte specific MIPs allows to simultaneously measure, i.e. to detect qualitatively and/or at least semi-quantitatively, multiple analytes in one sample in a single run. Due to the given different positions of each of the analyte specific MIPs, these different analyte specific MIPs may even comprise the same fluorescent indicator. They differ from each other merely by the template which was used for their generation. Besides wells of microwell plates, compartmentalization in such a manner can be achieved by spotting different features on slides, e.g. on microscope slides for readout with a microarray scanner in analogy to microarray biochips, by using masks for the lithographic patterning of solid and gel-like supports, by printing wax barriers on organic (e.g., cellulose, nitrocellulose) or inorganic (e.g., glass fiber) paper supports or by using fiber bundles in combination with microparticles. Optical fiber bundles contain approximately 50 000 individual optical fibers (e.g., with diameters of 3.1 μm) and are chemically etched with a hydrochloric acid solution to create a planar array of microwells where fluorescently encoded MIP and NIP particle types are pooled to form a randomly ordered but addressable high density array.

Typical precursors for generating the structural inorganic layer are selected from: a silicon alkoxide, sodium silicate, 3-aminopropinyl silane, vinyltrichlorosilane, trimethoxyvinylsilane, triethoxyvinylsilane, tris(2-methoxy ethoxy)vinylsilane, 3-glycidoxypropyltrimethoxysilane, 3-meth-acryloxypropyltrimethoxysilane, diethoxy-3-glycidoxypropylmethylsilane or combinations thereof, wherein the silicon alkoxide is selected from $Si(OCH_3)_4$, $Si(OC_2H_5)_4$, $Si(O\text{-}nC_3H_7)_4$, $Si(O\text{-}i\text{-}C_3H_7)_4$, $Si(O\text{-}n\text{-}C_4H_9)_4$, or $Si(O\text{-}i\text{-}C_4H_9)_4$. A typical precursor is tetraethyl orthosilicate (TEOS).

Depending on the reaction conditions of the used sol-gel-process, based on hydrolysis of TEOS or another precursor, which is often described as Stöber-technique, and particularly depending on the mass average molecular weight and the amount of polyvinylpyrrolidone (PVP), the roughness and porosity of the structural inorganic shell can be tuned. The average molecular weight (MW) indicated for commercially available PVP (e.g. PVP 360, PVP 40 and PVP 10) is the MW, i.e. the mass average molar mass, which is defined in its common sense. According to said common sense the molar mass distribution (or molecular weight distribution) describes the relationship between the number of moles of each polymer species ($N_i$) and the molar mass ($M_i$) of that species. In particular, the mass average molar mass (often loosely termed weight average molar mass) is another way of describing the molar mass of a polymer. Some properties are dependent on molecular size, so a larger molecule will have a larger contribution than a smaller molecule. The mass average molar mass is calculated by the formula $$\bar{M}_w = \frac{\sum_i N_i M_i^2}{\sum_i N_i M_i}.$$

The used core particles have typically an (arithmetically) mean diameter≤200 nm. Such diameters can reliably be detected using established light scattering techniques or electron microscopy. Preferably, the used cores start typically with a diameter of 20 nm, e.g. CNDs, and could go up to 500 nm, yet also cores up to 10 μm can be used. In general, all particles between 500 nm and 3 μm are advantageous for single particle analysis (in analogy to flow cytometry) yet may suffer from sedimentation. They can advantageously be used after deposition on slides, fiber bundles or other planar substrates. Particles between 20 nm and 500 nm are ideal for compartmentalized bulk measurements, i.e., in wells, fluidic streams, fluidic droplets, etc.

In view thereof, a core can be a nanoparticle or a microparticle comprising an organic polymer or an inorganic material, which is optionally covered by an inorganic structural silica layer. A spherical shape is a preferred shape of said nanoparticles and microparticles for ease of optical detection in a suspended state and/or homogeneous optical scattering. The used particles may preferably be uniform comprising a polydispersity index below 0.1. The polydispersity index (PI) and its detection is defined in ISO 22412: 2017 (Particle size analysis—Dynamic light scattering (DLS)).

Advantages of the mentioned additional inorganic structural silica layer comprise possible tuning of the hydrodynamic diameter, density, enhancing the surface area available for RAFT-based polymer (MIP) deposition, and adapting an optical density for optimal detection.

The MIP layer is disposed on the core, the core optionally comprising the inorganic structural layer, or on another curved or on a planar substrate surface. The MIP layer has a thickness of typically 2 nm to 100 nm, particularly from 5 nm to 25 nm, preferably from 5 nm to 10 nm.

A well-established method to measure the diameter of such solid bodies is, e.g., electron microscopy, especially scanning electron microscopy (SEM) or transmission electron microscopy (TEM). Other methods comprise, e.g., light scattering, especially dynamic light scattering (DLS). However, the latter methods require defining the refractive index of the related solid material which may be difficult to indicate for particles below 50 nm, whereby the problem is even more pronounced for composites/hybrids such as dye-labelled polystyrenes (PS), silica-shelled organic particles or CNDs, etc.

Therefore, as used herein, the indicated particle size relates to values as detected by electron microscopy using the signals generated in TEM or SEM. For SEM, the signal generated by backscattered electrons (BSE) as measured with, e.g., a BSE detector of a commercially available electron microscope can be used to establish the particle diameter and to calculate a corresponding mean value. For TEM, a FEI Talos™ F200S (200 kV) transmission scanning electron microscope was used.

According to an embodiment, both the fluorescence of the core and the fluorescence of the MIP shell can be excited within the same wavelength range yet emit in significantly different spectral ranges. As one single light source could be used, that would be the most convenient configuration.

If this is not possible, the use of a first excitation and a first emission range for the first fluorescence and that of a second excitation and a second emission range for the second fluorescence might be used as well. The latter would be the classic case used for single particle analysis in flow cytometry, which is one of the possible corner stones in the multiparametric space of particle-based microfluidics.

Table 1. Classes of fluorescent entities for the described core/shell structures comprising a labelled (i.e. doped) core which is covered by a shell comprising a MIP which is specific for a glyphosate analyte. The fluorescent entities listed in class #1 are ionic/charged and preferred for labelling of hydrophilic and protic particle cores such as silica. Accordingly, the entities listed in class #2 are charge-neutral and preferred for labelling of medium polar and hydrophobic particle cores and the entities listed in class #3, which are ionic/charged, are preferred for labelling of hydrophilic and protic particle cores such as silica. Medium polar refers to particle cores that can be swollen in medium polar solvents such as ethers (e.g., diethylether or tetrahydrofuran) and hydrophobic refers to particle cores that can be swollen in hydrophobic solvents such as alkanes (e.g. n-pentane, n-hexane or cyclohexane) or substituted benzenes (e.g., toluene or xylenes). Hydrophilic and protic refer to solvents such as alcohols (e.g., methanol or ethanol), formamides (e.g., N,N-dimethylformamide or N-methylformamide), dimethylsulfoxide (DMSO) and water.

| Class | Fluorescent entities |
|---|---|
| #1 | Rhodamine and derivatives |
| | Fluorescein and derivatives |
| | Styryl derivatives |
| | Cyanine and polymethine derivatives |
| | Pyridinium derivatives |
| | Pyrylium and thiopyrylium derivatives |
| | Ruthenium, osmium or iridium complexes and derivatives |
| | Luminescent complexes of rare earth elements (such as europium or terbium) |
| | Squarylium and derivatives |

-continued

| Class | Fluorescent entities |
| --- | --- |
| #2 | Coumarin and derivatives<br>Dipyrromethene or BODIPY and derivatives<br>Pyrromethane and derivatives<br>Benzofuran and derivatives<br>Pyridine derivatives<br>Naphthalimide and derivatives<br>Benzoxazole and derivatives<br>Benzoxadiazole and derivatives<br>Benzindole and derivatives<br>DAPI and derivatives<br>Stilbene and derivatives<br>Oxazine and derivatives<br>Phenazine and derivatives<br>Perylene and derivatives<br>Azulene and derivatives<br>Styryl base derivatives<br>Phycoerythrin and derivatives<br>Squaraine and derivatives<br>Porphyrine and derivatives<br>Phthalocyanine and derivatives |
| #3 | Cationic and anionic derivatives of all the dyes in class #2. |

Table 2. Classes of fluorescent indicators (whether monomers or crosslinkers) which are selected to change their fluorescence properties upon binding (or complexing) of glyphosate analytes. Different to the meaning of "derivatives" in Table 1, where the term comprises structurally related substances that do not possess a binding site R, the term "derivatives" as used in Table 2 encompasses structurally related substances that possess a "binding site" (or receptor unit) R for the glyphosate analyte together with at least one polymerizable linker group P (e.g. groups comprising a double bond, such as a vinyl group, an acrylate, a methacrylate etc.), to generate the analyte specific MIP by polymerization of monomers and crosslinkers in presence of, i.e. in contact with, the respective glyphosate analyte, wherein the glyphosate analyte (and a phase transfer catalyst) serves as a template during molecular imprinting.

| Class | Fluorophore units F applicable in fluorescent indicators (fluorescent monomers and fluorescent crosslinkers) |
| --- | --- |
| #1 | Styryl derivatives, fully bridged<br>Pyrylium and thiopyrylium derivatives, fully bridged<br>Ruthenium, osmium or iridium complexes and derivatives<br>Squarylium and derivatives |
| #2 | Coumarin and derivatives<br>Dipyrromethene or BODIPY and derivatives<br>Pyrromethane and derivatives<br>Benzofuran and derivatives<br>Pyridine derivatives<br>Naphthalimide and derivatives<br>Benzoxazole and derivatives<br>Benzoxadiazole and derivatives<br>Benzindole and derivatives<br>DAPI and derivatives<br>Stilbene and derivatives, fully bridged<br>Oxazine and derivatives<br>Phenazine and derivatives<br>Perylene and derivatives<br>Azulene and derivatives<br>Styryl base derivatives, fully bridged<br>Phycoerythrin and derivatives<br>Squaraine and derivatives<br>Porphyrine and derivatives<br>Phthalocyanine and derivatives |

-continued

| Class | Fluorophore units F applicable in fluorescent indicators (fluorescent monomers and fluorescent crosslinkers) |
| --- | --- |
| #3 | Cationic derivatives of all the dyes in class #2. |
| #4 | Some examples of fluorescent crosslinker (II) and fluorescent monomers (I, III, IV) which can be used as glyphosate analyte indicators in the suggested layer structures and/or MIPs, wherein the fluorescent indicator typically comprises a molecule selected from classes #1 through #3: |

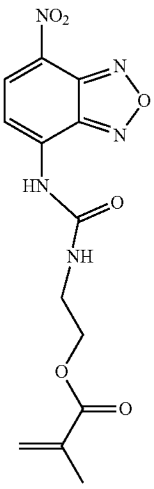

I

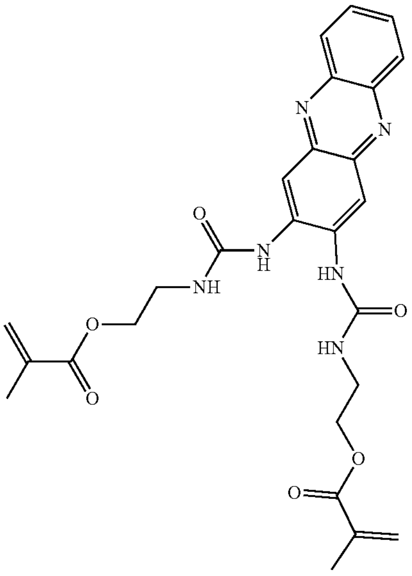

II

-continued

| Class | Fluorophore units F applicable in fluorescent indicators (fluorescent monomers and fluorescent crosslinkers) |
|---|---|
| | 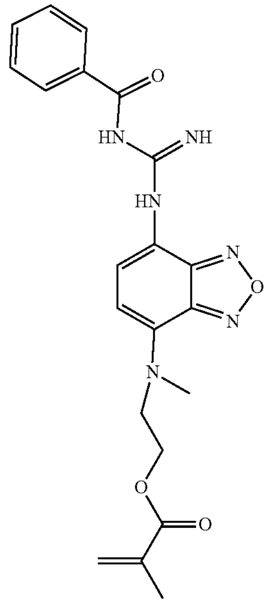 III |
| | 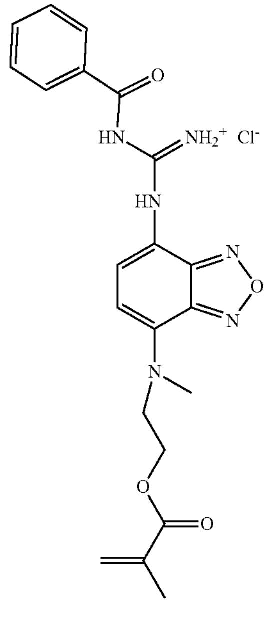 IV |

Suitable crosslinkers and indicators comprise at least three different functional units F, R, and P, i.e. a fluorophore F (selected from classes #1, #2, and #3), a binding site R which typically comprises a urea motif, and a polymerizable group P (e.g. the two terminal groups of substance II and the corresponding reactive group of substances I, III, IV). According to an embodiment other combinations, e.g. repetitive sequences of these three functional units are also possible, if at least one unit of every type is present. Without a binding site (urea motif) no analyte-specific response to the glyphosate analyte, i.e. change of a fluorescence signal, by the corresponding MIP and the layered structure comprising same can be detected. An indicator comprising merely a fluorophore selected from classes #1, #2, and #3 which is covalently linked to a urea motif can only sterically be entrapped within a polymer network and be used for forming a glyphosate analyte specific MIP. However, in view of thin polymer layers, which are preferred for a quick response time below 1 minute, the corresponding indicator might be washed out over time and the corresponding sensor be destroyed.

Thus, typically the fluorescent entities listed in Table 1 are furnished with a polymerizable unit, e.g. “P” in FIG. 38, for covalent attachment within a polymer network of the MIP during its synthesis. Advantageously, the polymerizable unit is selected such as to initiate its reaction with the same initiator as used to start the polymerization of monomer and crosslinker molecules, i.e. the polymerizable unit polymerizes under identical or at least similar reaction conditions. That allows for evenly distributed indicator molecules within the MIP and thus for reproducible signal stability, if core/shell particles comprising the suggested layer structure are measured in a suspended state, e.g. in a flow-through measurement set-up.

Furthermore, these entities are furnished with a binding (receptor) unit, e.g. “R” in FIG. 38, wherein the binding unit is adapted to coordinate the glyphosate analyte in an aqueous or organic solvent, typically by two hydrogen bonds provided by the two NH proton donors of a urea motif, by ionic interactions, and/or by electrostatic interactions. A urea motif comprises a suitable binding unit for the carboxylate group and/or for the phosphate group of the glyphosate analytes, respectively for their oxoanions. Other motifs usable as alternative binding units comprise thiourea, guanidine and guanidinium chloride, perchlorate and hexafluorophosphate.

A special feature of the fluorescent indicators which are used for detection of glyphosate analytes is that the characteristic change of fluorescence properties of the fluorescent indicator monomer or fluorescent indicator crosslinker in response to the glyphosate analyte are maintained after integration of the fluorescent indicator into the polymer network of the MIP. Typically, the conditions in the polymer network are such that steric changes to the fluorophore, such as cis/trans isomerization, are no longer possible because of steric hindrances. Suitable interaction mechanisms between the fluorophore (e.g. as monomer or crosslinker) and the glyphosate analyte are thus limited to hydrogen bonds and ionic or electrostatic interactions.

As to the mentioned above multiplexing approach, the second fluorescence may typically be generated by a fluorescent indicator or a probe molecule which is incorporated into the core particle. As to the incorporation, a mere physical entrapment or adsorption as well as a covalent linkage are possible, depending on core material and circumstances. However, as suggested herein, the fluorescent entity to be integrated into the MIP shell should be an indicator or a probe.

The terms “probe” and “indicator” are often used synonymously. “Molecular probe” (or “molecular indicator”) means that the probe/indicator molecules are sterically integrated (entrapped) into the core matrix, e.g. a polymer network. The terms “probe monomer” as well as “indicator monomer” (cf. #4 in the table above) however, mean that these molecules carry at least one reactive group that allows their covalent incorporation into the polymer network of the MIP during polymerization. Consequently, an indicator crosslinker would be an indicator with at least two polymerizable units. Of course, this is usually the more stable and preferred variant, but there are also indicators (probes)

where the synthetic effort for generating such a reactive derivative (of the indicator/probe) is too high and the path of steric incorporation into the polymer network is easier accessible.

FIG. 1 illustrates the synthetic path to and architecture of MIP@$SiO_2$: condensation and hydrolysis of TEOS for production of submicron silica particles (1), introduction of amino groups on silica surface (2), introduction of RAFT groups on silica surface (3), preparation of fluorescent imprinted polymer layer (4).

Figure 2:
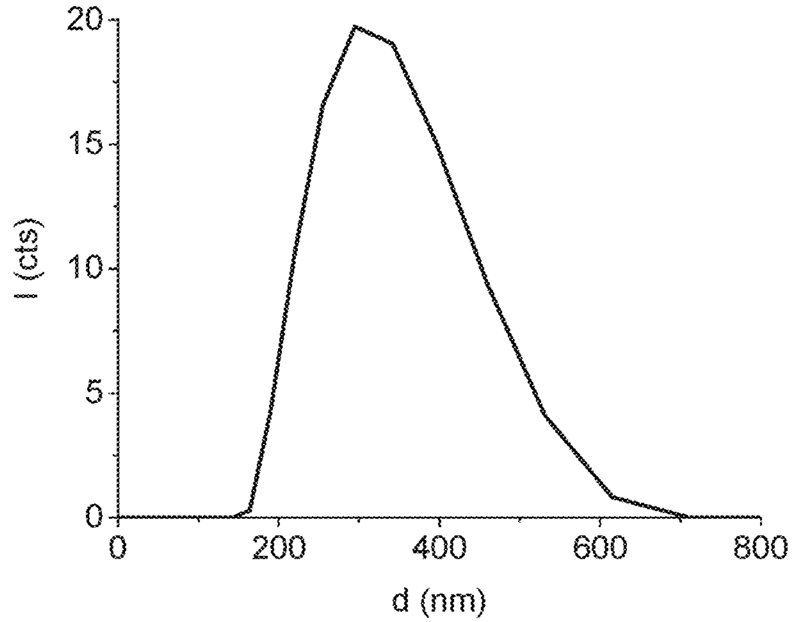
FIG. 2 illustrates the particle size distribution (polydispersity) of silica cores as used for fluorescent MIP particles determined by dynamic light scattering (DLS) according to example 1 described below.

In FIG. 2, the average size distribution for silica core formation according to example 1 described below is shown. In particular, the particle size of silica cores has been determined by dynamic light scattering, average diameter d=327.6±88.6 nm.

Figure 3:
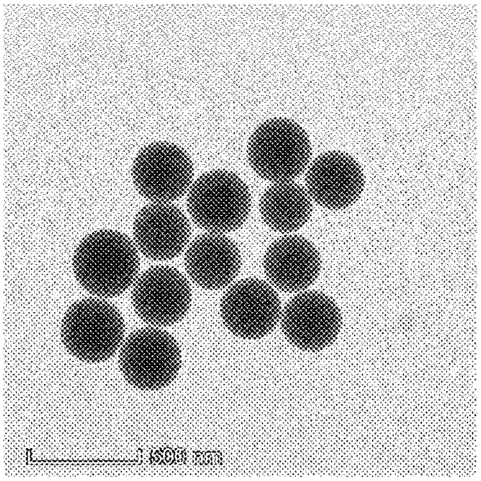
FIG. 3 illustrates a TEM image of silica cores as used for particle preparation according to example 1 described below.

FIG. 3 shows a TEM image of silica cores according to example 1 described below as used for preparation of GPS binding core/shell particles. Average diameter of the particles is 275.8±18.85 nm.

Figure 4:
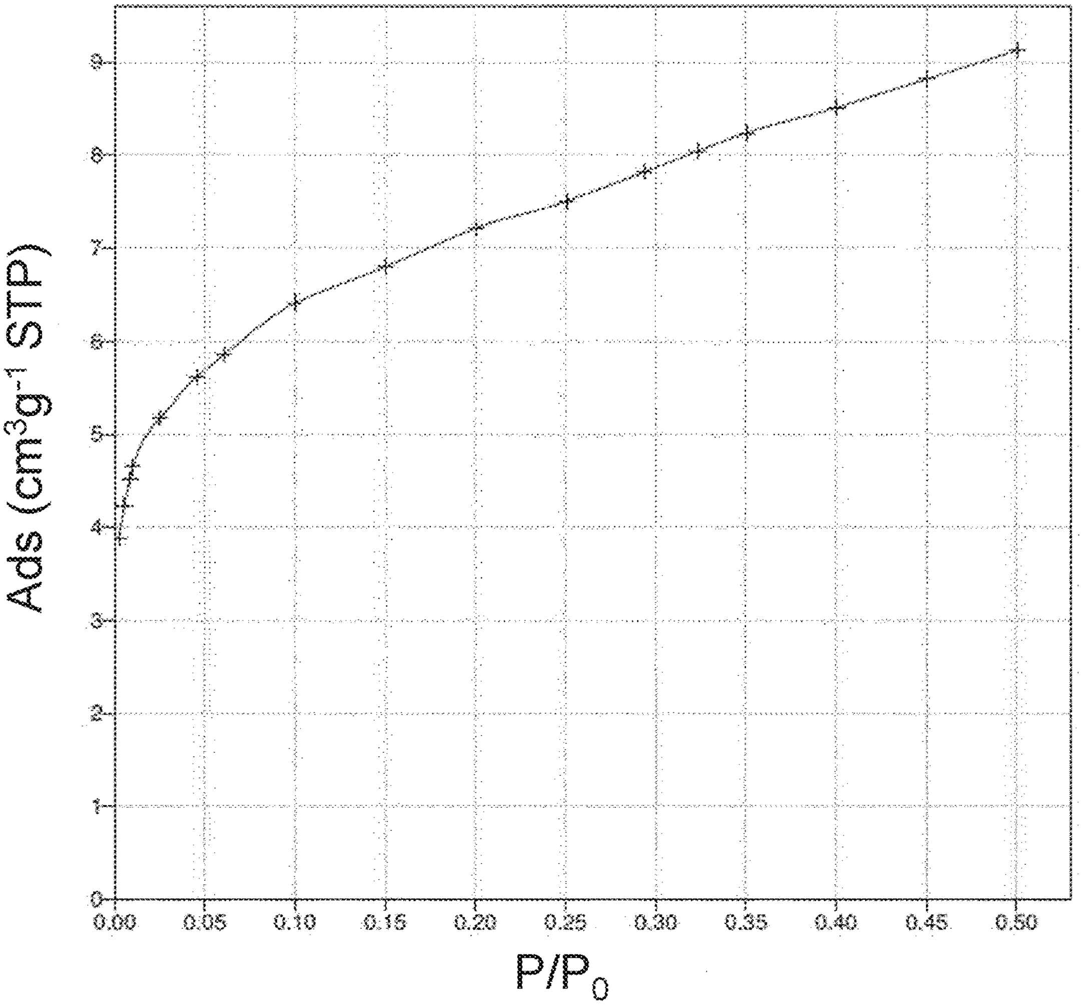
FIG. 4 shows the adsorption of $N_{2(g)}$ by the silica particles with increasing gas pressure for determination of the Brunauer-Emmett-Teller (BET) surface area according to example 1 described below.

FIG. 4 shows the adsorption of $N_{2(g)}$ by the silica particles with increasing gas pressure for determination of the surface area of the particles using the Brunauer-Emmett-Teller (BET) model, found to be 25.95 $m^2$ $g^{-1}$ of particles (y axis—adsorbed $N_{2(g)}$, $cm^3$ $g^{-1}$ of particles, x axis—relative gas pressure, $P/P_0$).

Figure 5:
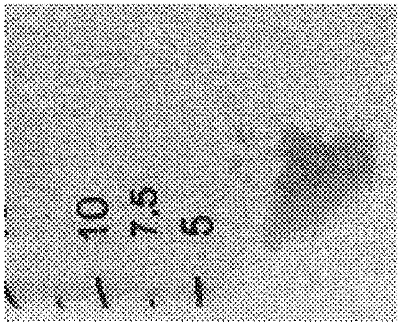
FIG. 5 is a photograph of the RAFT agent-modified APTES@$SiO_2$, i.e. of RAFT@$SiO_2$ particles in a centrifuge vial according to example 1 described below.

FIG. 5 is a photograph of the RAFT agent-modified APTES@$SiO_2$, showing the typical pink color of the RAFT agent. The modification yields RAFT@$SiO_2$ particles. Elemental analysis of the sulphur content of the particles enables quantification of RAFT groups, found to be 0.041 mmol RAFT groups $g^{-1}$ of particles. Based on BET surface area of the unfunctionalized silica particles, grafting density is calculated as 0.95 RAFT molecules $nm^{-2}$.

Figure 6:
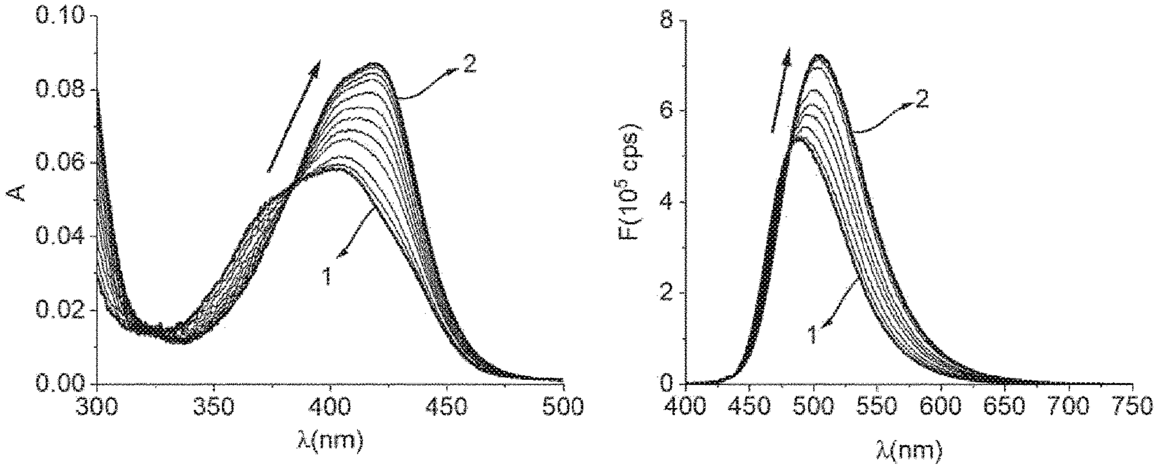
FIG. 6 illustrates absorption (left) and fluorescence (right) spectra following titration of deprotonated glyphosate (GPS THA) with fluorescent crosslinker II. Herein the abbreviation GPS THA stands for the tetrahexylammonium salt of glyphosate.

FIG. 6 shows spectral changes (left: absorbance, right: fluorescence–$\lambda_{excitation}$=385 nm) in fluorescent crosslinker II after titration with increasing amount of GPS THA. The choice of counterion allows to control performance when II is integrated into a MIP. For instance, THA as the dimensionally larger, more hydrophobic counterion facilitates phase-transfer (if the analyte is in an aqueous solution and the MIP particles are in an organic solution) yet aggravates discrimination between GPS and its metabolites or other carboxylate-expressing pesticides. TBA as counterion on the other hand does not allow for phase-transfer but enables to discriminate against other carboxylate-expressing pesticides such as 2,4-D and Dicamba. The fluorescent crosslinker changes its fluorescence in the presence of the analyte GPS by "complexing" one GPS molecule at a time. The spectrum which is marked "1" is of the fluorescent crosslinker II alone, while the spectrum which is marked "2" shows the response of the monomer after addition of 85 equivalents of GPS THA. A ca. 20-nm red shift in the absorption and fluorescence spectra coupled with increased absorption and fluorescence intensities indicates a hydrogen bond formation between fluorescent crosslinker II and GPS THA. Log $K_b$=4.53 (determined using BindFit® software available via http://www.supramolecular.org; http://app.supramolecular.org/bindfit/).

As to the mentioned phase-transfer of the glyphosate analyte, i.e. its extraction by an organic solvent from an aqueous sample matrix such as, e.g., a surface or ground water sample into the organic solvent by liquid-liquid extraction, we note that the selection of a suitable phase transfer agent comprising, e.g., THA, TBA, tetrabutylphosphonium or tetrahexylphosphonium cations, can advantageously be used for facilitating analyte detection. The lower limits of detection for glyphosate analytes can be improved (further be lowered), as the lipophilic cations ameliorate extraction efficiency to>95%.

Figure 7:
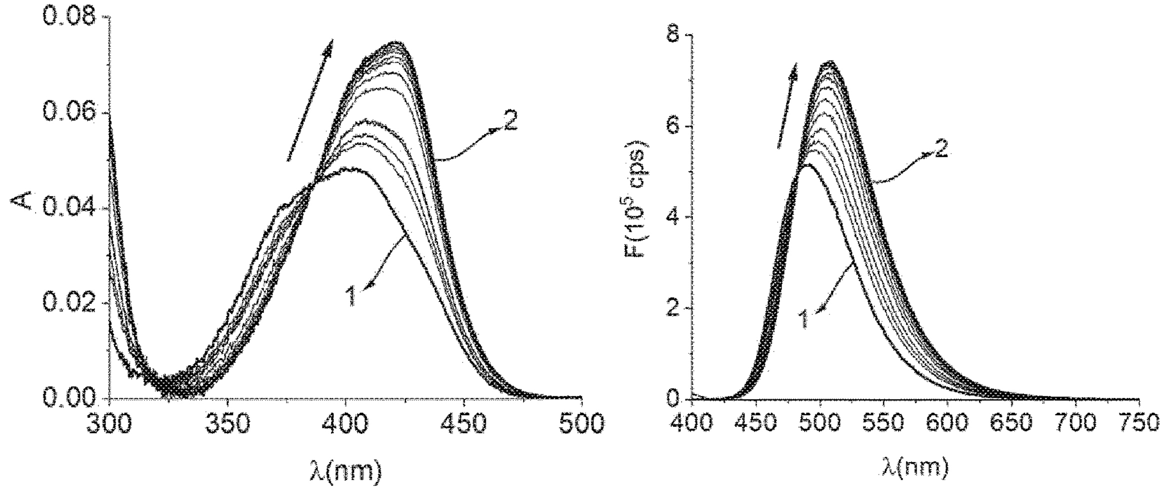
FIG. 7 illustrates absorption (left) and fluorescence (right) spectra following titration of deprotonated methylphosphonic acid (MPA THA). MPA, which is a metabolite of GPS was used as a "dummy" template in the non-imprinted polymer (NIP), with fluorescent crosslinker II.

FIG. 7 shows spectral changes of the fluorescent crosslinker II after titration with increasing amount of MPA THA, which is a metabolite of GPS and was used as a dummy template in NIP preparation. In particular, FIG. 7 shows (left: absorbance, right: fluorescence; $\lambda_{excitation}$=385 nm) in fluorescent crosslinker II after titration with increasing amount of MPA THA. The spectrum which is marked "1" is of the fluorescent crosslinker II alone, while the spectrum which is marked "2" shows the response of the monomer after addition of 4 equivalents of MPA THA. A ca. 20-nm red shift in the absorption and fluorescence spectra respectively, coupled with increased absorption and fluorescence intensities indicates hydrogen bond formation between fluorescent crosslinker II and MPA THA. Log $K_b$=5.61 (determined using BindFit® software). As to non-imprinted polymer (NIP) required for comparison purposes, we observed that the polymer we used is unsuitable as a control because its properties, especially its wetting behavior, are completely different from those of polymers obtained by RAFT in the presence of structurally related small molecules under otherwise identical conditions. Therefore, for comparison (i.e. negative control) the MIP was imprinted with another compound, particularly with MPA THA instead of GPS THA. A NIP prepared without the highly polar and charged template is simply too hydrophobic so that it behaves too differently from the MIP and is not a good control for non-specific binding. Thus, according to the present embodiment, "dummy templating" is the better way to establish selectivity of the suggested layer structures.

Figure 8:
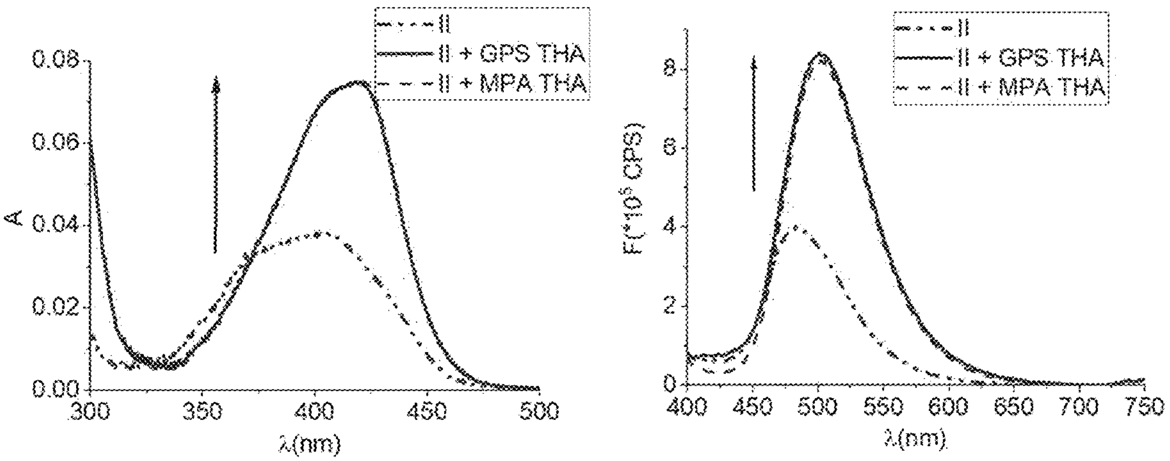
FIG. 8 illustrates absorption (left) and fluorescence spectra (right) of the prepolymerization mixture before synthesis of MIPII@$SiO_2$ (with GPS THA) and NIPII@$SiO_2$ (with MPA THA). The spectra of II+GPS THA and II+MPA THA overlap largely.

FIG. 8 illustrates spectra of the prepolymerization mixture (left: absorbance, right: fluorescence; $\lambda_{excitation}$=385 nm) containing fluorescent crosslinker II and other non-fluorescent monomers before and after addition of GPS THA/MPA THA templates. The spectra for II+GPS THA and II+MPA THA overlap largely.

Figure 9:
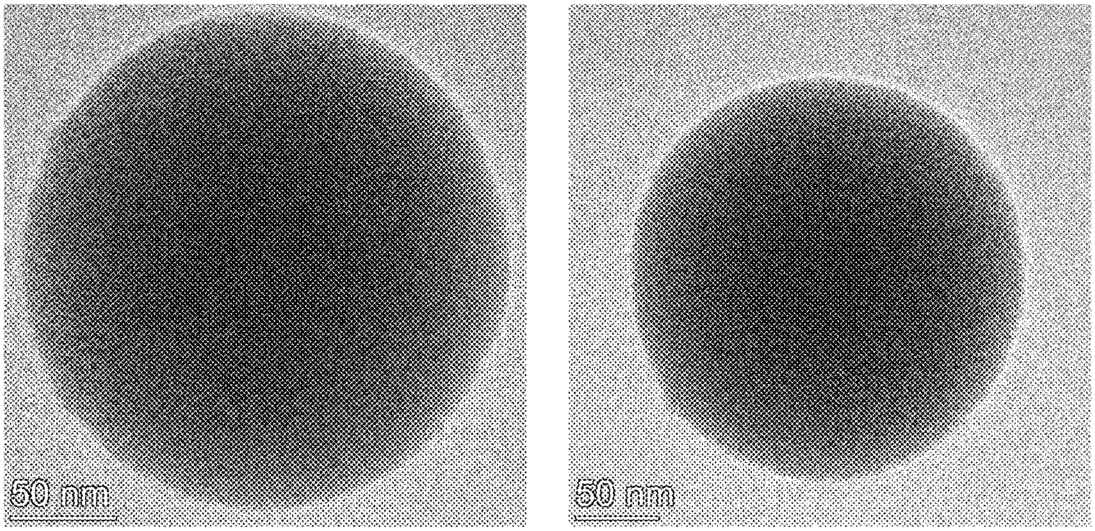
FIG. 9 shows two TEM images of MIPII@$SiO_2$ (imprinted with GPS THA, left) and NIPII@$SiO_2$ (imprinted with dummy template MPA THA, right).

FIG. 9 shows two representative TEM images of MIPII@$SiO_2$ (imprinted with GPS THA) and NIPII@$SiO_2$ (imprinted with dummy template MPA THA) particles comprising a fluorescent polymer layer.

Figure 10:
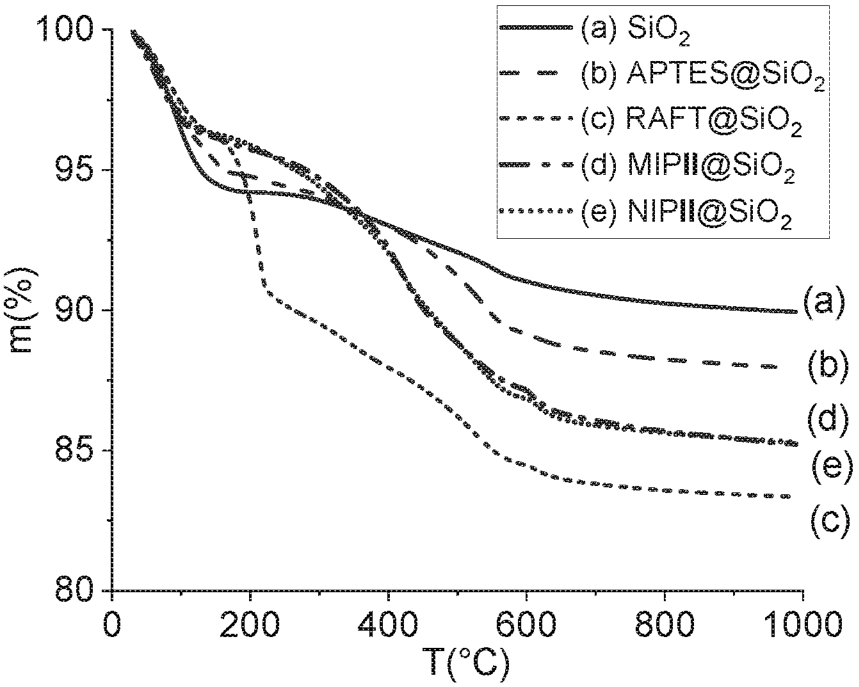
FIG. 10 shows the thermal gravimetric analysis data of silica nanoparticles, APTES@$SiO_2$, RAFT@$SiO_2$ as well as MIPII@$SiO_2$ and NIPII@$SiO_2$.

FIG. 10 shows mass loss of silica nanoparticles (a), APTES@$SiO_2$ (b), RAFT@$SiO_2$ (c) as well as MIPII@$SiO_2$ (d) and NIPII@$SiO_2$ (e) after treatment by thermal gravimetric analysis (TGA). The samples were heated progressively from 30° C. to 1000° C. and weight loss was monitored.

Figure 11:
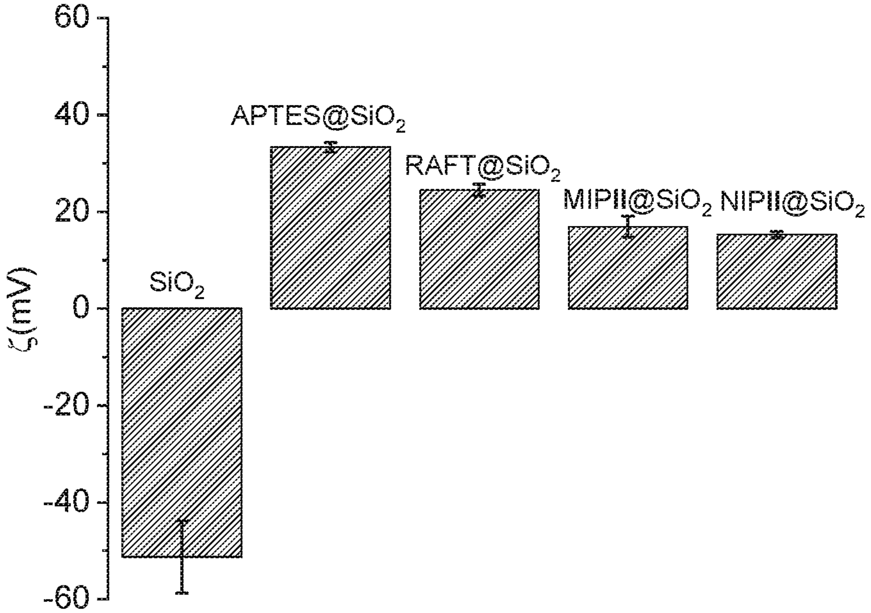
FIG. 11 shows the zeta potential values of silica nanoparticles, APTES@$SiO_2$, RAFT@$SiO_2$ as well as MIPII@$SiO_2$ and NIPII@$SiO_2$.

FIG. 11 shows the zeta potential values of 0.1 mg $mL^{-1}$ aqueous suspensions of silica nanoparticles, APTES@$SiO_2$, RAFT@$SiO_2$ as well as MIPII@$SiO_2$ and NIPII@$SiO_2$. The zeta potential changes with the different functionalization steps.

Figure 12:
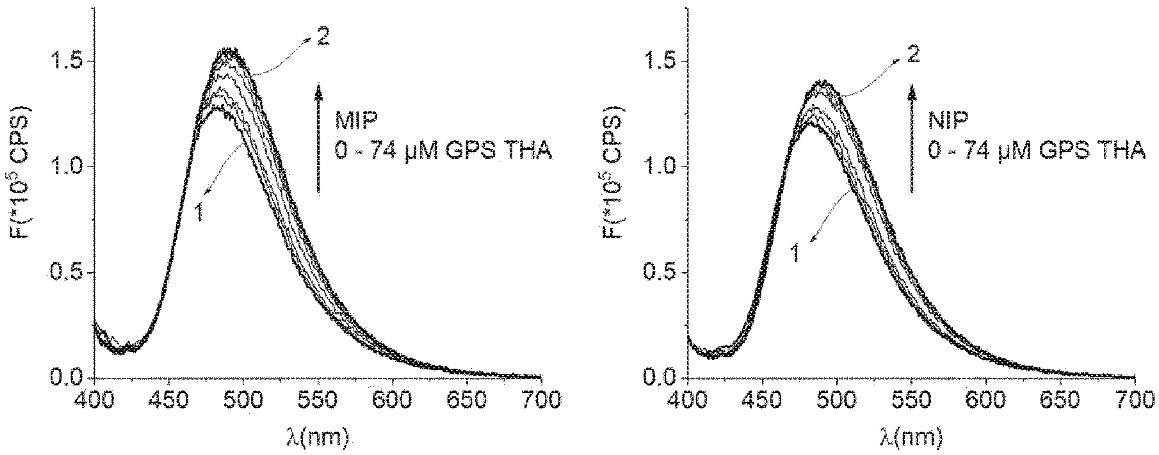
FIG. 12 illustrates a fluorescence titration of MIPII@$SiO_2$ (imprinted with GPS THA, left) and NIPII@$SiO_2$ (imprinted with dummy template MPA THA, right), upon addition of increasing amounts of GPS THA in chloroform.

FIG. 12 illustrates the fluorescence response of 1 mg $mL^{-1}$ suspensions of MIPII@$SiO_2$ (left) and NIPII@$SiO_2$ (right) in chloroform after titration with up to 74 μM GPS THA ($\lambda_{excitation}$=385 nm). The MIP was imprinted with GPS THA and the NIP with MPA THA as dummy template. The figure shows a greater increase of the MIP's fluorescence compared to the NIP upon addition of increasing amounts of GPS THA to the solution.

Figure 13:
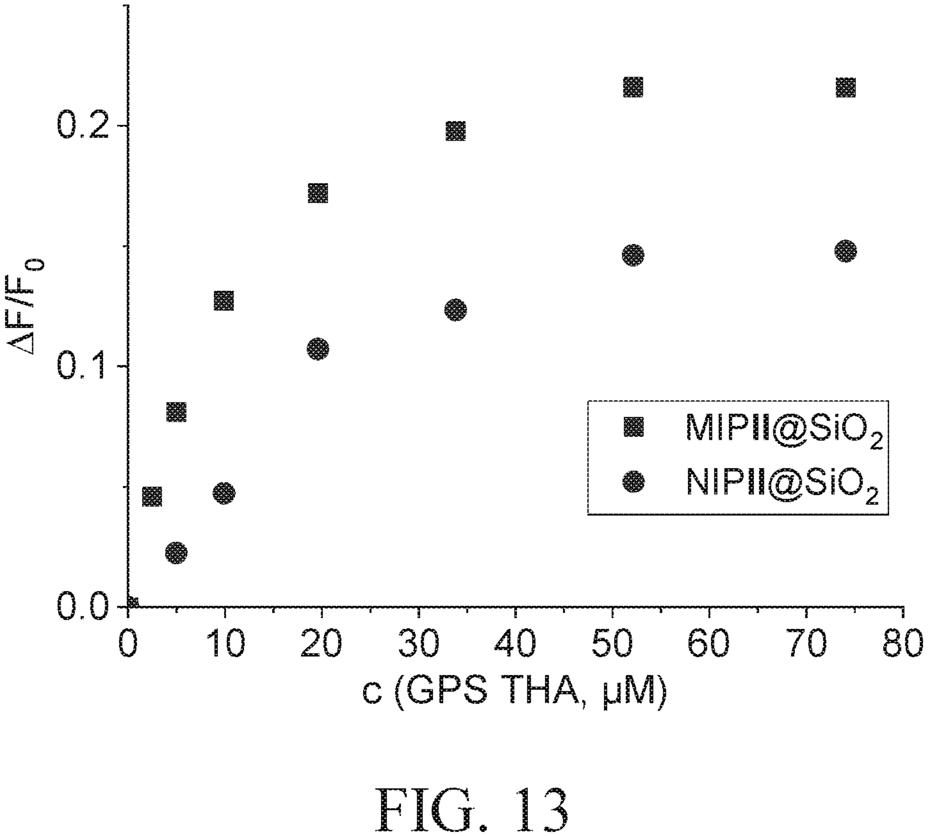
FIG. 13 shows a comparison of the fluorescence response of MIPII@$SiO_2$ and NIPII@$SiO_2$ after titration with GPS THA in chloroform.

FIG. 13 shows a comparison of fluorescence response of MIPII@$SiO_2$ and NIPII@$SiO_2$ after titration with GPS THA. $\Delta F/F_0=F_x-F_0$; $F_x$: fluorescence intensity at maximum for each step of GPS addition; $F_0$: fluorescence intensity at maximum before addition of GPS THA. The imprinting factor was calculated from the ratio of $\Delta F/F_0$ of MIP and NIP and was found to be 1.46.

Figure 14:
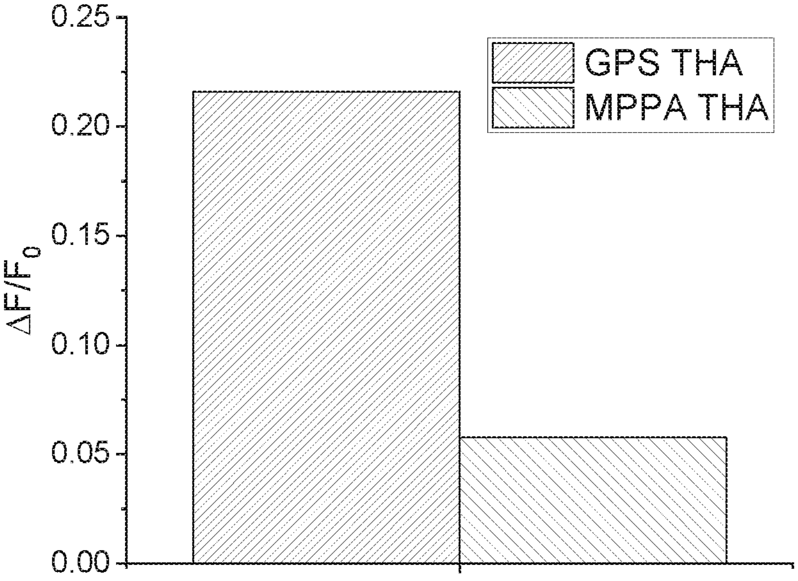
FIG. 14 shows a comparison of the fluorescence response of MIPII@$SiO_2$ to GPS THA and a similarly structured molecule, deprotonated 3-methylphosphinicopropionic acid (MPPA THA) after titration in chloroform.

FIG. 14 illustrates a comparison of fluorescence response of MIPII@$SiO_2$ to GPS THA and a structurally similar molecule, 3-methylphosphinicopropionic acid (MPPA THA). The discrimination factor was calculated from the ratio of $\Delta F/F_0$ of MIP against GPS THA and MPPA THA and was found to be 3.74.

Figure 15:
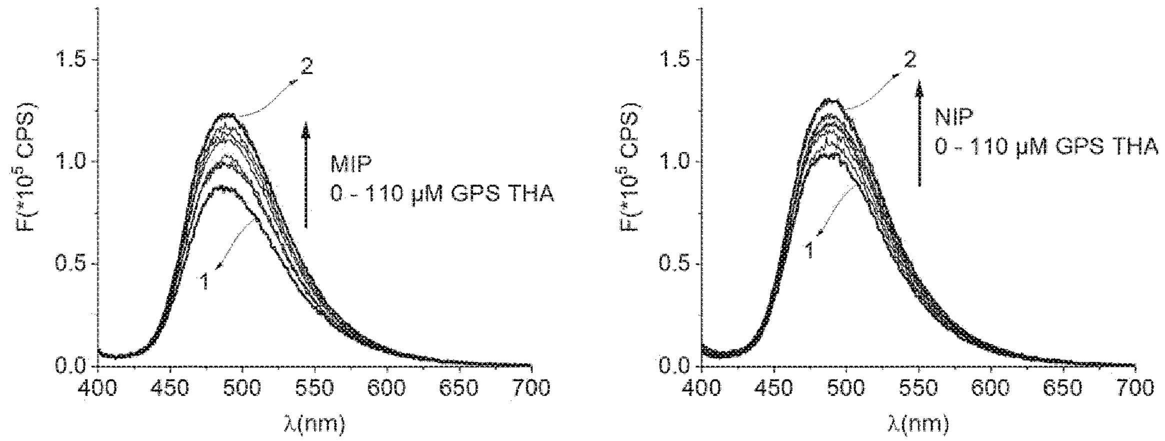
FIG. 15 shows the results of a biphasic fluorescence titration of MIPII@$SiO_2$ (imprinted with GPS THA, left) and NIPII@$SiO_2$ (imprinted with dummy template MPA THA, right), upon addition of increasing amounts of GPS THA in water. Sensing particles are contained in the lower chloroform phase and template is added to the upper aqueous phase.

FIG. 15 illustrates the fluorescence response of 1 mg $mL^{-1}$ suspensions of MIPII@$SiO_2$ (imprinted with GPS THA) and NIPII@$SiO_2$ (imprinted with dummy template MPA THA) after titration with up to 110 μM of aqueous GPS THA template in a biphasic system. Sensing particles are suspended in a lower chloroform phase and aqueous template solution is progressively added to 1 mL of an upper aqueous phase ($\lambda_{excitation}$=385 nm). The figure shows a greater increase of the MIP's fluorescence compared to the NIP upon addition of increasing amounts of GPS THA to the solution.

Figure 16:
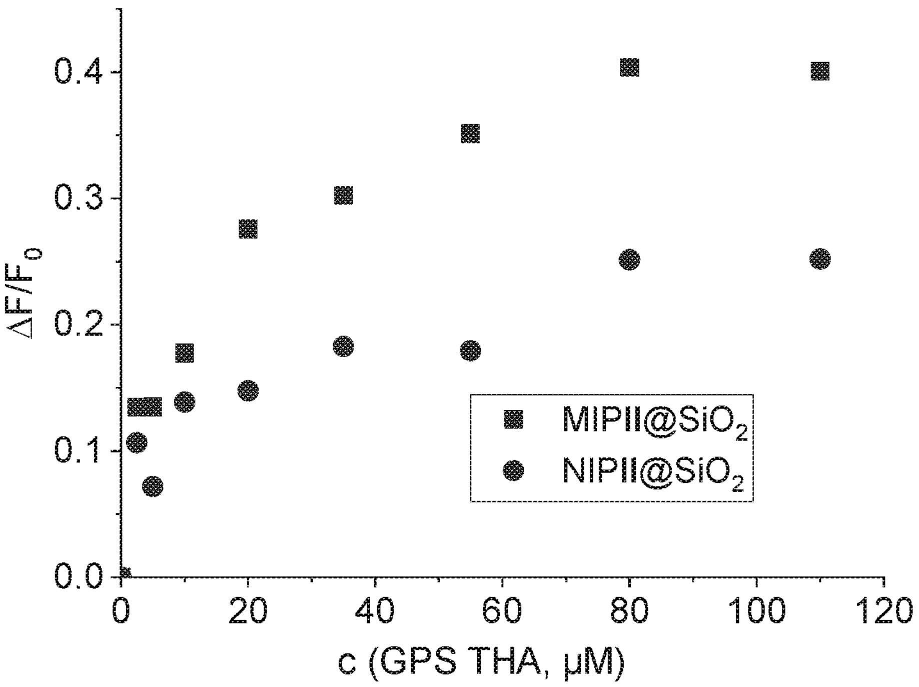
FIG. 16 compares the fluorescence response of MIPII@$SiO_2$ and NIPII@$SiO_2$ after titration with GPS THA in biphasic titrations in chloroform/water.

FIG. 16 compares the fluorescence response of MIPII@$SiO_2$ and NIPII@$SiO_2$ after titration with GPS THA in biphasic titrations in chloroform/water. $\Delta F/F_0=F_x-F_0$; $F_x$: fluorescence intensity at maximum for each step of GPS addition; $F_0$: fluorescence intensity at maximum before addition of GPS THA. The imprinting factor was calculated from the ratio of $\Delta F/F_0$ of MIP and NIP and was found to be 1.60.

Figure 17:
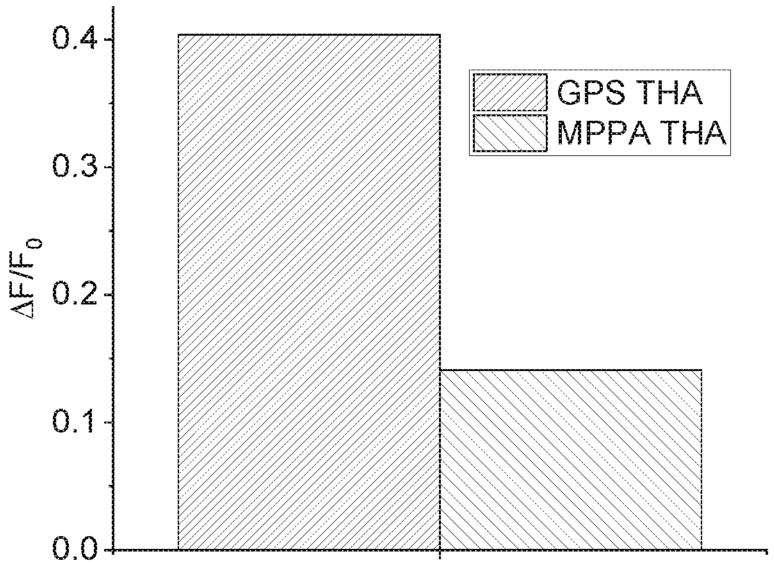
FIG. 17 shows a comparison of the fluorescence response of MIPII@$SiO_2$ to GPS THA and a similarly structured molecule, deprotonated 3-methylphosphinicopropionic acid (MPPA THA) after biphasic titration in chloroform/water.

FIG. 17 shows a comparison of the fluorescence response of MIPII@$SiO_2$ to GPS THA and a similarly structured molecule, deprotonated 3-methylphosphinicopropionic acid (MPPA THA) after biphasic titration in chloroform/water. The discrimination factor of the MIP against MPPA THA was determined to 2.87 from the ratio of $\Delta F/F_0$.

Figure 18:
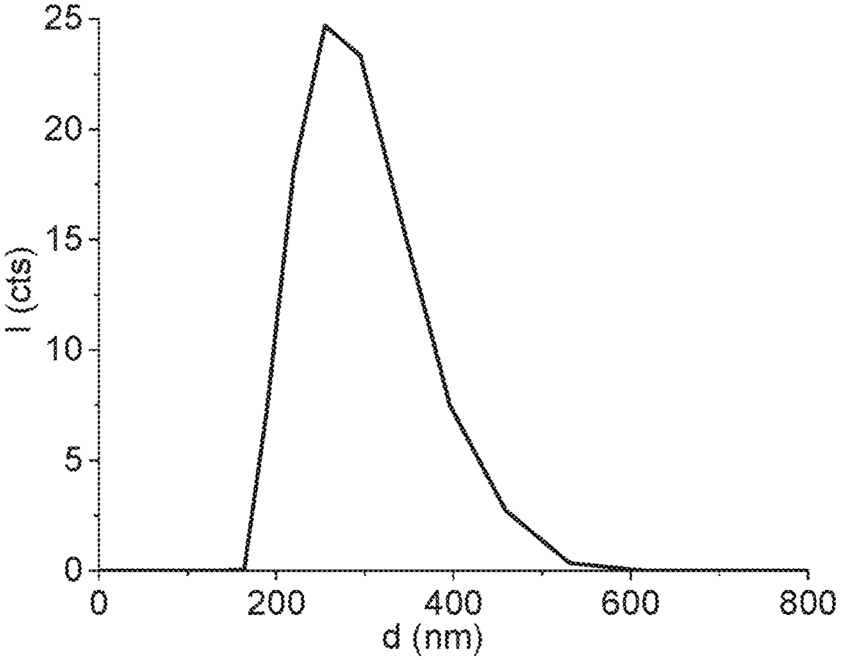
FIG. 18 illustrates the particle size distribution (polydispersity) of silica cores as used for fluorescent MIP particles determined by dynamic light scattering (DLS) according to example 2 and 3 described below.

In FIG. 18, the average size distribution for silica core formation according to example 2 and 3 described below is shown. In particular, the particle size of silica cores has been determined by dynamic light scattering, average diameter d=284±59.6 nm.

Figure 19:
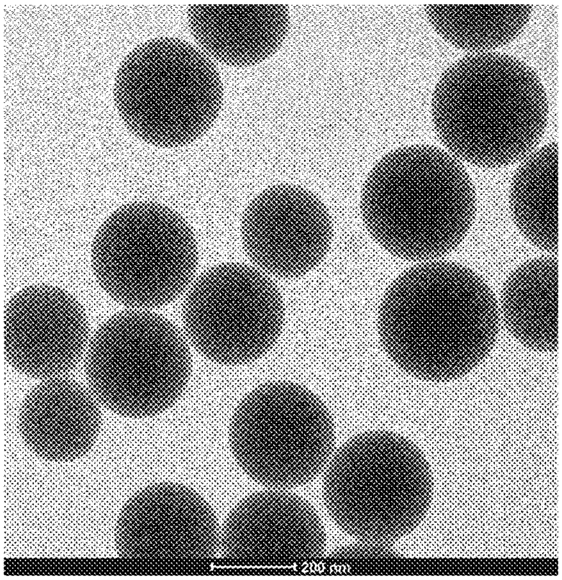
FIG. 19 illustrates a TEM image of silica cores as used for particle preparation according to example 2 and 3 described below.

FIG. 19 shows a TEM image of silica cores according to example 2 and 3 described below as used for preparation of GPS binding core/shell particles. Average diameter of the particles is 272.3±22.03 nm.

Figure 20:
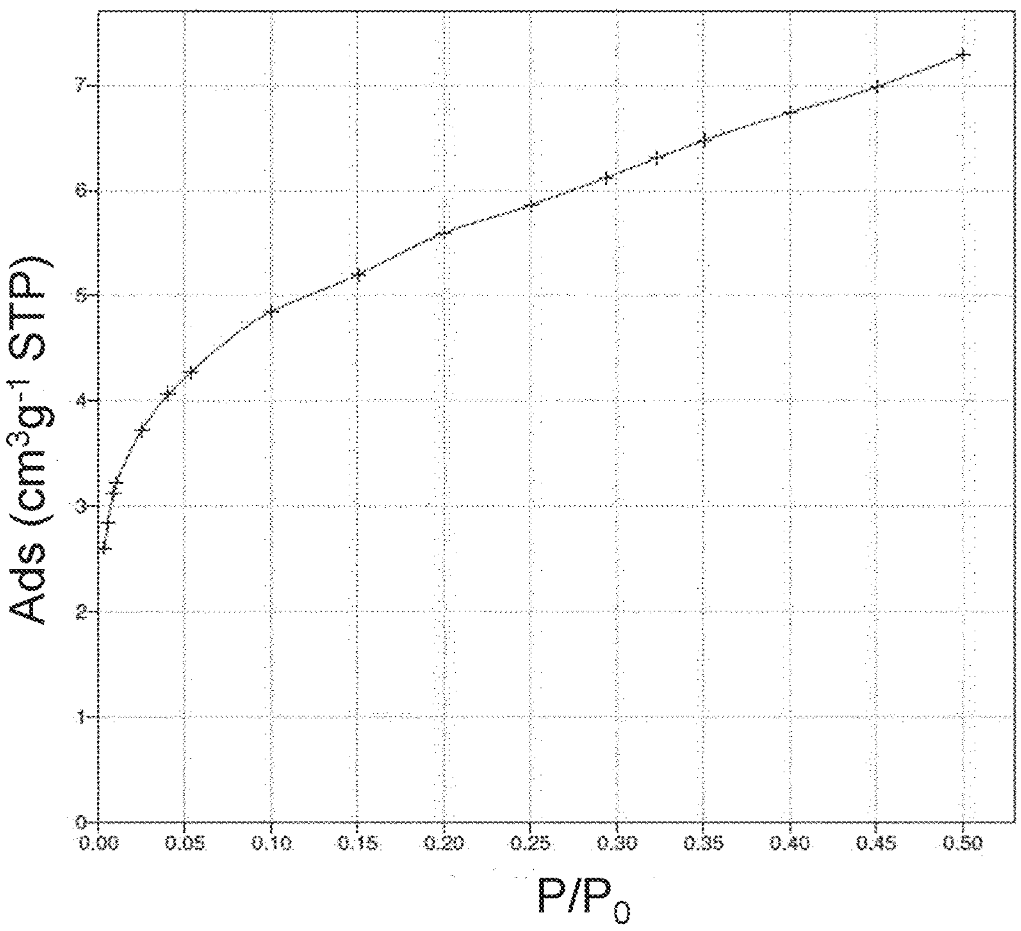
FIG. 20 shows the adsorption of $N_{2(g)}$ by the silica particles with increasing gas pressure for determination of the Brunauer-Emmett-Teller (BET) surface area according to example 2 and 3 described below.

FIG. 20 shows the adsorption of $N_{2(g)}$ by the silica particles with increasing gas pressure for determination of the surface area of the particles using the Brunauer-Emmett-Teller (BET) model, found to be 20.06 $m^2$ $g^{-1}$ of particles (y axis—adsorbed $N_{2(g)}$, $cm^3$ $g^{-1}$ of particles, x axis—relative gas pressure, $P/P_0$).

Figure 21:
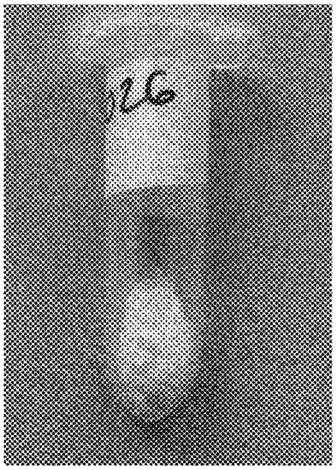
FIG. 21 is a photograph of the RAFT agent-modified APTES@$SiO_2$, i.e. of RAFT@$SiO_2$ particles in a centrifuge vial according to example 2 and 3 described below.

FIG. 21 is a photograph of the RAFT agent-modified APTES@$SiO_2$, showing the typical pink color of the RAFT agent. The modification yields RAFT@$SiO_2$ particles. Elemental analysis of the sulphur content of the particles enables quantification of RAFT groups, found to be 0.033 mmol RAFT groups/g of particles. Based on BET surface area of the unfunctionalized silica particles, grafting density is calculated as 0.99 RAFT molecules $nm^2$.

Figure 22:
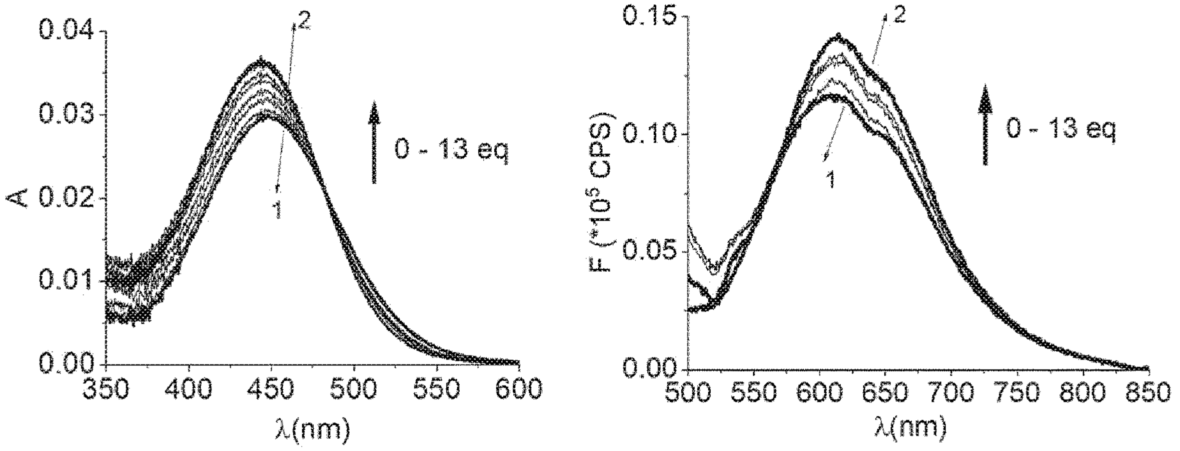
FIG. 22 illustrates absorption (left) and fluorescence (right) spectra following titration of glyphosate (GPS) in water with fluorescent probe III in acetonitrile.

FIG. 22 shows spectral changes (left: absorbance, right: fluorescence-$\lambda_{excitation}$=450 nm) in fluorescent monomer III in acetonitrile after titration with increasing amount of an aqueous solution of GPS. The fluorescent linker changes its fluorescence in the presence of the analyte GPS by "complexing" one GPS molecule at a time. Spectrum marked "1" is of the fluorescent monomer III alone, while spectrum marked "2" shows the response of the monomer after addition of 13 equivalents of GPS. A 5-nm blue shift is observed in the absorption accompanied by a signal increase, while the fluorescent signal increases. Complexation occurs by hydrogen-bond assisted ion pairing between fluorescent monomer III in acetonitrile and GPS in water. Log $K_b$=4.05 (determined using BindFit® software available via http://www.supramolecular.org; http://app.supramolecular.org/bindfit/).

Figure 23:
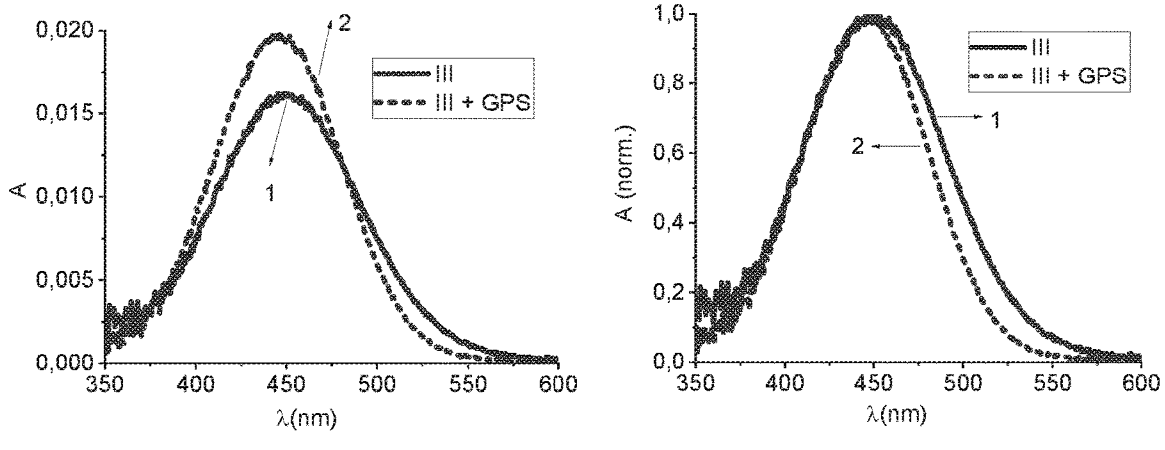
FIG. 23 illustrates absorption spectra (left) and normalized absorption spectra (right) of the prepolymerization mixture before synthesis of MIPIII@$SiO_2$ (with GPS) and NIPIII@$SiO_2$ (without GPS).

FIG. 23 illustrates spectra of the prepolymerization mixture (left: absorbance, right: normalized absorbance) containing fluorescent monomer III and other non-fluorescent monomers before (1) and after (2) addition of GPS template.

Figure 24:
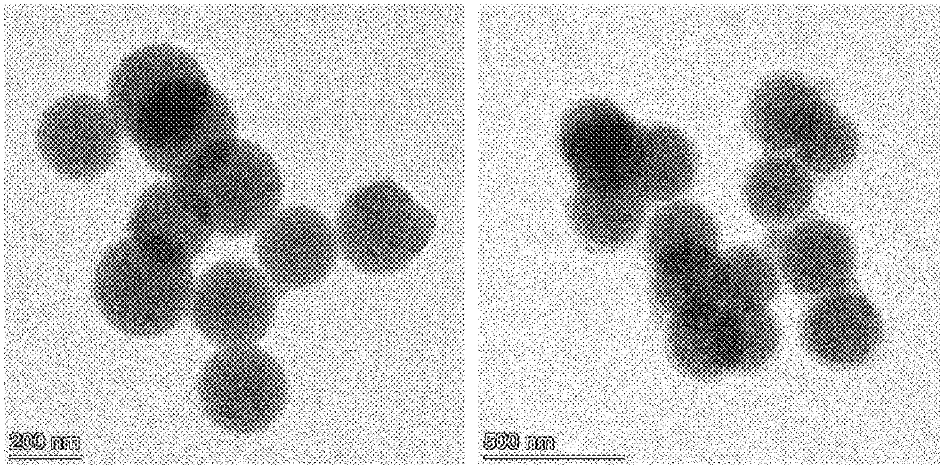
FIG. 24 shows two TEM images of MIPIII@$SiO_2$ (imprinted with GPS, left) and NIPIII@$SiO_2$ (imprinted without template, right).

FIG. 24 shows two representative TEM images of MIPIII@$SiO_2$ (imprinted with GPS) and NIPIII@$SiO_2$ (imprinted without template) particles comprising a fluorescent polymer layer.

Figure 25:
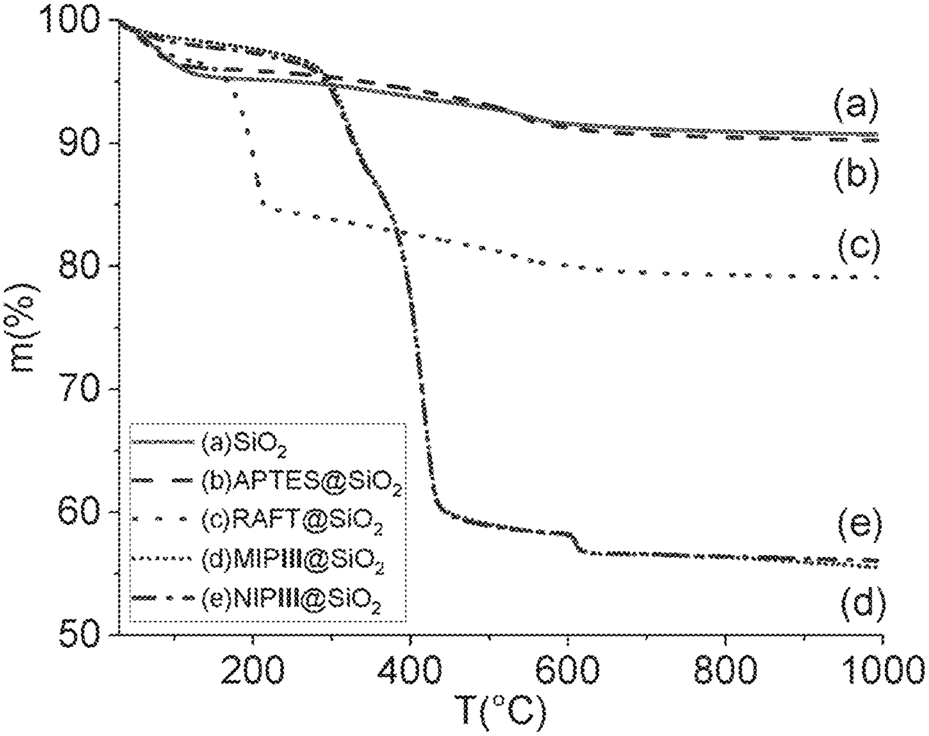
FIG. 25 shows the thermal gravimetric analysis data of silica nanoparticles, APTES@$SiO_2$, RAFT@$SiO_2$ as well as MIPIII@$SiO_2$ and NIPIII@$SiO_2$.

FIG. 25 shows mass loss of silica nanoparticles (a), APTES@$SiO_2$ (b), RAFT@$SiO_2$ (c) as well as MIPIII@$SiO_2$ (d) and NIPIII@$SiO_2$ (e) after treatment by thermal gravimetric analysis (TGA). The samples were heated progressively from 30° C.to 1000° C. and weight loss was monitored.

Figure 26:
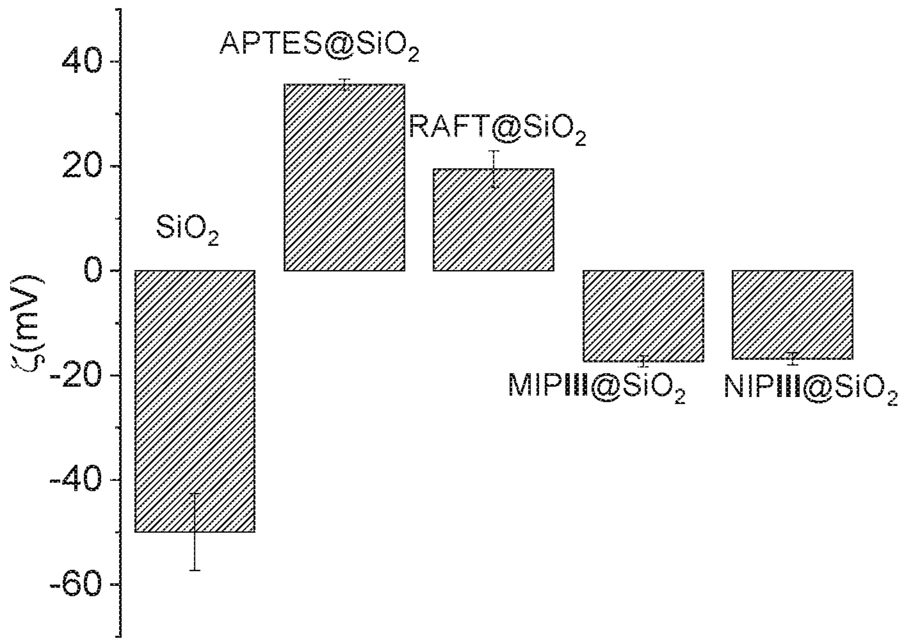
FIG. 26 shows the zeta potential values of silica nanoparticles, APTES@$SiO_2$, RAFT@$SiO_2$ as well as MIPIII@$SiO_2$ and NIPIII@$SiO_2$.

FIG. 26 shows the zeta potential values of 0.04 mg $mL^{-}1$ aqueous suspensions of silica nanoparticles, APTES@$SiO_2$, RAFT@$SiO_2$ as well as MIPIII@$SiO_2$ and NIPIII@$SiO_2$. The zeta potential changes with the different functionalization steps.

Figure 27:
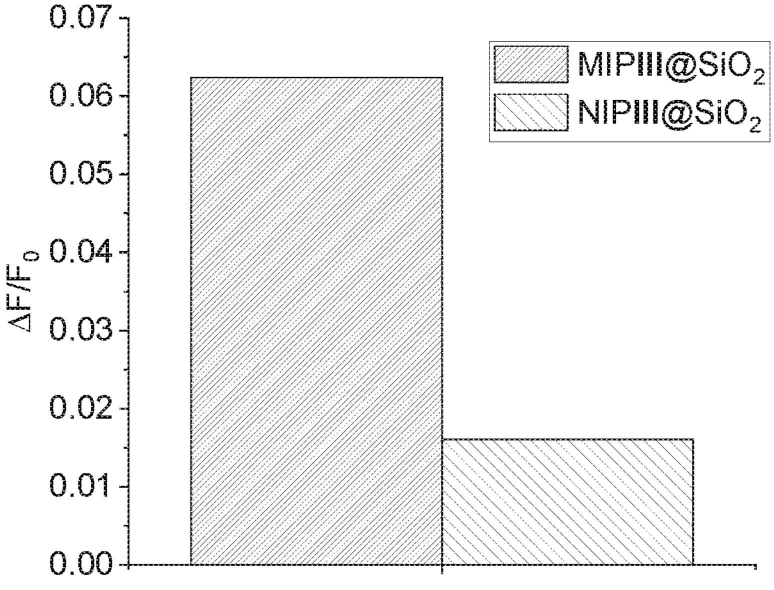
FIG. 27 shows a comparison of the fluorescence response of MIPIII@$SiO_2$ and NIPIII@$SiO_2$ suspended in acetonitrile after titration with an aqueous solution of GPS.

FIG. 27 compares the fluorescence response of MIPIII@$SiO_2$ and NIPIII@$SiO_2$ after titration with GPS. The particles were suspended in acetonitrile and an aqueous solution of GPS was added (0-24 μM). $\Delta F/F_0=F_x-F_0$; $F_x$: fluorescence intensity at maximum for each step of GPS addition; $F_0$: fluorescence intensity at maximum before addition of GPS. The imprinting factor was calculated from the ratio of $\Delta F/F_0$ of MIP and NIP and was found to be 4.

Figure 28:
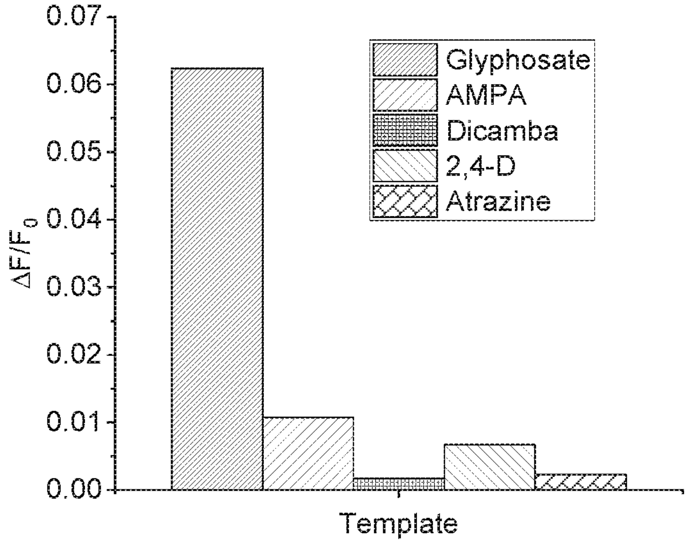
FIG. 28 shows a comparison of the fluorescence response of MIPIII@$SiO_2$ suspended in acetonitrile to aqueous solutions of GPS, aminomethylphosphonic acid (AMPA) and dicamba and acetonitrile solutions of 2,4-dichlorophenoxyacetic acid and atrazine.

FIG. 28 illustrates a comparison of fluorescence response of MIPIII@$SiO_2$ suspended in acetonitrile to aqueous solutions of GPS, aminomethylphosphonic acid (AMPA) and dicamba and acetonitrile solutions of 2,4-dichlorophenoxyacetic acid (2,4-D) and atrazine. In all cases, up to 24 μM of template was added. AMPA is the main metabolite of GPS, while Dicamba, 2,4-D and atrazine are commonly used herbicides. The discrimination factors were calculated from the ratio of $\Delta F/F_0$ for GPS and the metabolites. $DF_{GPS/AMPA}$=5.8, $DF_{GPS/Dicamba}$=36.0, $DF_{GPS/}$2,4-D=9.3 and $DF_{GPS/atrazine}$=27.7.

Figure 29:
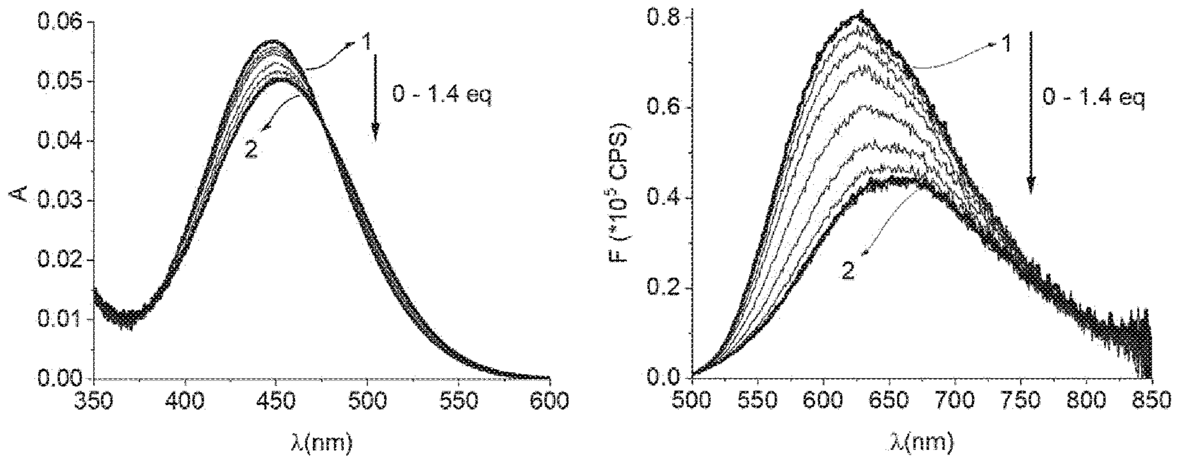
FIG. 29 illustrates absorption (left) and fluorescence (right) spectra following titration of deprotonated glyphosate (GPS TBA) with fluorescent probe IV in chloroform. Herein the abbreviation GPS TBA stands for the tetrabutylammonium salt of glyphosate.

FIG. 29 shows spectral changes (left: absorbance, right: fluorescence-$\lambda_{excitation}$=474 nm) in fluorescent probe IV after titration with increasing amount of GPS TBA. As already mentioned, the choice of the counterion allows to control performance. Even if TBA as counterion does not allow for phase-transfer, it enables to discriminate against other carboxylate-expressing pesticides such as 2,4-D and Dicamba. The fluorescent linker changes its fluorescence in the presence of the analyte GPS by "complexing" one GPS molecule at a time. The spectrum which is marked "1" is of the fluorescent probe IV alone, while the spectrum which is marked "2" shows the response of the monomer after addition of 1.4 equivalents of GPS TBA. A ca. 10-nm red shift is observed in the absorption fluorescence spectra respectively, coupled with reduced absorption and fluorescence intensities indicating hydrogen bond formation between fluorescent probe IV and GPS TBA. Log $K_b$=7.54 (determined using BindFit® software available via http://www.supramolecular.org; http://app.supramolecular.org/bindfit/).

Figure 30:
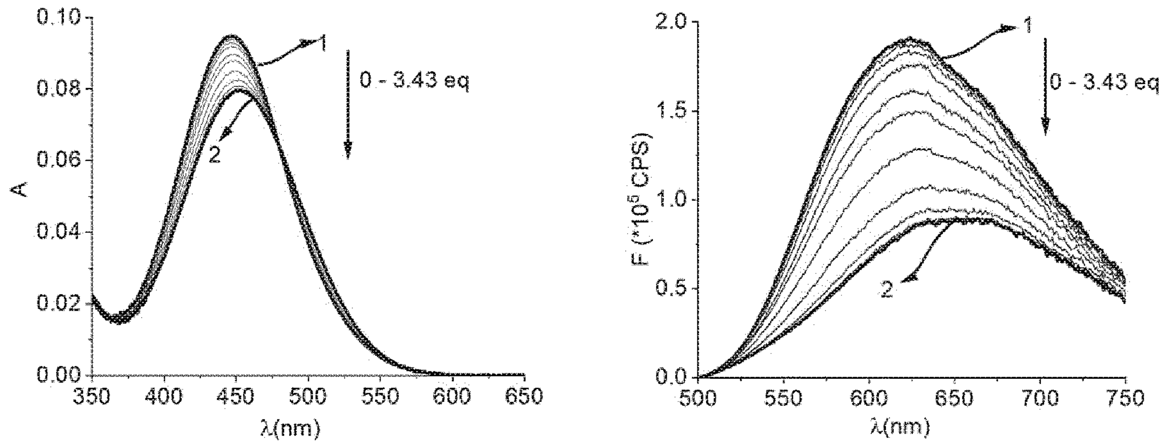
FIG. 30 illustrates absorption (left) and fluorescence (right) spectra following titration of deprotonated methylphosphonic acid (MPA TBA). As mentioned before, MPA is a metabolite of glyphosate, which was used as a dummy template in the non-imprinted polymer (NIP), with fluorescent probe IV in chloroform.

FIG. 30 shows spectral changes of the fluorescent probe IV after titration with increasing amount of MPA TBA, which was used as a dummy template in NIP preparation. In particular, FIG. 30 shows spectral changes (left: absorbance, right: fluorescence; $\lambda_{excitation}$=474 nm) in fluorescent probe IV after titration with increasing amount of MPA TBA. The spectrum which is marked "1" is of the fluorescent probe IV alone, while the spectrum which is marked "2" shows the response of the monomer after addition of 3.4 equivalents of MPA TBA. A 5-nm and 30-nm red shift in the absorption and fluorescence spectra respectively, coupled with decreased absorption and fluorescence intensities indicates hydrogen bond formation between fluorescent probe IV and MPA TBA. Log $K_b$=5.5 (determined using BindFit® software).

Figure 31:
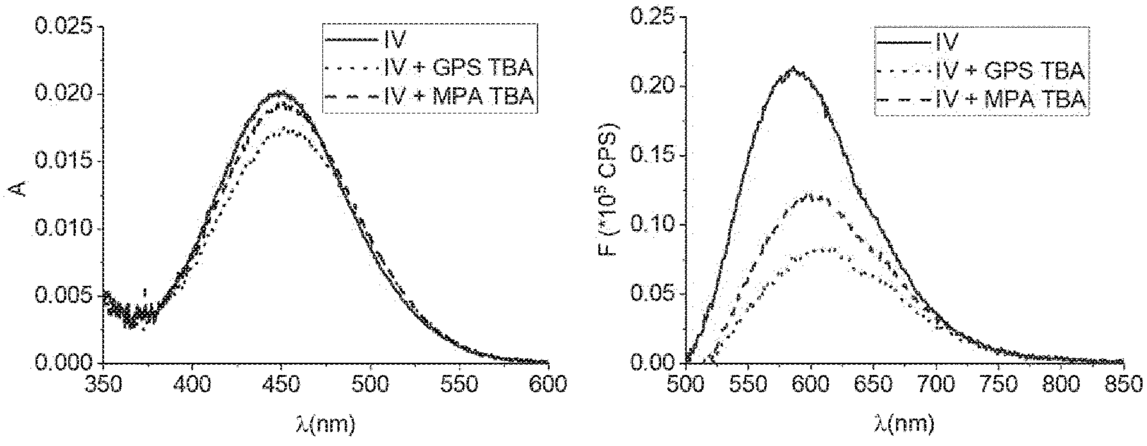
FIG. 31 illustrates absorption (left) and fluorescence (right) spectra of the prepolymerization mixture before synthesis of MIPIV@$SiO_2$ (with GPS TBA) and NIPIV@$SiO_2$ (MPA TBA) in chloroform.

FIG. 31 illustrates spectra of the prepolymerization mixture (left: absorbance, right: fluorescence; $\lambda_{excitation}$=474 nm) containing fluorescent probe IV and other non-fluorescent monomers before and after addition of GPS TBA/MPA TBA templates.

Figure 32:
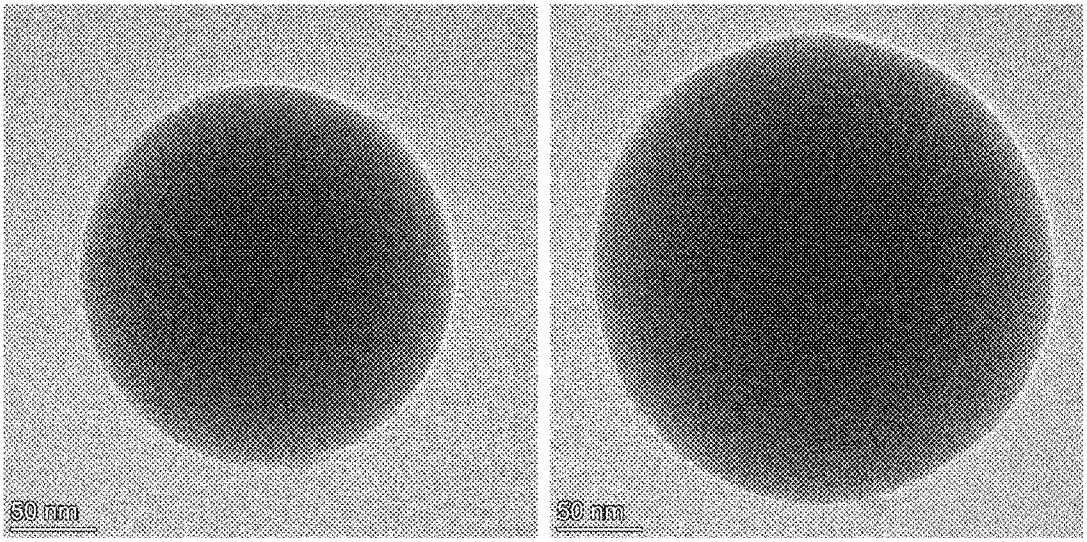
FIG. 32 shows two TEM images of MIPIV@$SiO_2$ (imprinted with GPS TBA, left) and NIPIV@$SiO_2$ (imprinted with dummy template MPA TBA, right).

FIG. 32 shows two representative TEM images of MIPIV@$SiO_2$ (imprinted with GPS TBA) and NIPIV@$SiO_2$ (imprinted with dummy template MPA TBA) particles comprising a fluorescent polymer layer.

Figure 33:
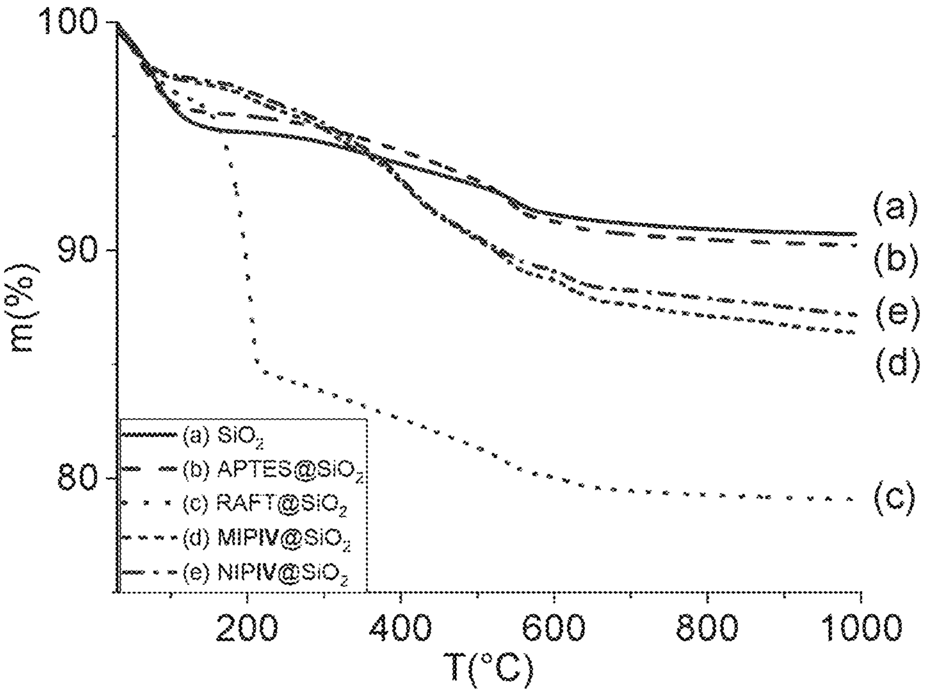
FIG. 33 shows the thermal gravimetric analysis data of silica nanoparticles, APTES@$SiO_2$, RAFT@$SiO_2$ as well as MIPIV@$SiO_2$ and NIPIV@$SiO_2$.

FIG. 33 shows mass loss of silica nanoparticles (a), APTES@$SiO_2$ (b), RAFT@$SiO_2$ (c) as well as MIPIV@$SiO_2$ (d) and NIPIV@$SiO_2$ (e) after treatment by thermal gravimetric analysis (TGA). The samples were heated progressively from 30° ° C.to 1000° C. and weight loss was monitored.

Figure 34:
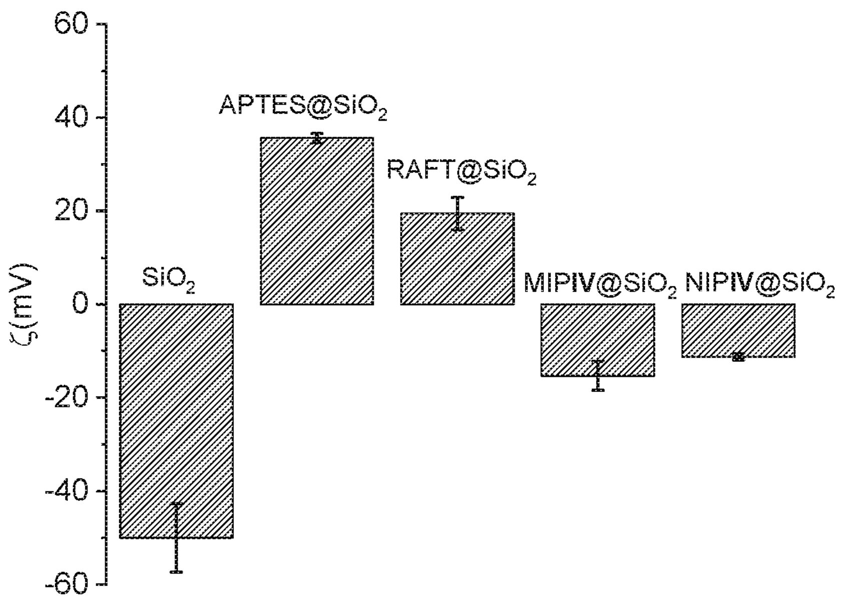
FIG. 34 shows the zeta potential values of silica nanoparticles, APTES@$SiO_2$, RAFT@$SiO_2$ as well as MIPIV@$SiO_2$ and NIPIV@$SiO_2$.

FIG. 34 shows the zeta potential values of 0.04 mg $mL^{-1}$ aqueous suspensions of silica nanoparticles, APTES@$SiO_2$, RAFT@$SiO_2$ as well as MIPIV@$SiO_2$ and NIPIV@$SiO_2$. The zeta potential changes with the different functionalization steps.

Figure 35:
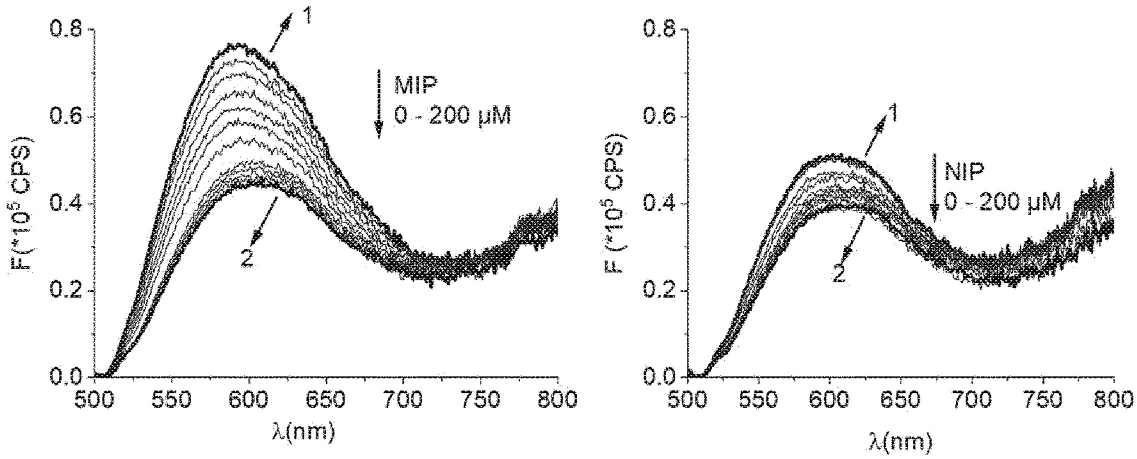
FIG. 35 illustrates a fluorescence titration of MIPIV@$SiO_2$ (imprinted with GPS TBA, left) and NIPIV@$SiO_2$ (imprinted with dummy template MPA TBA, right), upon addition of increasing amounts of GPS TBA in chloroform.

FIG. 35 illustrates the fluorescence response of 1 mg $mL^{-1}$ suspensions of MIPIV@$SiO_2$ (left) and NIPIV@$SiO_2$ (right) in chloroform after titration with up to 200 μM GPS THA. $\lambda_{excitation}$=474 nm. The MIP was imprinted with GPS TBA and the NIP with MPA TBA as dummy template. Spectrum marked "1" is of the MIP/NIP alone, while spectrum marked "2" is after addition of 200 μM GPS TBA. The figure shows a greater decrease of the MIP's fluorescence compared to the NIP upon addition of increasing amounts of GPS TBA to the solution.

Figure 36:
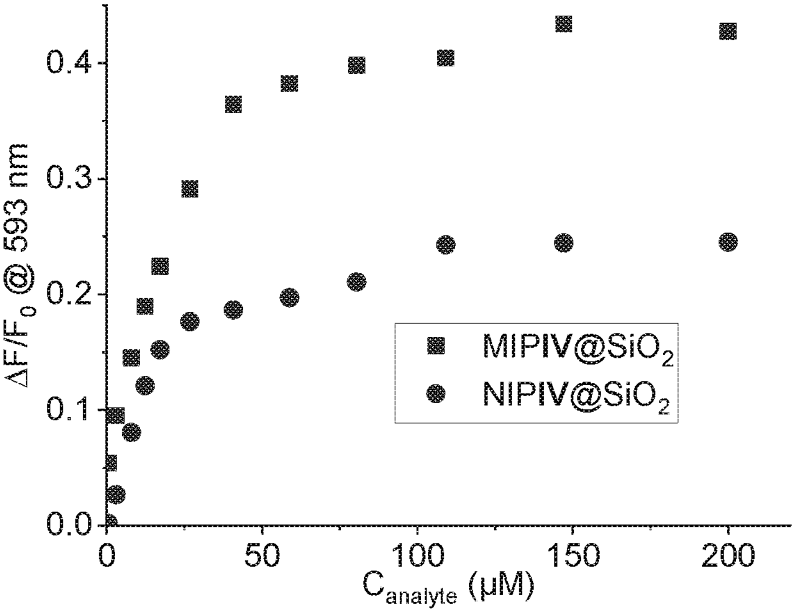
FIG. 36 shows a comparison of the fluorescence response of MIPIV@$SiO_2$ and NIPIV@$SiO_2$ after titration with GPS TBA in chloroform.

FIG. 36 shows a comparison of fluorescence response of MIPIV@$SiO_2$ and NIPIV@$SiO_2$ after titration with GPS TBA. $\Delta F/F_0=F_x-F_0$; $F_x$: fluorescence intensity at 593 nm for each step of GPS TBA addition; $F_0$: fluorescence intensity at 593 nm before addition of GPS TBA. The imprinting factor was calculated from the ratio of $\Delta F/F_0$ of MIP and NIP and was found to be 1.74.

Figure 37:
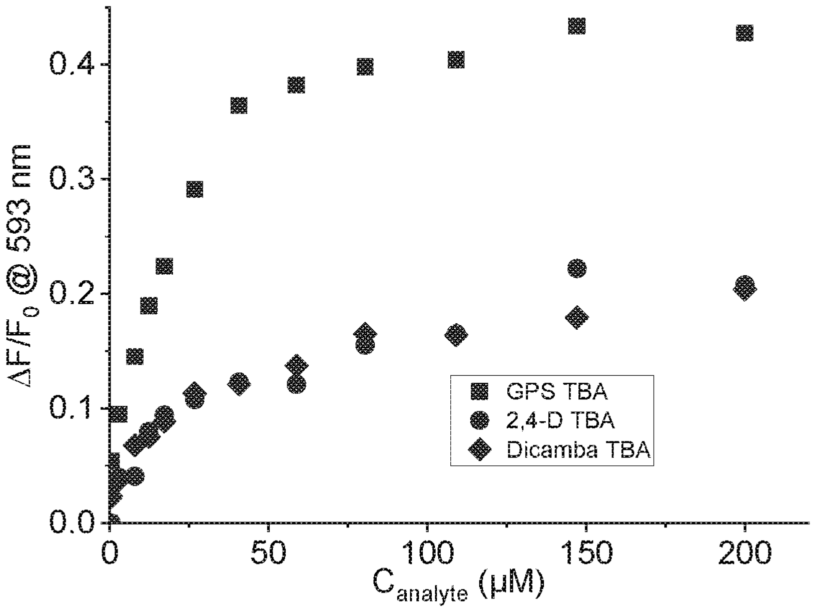
FIG. 37 shows a comparison of the fluorescence response of MIPIV@$SiO_2$ to GPS TBA and competing herbicides, deprotonated 2,4-dichlorophenoxyacetic acid (2,4-D TBA) and deprotonated dicamba (Dicamba TBA) after titration in chloroform.

FIG. 37 illustrates a comparison of fluorescence response of MIPIV@$SiO_2$ to GPS TBA and competing herbicides, deprotonated 2,4-dichlorophenoxyacetic acid (2,4-D TBA) and deprotonated dicamba (dicamba TBA). The discrimination factors were calculated from the ratio of $\Delta F/F_0$ of MIP against GPS TBA, 2,4-D TBA and dicamba TBA. The discrimination against 2,4-D TBA and dicamba TBA were found to be 2.06 and 2.10 respectively.

FIG. 38 shows the architecture of suggested polymerizable indicators I-IV as suggested for the preparation of glyphosate-specific MIPs which have been used with substrates as described above and below. The upper part of FIG. 38 uses colored formulae, the lower part of this FIG. shows identical formulae with letters indicating the corresponding colors used in the upper part. The polymerizable indicators always integrate at least three different functional units, the fluorophore (highlighted green or marked with letter F), a binding site (highlighted red or marked with letter R) and a polymerizable group (highlighted blue or marked with letter P). Of course, any other combinations are also possible, as long as at least one unit of every type is present. It is noted that without a binding site (highlighted red or marked with letter R) in the fluorescent monomer (I, III, and IV) and the fluorescent crosslinker (II), there is no response of the corresponding MIP to the glyphosate analyte.

The glyphosate analytes considered here, i.e. glyphosate (GPS), methylphosphonic acid (MPA), aminomethylphosphonic acid (AMPA), 3-methylphosphinicopropionic acid (MPPA), butylphosphonic acid (BPA), N-methylglyphosate (MGPS); N-(phosphonomethyl) iminodiacetic acid (PMIDA), hydroxymethyl phosphonic acid (HMPA) and bis-(phosphonomethyl)amine (BPMA) naturally comprise structural similarities. However, the GPS molecule is in fact always charged and is amphoteric due to its four different $pK_a$ values, whereas the other glyphosate analytes, like other pesticides, e.g. 2,4-D, comprise typically less dissociable groups and therefore, can also be neutral in a sample. Particularly, properties as (i) higher polarity, (ii) potentially multiple charged groups, (iii) lack of an aromatic ring (i.e. no possibility to stabilize binding by pi-stacking in polar media) are different for GPS in comparison to, e.g., 2,4-D and similar herbicides.

The described embodiments have versatile application areas for the direct fluorescence detection of glyphosate analytes. Said direct fluorescence detection comprises the detection of the binding of the respective glyphosate analyte to the molecularly imprinted polymer by an immediately detectable specific fluorescence property of the molecularly imprinted polymer. Advantageously that allows, e.g., for dispensing with time consuming washing procedures and facilitates compact assay formats. With the aim to demonstrate the feasibility of suggested embodiments, some examples describing the used laboratory methods and materials are given below.

PRACTICAL EXAMPLES

Practical examples are given below for layer structures formed by silica particles used as solid substrate and molecularly imprinted polymers anchored thereon. It goes without saying that the described procedures can be adapted to planar substrates, such as, e.g., quartz glass, borosilicate glass, or any other silica coated material, e.g. a silica coated plastic or ceramic.

Example 1

Silica Core/Fluorescent MIP Shell Particles (MIPII@$SiO_2$)

Materials

All chemicals were used without further purification. All organic solvents used were purchased from Sigma Aldrich, aber, Merck and J. T. Baker and used without further purification unless otherwise indicated. Analytical grade glyphosate (GPS), 2-isocyanatoethyl methacrylate, 3-(methylphosphinico)propionic acid (MPPA), 10% tetrahexylammonium hydroxide methanol solution, tetraorthosilicate (TEOS), ammonia solution 32%, (3-aminopropyl)triethoxysilane (APTES), ethyleneglycol dimethacrylate (EGDMA) and methacrylamide (MAAm) were obtained from Sigma Aldrich/Merck. Triethylamine (TEA) was obtained from Applichem GmbH.

4-Cyano-4-(phenylcarbonothioylthio)pentanoic acid (CPDB) was purchased from aber GmbH and ethylchloroformate (ECF) from Fluka. Basic alumina was purchased from Acros Organics and 2,2'-Azobis(2,4-dimethylvaleronitril) (ABDV) initiator from Wako Chemicals GmbH. Methylphosphonic acid (MPA) was obtained from Alfa Aesar. Milli-Q water was from a Milli-Q ultrapure water purification system (Millipore Synthesis A10).

Synthesis of Silica Beads 65 mL ethanol (96%), 121 mL Millipore water and 14 mL ammonia solution (32%) were mixed together at 300 rpm in a 1 L Erlenmeyer flask. 18 mL TEOS was mixed with 182 mL EtOH (96%), and quickly added to the base solution. The mixture was stirred overnight at 300 rpm. The resulting particles were washed three times with ethanol (96%) by centrifugation and redispersion, then dried overnight under vacuum.

Modification of Silica with (3-Aminopropyl)triethoxysilane (APTES)

1 g of silica particles was weighed into a 2-necked round bottomed flask equipped with a magnetic stirrer and connected to a reflux condenser. The particles were dispersed in 50 mL anhydrous toluene and heated to 120° C. under argon. 4 mL of APTES was added and the reaction allowed to proceed for 16 hours. The particles were then washed three times with 96% ethanol. The particles (APTES@$SiO_2$) were dried overnight under vacuum at room temperature.

Modification of Silica with RAFT Agent, 4-Cyano-4-(phenylcarbonothioylthio)pentanoic Acid (CPDB)

800 mg APTES modified $SiO_2$ were weighed into a 20 mL vial equipped with a magnetic stirrer. Simultaneously, 428.9 mg CPDB, 146.6 µL ethylchloroformate and 213.0 µL triethyl amine were dissolved in 7 mL anhydrous tetrahydrofuran (THF) and mixed together in an acetone/liquid nitrogen bath at −70° C. for 40 mins. Afterwards, the cooled solution was added to the particles and left to react at room temperature for 24 h at 700 rpm. The particles were precipitated in hexane, washed twice with THF and once with acetone. Then, the RAFT@$SiO_2$ particles were dried overnight under vacuum.

Template Preparation

Glyphosate (GPS), methylphosphonic acid (MPA) and 3-(methylphosphinico)propionic acid (MPPA) were dissolved in 500 µL of water in a 2 mL Eppendorf tube with 10 min of sonication. To this, an equimolar amount of 10% tetrahexylammonium (THA) in methanol was added. The mixtures were sonicated for another 10 min, then placed in a vacuum concentrator and dried under vacuum overnight to give the corresponding deprotonated templates, named there GPS THA, MPA THA, and MPPA THA, respectively.

Synthesis of Fluorescent Crosslinker II

Under protective argon atmosphere 2,3-diaminophenazine (1.000 g, 4.28 mmol) and butylated hydroxytoluene (0.095 g, 0.43 mmol) were added into a 100 mL round-bottom flask, which was previously dried under vacuum with a heat gun. Dry THF (35 ml) was added via syringe resulting in an orange solution. Half of 2-isocyanatoethyl methacrylate (0.972 ml, 8.56 mmol) was added under stirring under argon and reaction was heated at 60° C. for 2 h. Second half of 2-isocyanatoethyl methacrylate (0.972 ml, 8.56 mmol) was added under stirring under argon and the reaction mixture was heated at 60° C. for another 20 h. The solution was cooled to room temperature and the solvent was evaporated under reduced pressure, then the reaction mixture was purified by silica gel column chromatography using dichloromethane/methanol (90:1→10:1 v/v) as eluent. A yellow solid was obtained with 11% yield. $^1H$ NMR (400 MHZ, DMSO-D6): δ=8.48 (s, 2H), 8.40 (s, 2H), 8.13 (ddd, J=12.7, 3.9, 1.3 Hz, 2H), 7.82 (ddd, J=12.8, 3.7, 1.0 Hz, 2H), 6.11 (dq, J=1.7, 0.9, 2H), 5.71 (dq, J=1.6, 1.6 Hz, 2H), 4.21 (t, J=5.6, 4H), 3.49 (dt, J=5.6, 5.6 Hz, 4H), 1.92 (dd, J=1.5, 1.0, 6H) ppm. $^{13}C$ NMR (400 MHZ, DMSO-D6): δ=166.6, 155.4, 142.1, 141.1, 136.4, 135.8, 129.5, 128.9, 126.0, 116.7, 63.8, 38.5, 18.0 ppm. UPLCMS-TOF (ESI-) m/z calcd for $[M-H]^-$ 519.1992, found 519.1913

Fluorescent crosslinker II

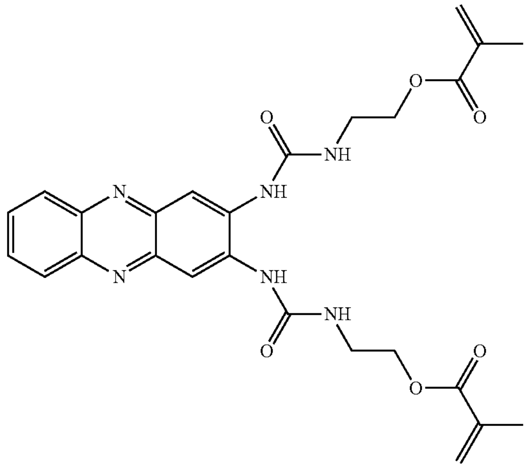

Synthesis of the Molecularly Imprinted Polymer Layer on Particle Cores

Inhibitor was removed from ethylene glycol dimethacrylate (EGDMA) before polymerization. 90.0 mg of RAFT@$SiO_2$ particles were weighed into 2 separate vials and 4.8 mL of a chloroform solution containing 75.7 µL EGDMA (83.6 mM), 1.4 mg fluorescent crosslinker II (0.5 mM) and 6.8 mg methacrylamide (MAAm) (16.7 mM) were added. 0.3 mL of 7.0 mM template solution (GPS THA) or dummy template (MPA THA) in chloroform was added to this and the particle suspension was sonicated for 5 min. Meanwhile, 3.6 mM ABDV initiator solution was prepared in chloroform and degassed with argon until usage. The particle suspensions were degassed 10 mins and then heated to 50° C. with stirring at 700 rpm. 2.7 mL of initiator solution was added to each vial and the reaction was allowed to proceed for 24 h, after which the temperature was increased to 70° C. for 2 h. The particles were precipitated with 7.5 mL acetonitrile, then washed three times with 10.0 mL acetonitrile to remove excess polymer. The particles were then washed three times with 5 mL methanol: acetic acid (99:1) for 1 h each time on a rotating plate at 40 rotations per minute. Finally, the MIPII@$SiO_2$ and NIPII@$SiO_2$ particles were washed three times with 10.0 mL acetonitrile and dried overnight in the vacuum oven.

Fluorescence Titrations 1 mg $mL^{-1}$ suspensions of the MIPII@$SiO_2$ and NIPII@$SiO_2$ particles were prepared in chloroform; a 1 mM solution of deprotonated glyphosate (GPS THA) or deprotonated 3-(methylphosphinico)propionic acid (MPPA THA)

in chloroform was also prepared. Increasing volumes of the 1 mM template solution were added to 2 mL suspensions of the MIPII@$SiO_2$ and NIPII@$SiO_2$ particles, and the resultant fluorescence spectra were recorded. For biphasic titrations, 1 mL Millipore water was added on top of the organic chloroform phase, and 1 mM template was prepared in Millipore water.

$$\frac{\Delta F}{F_0} = \frac{F_x - F_0}{F_0}$$

was calculated for each fluorescence spectrum of the MIPII@$SiO_2$ and NIPII@$SiO_2$ particles (where $F_x$ is the maximum fluorescence intensity for each spectrum after GPS THA addition, while $F_o$ is the maximum fluorescence intensity before addition of GPS THA). The imprinting factor was determined from the MIP:NIP ratio of $$\frac{\Delta F}{F_0}$$

at the saturation point of the titration. The discrimination factor was determined from the ratio of $$\frac{\Delta F}{F_0}$$

for MIPII@$SiO_2$ response to GPS THA and MPPA THA at the saturation point of the titration.

Example 2

Silica Core/Fluorescent MIP Shell Particles (MIPIII@$SiO_2$)

Materials

All chemicals were used without further purification. All organic solvents used were purchased from Sigma Aldrich, aber, Merck and J. T. Baker and used without further purification unless otherwise indicated. Analytical grade glyphosate (GPS), 2,4-dichlorophenoxyacetic acid (2,4-D), dicamba, atrazine, tetraorthosilicate (TEOS), ammonia solution 32%, (3-aminopropyl)triethoxysilane (APTES), and were obtained from Sigma Aldrich/Merck. Triethylamine (TEA) and sodium hydroxide were obtained from Applichem GmbH. 4-Cyano-4-(phenylcarbonothioylthio)pentanoic acid (CPDB) was purchased from aber GmbH and ethylchloroformate (ECF) from Fluka. Basic alumina was purchased from Acros Organics and 2,2'-azobis(2,4-dimethylvaleronitril) (ABDV) initiator from Wako Chemicals GmbH. Aminomethylphosphonic acid (AMPA) was obtained from Alfa Aesar. Milli-Q water was from a Milli-Q ultrapure water purification system (Millipore Synthesis A10). NMR spectra were recorded at a Varian Mercury 400 NMR spectrometer, ultra-high-performance liquid chromatography electro-spray ionization mass spectrometry (UPLC-ESIMS) was performed on a Waters Acquity UPLC (gradient mixtures of acetonitrile/$H_2O$) with a Waters LCT Premier XE mass detector.

Synthesis and Functionalization of Silica Core Particles

Synthesis and functionalization of silica core particles with APTES and RAFT groups was performed as detailed in example 1.

Synthesis of Fluorescent Monomer III

Synthesis of 2-((7-nitrobenzo[c][1,2,5]oxadiazol-4-yl)amino)ethyl methacrylate according to formula (1):

(1)

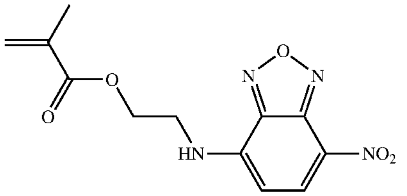

4-Chloro-7-nitro-2,1,3-benzoxadiazole (19.84 mmol, 4.00 g) was dissolved in acetonitrile (200 mL). Then, 2-aminoethyl methacrylate chloride (19.84 mmol, 3.65 g) was suspended in the reaction mixture by means of ultrasonication. Afterwards, triethylamine (39.69 mmol, 5.53 mL) was dropwise added and the reaction mixture was stirred overnight at room temperature. The reaction mixture was concentrated and purified by silica column chromatography with $CH_2Cl_2$ as the mobile phase to give compound (1) as a yellow solid (2.14 g, 37%). $^1$H-NMR (400 MHZ, $CDCl_3$): δ(ppm)=8.48 (d, 1H), 6.63 (bs, 1H), 6.26 (m, 1H), 6.15 (m, 1H), 5.64 (m, 1H), 4.54 (t, 2H), 3.84 (q, 2H), 1.95 (s, 3H). $^{13}$C-NMR (100 MHz, $CDCl_3$): δ(ppm)=183.10, 167.53, 144.27, 143.51, 136.05, 135.43, 127.04, 98.93, 61.97, 43.26, 29.66, 18.23. HRMS (ESI-): m/z calculated for $C_{12}H_{12}N_4O_5$ ([M−H])$^-$291.0729, found ([M−H])$^-$291.0744. UPLC: tR=3.99 min (100% peak area).

Synthesis of 2-(methyl(7-nitrobenzo[c][1,2,5]oxadiazol-4-yl)amino)ethyl methacrylate according to formula (2):

(2)

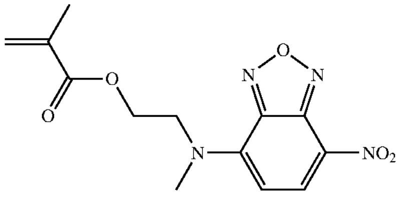

Compound (1) (3.42 mmol, 1.00 g) as obtained according to described above was dissolved in N,N-dimethylformamide (5 mL), followed by the addition of $K_2CO_3$ (5.13 mmol, 0.71 g). Afterwards, iodomethane (7.18 mmol, 0.45 mL) was added dropwise and the reaction mixture was stirred for 4 h at room temperature. Subsequently, the reaction mixture was diluted with 200 mL of EtOAc and the organic phase was extracted with 200 mL of deionized water (3×) and one time with 200 mL of brine. The organic phase was collected and dried over magnesium sulfate and concentrated under vacuum to give compound (2) as a red solid (1.03 g, 98%). $^1$H-NMR (400 MHZ, $CDCl_3$): δ(ppm)=8.46 (d, 1H), 6.18 (d, 1H), 5.92 (m, 1H), 5.52 (t, 1H), 4.525 (m, 4H), 3.48 (s, 3H), 1.82 (s, 3H). 13C-NMR (100 MHZ, $CDCl_3$): δ(ppm)=166.82, 145.28, 144.61, 144.52, 135.49, 135.09, 126.39, 101.76, 61.99, 54.19, 42.04, 18.23. HRMS (ESI+): m/z calculated for $C_{13}H_{14}N_4O_5$ ([M+H])$^+$307.1042, found ([M+H])$^+$307.1077. UPLC: R=3.06 min (100% peak area).

Synthesis of 2-((7-aminobenzo[c][1,2,5]oxadiazol-4-yl)(methyl)amino)ethyl methacrylate according to formula (3):

(3)

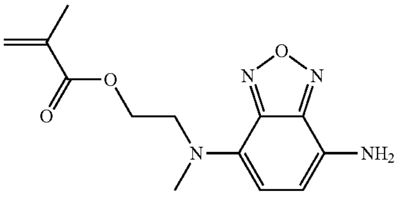

Compound (2) (1.63 mmol, 0.50 g) as obtained according to described above was suspended in 15 mL of acetic acid. Afterwards, powdered Fe (29.34 mmol, 1.64 g) was added and the reaction mixture was stirred for 1 h at room temperature. The reaction mixture was diluted with 100 mL of EtOAc and the organic phase was extracted with 100 mL of saturated $NaHCO_3$ (3×) and one time with 100 mL of brine. The organic phase was collected and dried over magnesium sulfate and concentrated under vacuum. The reaction mixture was then purified by silica column chromatography with EtOAc as the mobile phase to give compound (3) as a red solid (0.38 g, 85%). $^1$H-NMR (400 MHz, $CDCl_3$): δ(ppm)=6.31 (d, 1H), 6.09 (d, 1H), 5.87 (m, 1H), 5.45 (t, 1H), 4.35 (t, 2H), 4.07 (t, 2H), 3.99 (bs, 2H), 3.05 (s, 3H), 1.79 (s, 3H). $^{13}$C-NMR (100 MHz, $CDCl_3$): δ(ppm)=167.14, 145.94, 145.80, 135.96, 130.88, 125.54, 110.12, 109.76, 62.49, 52.56, 39.58, 18.09. HRMS (ESI+): m/z calculated for $C_{13}H_{16}N_4O_3$ ($[M+H])^+$277.1303, found $([M+H])^+$277.1349. UPLC: tR=2.19 min (100% peak area).

Synthesis of 2-((7-(3-benzoylureido)benzo[c][1,2,5]oxadiazol-4-yl)(methyl)amino)ethyl methacrylate according to formula (4):

(4)

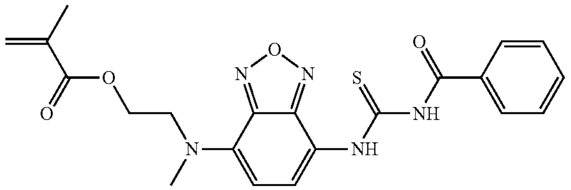

Compound (3) (0.50 g, 1.81 mmol) was dissolved in 5.0 mL of acetone. Benzoyl isothiocyanate (0.18 mL, 1.81 mmol) was added and a precipitate formed after 5 min. The precipitate was filtered, and compound (4) was obtained as a red solid (0.72 g, 90%). $^1$H-NMR (400 MHZ, $CDCl_3$): δ(ppm)=8.53 (d, 1H), 7.95 (d, 2H), 7.67 (t, 1H), 7.56 (t, 2H), 6.15 (d, 1H), 5.88 (s, 1H), 5.47 (s, 1H), 4.43 (t, 2H), 4.31 (t, 2H), 3.24 (s, 3H), 1.88 (s, 3H). $^{13}$C-NMR (100 MHz, $CDCl_3$): δ(ppm)=176.68, 167.05, 166.88, 146.88, 144.97, 136.72, 135.79, 133.76, 131.46, 129.19, 127.56, 125.88, 125.19, 113.96, 104.64, 62.58, 52.84, 40.07, 18.13. HRMS (ESI+): m/z calculated for $C_{21}H_{22}N_5O_4S$ $([M+H])^+$ 440.1392, found $([M+H])^+$440.1441. UPLC: tR=4.41 min (100% peak area).

Synthesis of 2-((7-(3-benzoylguanidino)benzo[c][1,2,5]oxadiazol-4-yl)(methyl)amino)ethyl methacrylate, III:

III

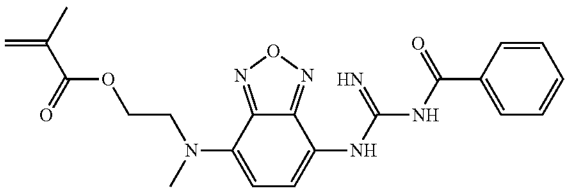

Compound (4) (0.91 mmol, 0.40 g) and N-(3-dimethylaminopropyl)-N'-ethylcarbodiimide hydrochloride (4.55 mmol, 0.89 g) were dissolved in a mixture of dry acetonitrile (15 mL) and $CH_2Cl_2$ (6 mL). Afterwards, hexamethyldisilazane (9.10 mmol, 2.12 mL) was dropwise added at 0° C. and the reaction mixture was stirred overnight at room temperature. The solution was diluted with 100 mL of EtOAc and the organic phase was extracted with 100 mL of deionized water (3×). The organic phase was collected and dried over magnesium sulfate and concentrated under vacuum. The reaction mixture was then purified by silica column chromatography with a mixture of $CH_2Cl_2$: EtOAc (9:1) as the mobile phase to give compound III as a red solid (0.34 g, 88%). $^1$H-NMR (400 MHZ, $CDCl_3$): δ(ppm)=8.07 (d, 2H), 7.51 (t, 1H), 7.43 (t, 2H), 7.09 (d, 1H), 6.10 (d, 1H), 5.89 (s, 1H), 5.47 (m, 1H), 4.42 (t, 2H), 4.29 (t, 2H), 3.12 (s, 3H), 1.81 (s, 3H). $^{13}$C-NMR (100 MHz, $CDCl_3$): δ(ppm)=174.74, 167.05, 156.55, 147.82, 145.60, 136.29, 136.16, 135.87, 131.79, 128.33, 128.20, 126.54, 125.80, 115.94, 105.43, 62.67, 52.79, 40.13, 18.12. HRMS (ESI+): m/z calculated for $C_{21}H_{23}N_6O_4$ $([M+H])^+$422.1703, found $([M+H])^+$423.1843. UPLC: tR=1.38 min (100% peak area).

Synthesis of the Molecularly Imprinted Polymer Layer on Particle Cores

Inhibitor was removed from EGDMA before polymerization. 30 mg of RAFT@$SiO_2$ were weighed out in two separate vials. To each vial, 0.29 mg fluorescent probe III (0.67 μmol), 1.72 mg MAAm (20.3 μmol) and 19.12 μL EGDMA (20.1 mg, 101.4 μmol) were added in 3 mL anhydrous acetonitrile. To one vial, 0.23 mg GPS (1.35 μmol) dissolved in 720 μL Millipore water was added, while 720 μL Millipore water was added to the other vial. The particle suspensions were sonicated 5 mins. Meanwhile, 3 mg ABDV (12.08 μmol) was dissolved in 800 μL acetonitrile, and 400 μL of this solution was added to each vial. Both suspensions were degassed with argon for 10 min under ice. The vials were put to heat to 50° C. and 700 rpm and the reaction continued for 24 h. The temperature was thereafter increased to 70° C. for 2 h. The particles were purified by centrifugation, followed by washing three times with 1.8 mL acetonitrile. The MIPIII@$SiO_2$ and NIPIII@$SiO_2$ particles were then washed once with 500 μL 17 mM NaOH and once with 500 μL Millipore water, and dried ON under vacuum.

Fluorescence Titrations 1 mg $mL^{h-1}$ suspensions of the MIPIII@$SiO_2$ and NIPIII@$SiO_2$ particles were prepared in acetonitrile; 10 mM solutions of GPS, AMPA and dicamba in Millipore water were prepared, as well as 10 mM solutions of 2,4-D and atrazine in acetonitrile. Increasing volumes of the 10 mM template solution were added to 2 mL suspensions of the MIPMI@$SiO_2$ and NIPMI@$SiO_2$particles, and the resultant fluorescence spectra were recorded.

$$\frac{\Delta F}{F_0} = \frac{F_X - F_0}{F_0}$$

was calculated for each fluorescence spectrum of the MIPIII@$SiO_2$ and NIPIII@$SiO_2$ (where $F_x$ is the maximum fluorescence intensity for each spectrum after GPS addition, while $F_o$ is the maximum fluorescence intensity before addition of GPS). The imprinting factor was determined from the MIP:NIP ratio of $$\frac{\Delta F}{F_0}$$

at the saturation point of the titration. The discrimination factor was determined from the ratio of $$\frac{\Delta F}{F_0}$$

for MIPIII@$SiO_2$ response to GPS and AMPA, dicamba, 2,4-D or atrazine at the saturation point of the titration.

Example 3

Silica Core/Fluorescent MIP Shell Particles (MIPIV@$SiO_2$)

Materials

All chemicals were used without further purification. All organic solvents used were purchased from Sigma Aldrich, aber, Merck and J. T. Baker and used without further purification unless otherwise indicated. Analytical grade glyphosate (GPS), 2,4-dichlorophenoxyacetic acid (2,4-D), dicamba, 1M tetrabutylammonium hydroxide methanol solution, tetraorthosilicate (TEOS), ammonia solution 32%, (3-aminopropyl)triethoxysilane (APTES), methacrylamide (MAAm) and ethylene glycol dimethacrylate (EGDMA) were obtained from Sigma Aldrich/Merck. Triethylamine (TEA) was obtained from Applichem GmbH. 4-cyano-4-(phenylcarbonothioylthio)pentanoic acid (CPDB) was purchased from aber GmbH and ethylchloroformate (ECF) from Fluka. Basic alumina was purchased from Acros Organics and 2,2'-azobis(2,4-dimethylvaleronitril) (ABDV) initiator from Wako Chemicals GmbH. Methylphosphonic acid was obtained from Alfa Aesar. Milli-Q water was from a Milli-Q ultrapure water purification system (Millipore Synthesis A10).

Synthesis and Functionalization of Silica Core Particles

Synthesis and functionalization of silica core particles with APTES and RAFT groups was performed as detailed in example 1.

Template Preparation

Glyphosate (GPS) or methylphosphonic acid (MPA) were dissolved in 500 μL of water in a 2 mL Eppendorf tube with 10 min of sonication. 2,4-D or dicamba were dissolved in 500 μL acetonitrile in a 2 mL Eppendorf tube with 10 min of sonication. To the solutions, an equimolar amount of 1 M tetrabutylammonium hydroxide solution in methanol was added. The mixtures were sonicated for another 10 min, then placed in a vacuum concentrator and dried under vacuum overnight to give the corresponding deprotonated templates, named there GPS TBA, MPA TBA, 2,4-D TBA and dicamba TBA, respectively.

Synthesis of Fluorescent Monomer IV

Synthesis of benzamido((7-((2-(methacrycrykoyloxy) ethyl)(methyl)amino)benzo[c][1,2,5]oxadiazol-4-yl)a mino) methaniminium chloride, IV:

IV

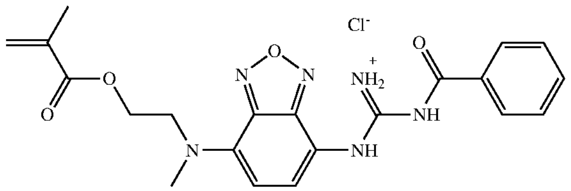

Compound III (0.12 mmol, 0.05 g) was suspended in hydrochloric acid (1M, 15 mL) by means of ultrasonication. The reaction mixture was stirred overnight at room temperature followed by dilution with 10 mL of distilled water. The aqueous phase was then extracted with 20 mL of $CH_2Cl_2$ (×3). The organic phase was collected and dried over $Na_2SO_4$ and concentrated under vacuum to give compound IV as a yellow solid (0.046, 84%). $^1$H-NMR (400 MHZ, $CDCl_3$): δ(ppm)=8.415 (d, 2H), 7.68 (t, 1H), 7.58 (t, 2H), 7.44 (d, 1H), 6.13 (d, 1H), 5.93 (s, 1H), 5.51 (m, 1H), 4.45 (t, 2H), 4.34 (t, 2H), 3.29 (s, 3H), 1.83 (s, 3H). $^{13}$C-NMR (100 MHz, $CDCl_3$): δ(ppm)=169.71, 167.03, 155.34, 146.90, 145.41, 139.14, 135.77, 134.43, 131.79, 130.47, 120.08, 128.56, 127.30, 106.27, 103.84, 62.69, 53.29, 40.70, 18.14. HRMS (ESI-): m/z calculated for $C_{12}H_{12}N_4O_5$ ($[M-H]^-$458.1469, found ($[M-H]^-$457.1371. UPLC: tR=2.13 min (100% peak area).

Synthesis of the Molecularly Imprinted Polymer Layer on Particle Cores

Inhibitor was removed from EGDMA before polymerization. 0.8 mg IV (17.2 μmol) and 4.4 mg MAAm (51.7 μmol) were dissolved in 5 mL chloroform. 48.9 μL EGDMA (259.5 μmol) were added to this and the mixture sonicated for 5 min. 2 mL each of this solution was added to separate 4 mL brown glass vials containing 30 mg of RAFT@$SiO_2$ particles. 0.3 mg GPS TBA (6.9 μmol) and 0.2 mg MPA TBA (6.9 μmol) (to serve as dummy template for the NIP) were separately dissolved in 100 μL chloroform. These template solutions were added to separate vials containing the particles and prepolymerization mixture and the mixtures were sonicated for 5 mins. 3 mg ABDV (12.08 μmol) was dissolved in 1.8 mL chloroform and 0.9 mL ABDV solution was added to each vial. Thereafter, the suspensions were degassed for 10 mins under argon, then put to heat at 50° C. and 700 rpm for 24 h. The temperature was then increased to 70° C. for 2 h, after which the particles were precipitated with 3 mL acetonitrile. The MIPs and dummy NIPs were then washed three times with 2 mL of acetonitrile and centrifugation at 10000 rpm for 5 min, with 5 mins sonication between each wash. The MIPIV@$SiO_2$ and NIPIV@$SiO_2$ particles were then dried overnight under vacuum.

Fluorescence Titrations 1 mg $mL^{-1}$ suspensions of the MIPIV@$SiO_2$ and NIPIV@$SiO_2$ particles were prepared in chloroform; a 1 mM solution of deprotonated glyphosate (GPS TBA) in chloroform was also prepared. Increasing volumes of the 1 mM template solution were added to 2 mL suspensions of the MIPIV@$SiO_2$ and NIPIV@$SiO_2$ particles, and the resultant fluorescence spectra were recorded.

$$\frac{\Delta F}{F_0} = \frac{F_X - F_0}{F_0}$$

was calculated for each fluorescence spectrum of the MIPIV@$SiO_2$ and NIPIV@$SiO_2$ particles(where $F_x$ is the fluorescence intensity at 593 nm for each spectrum after GPS TBA addition, while $F_o$ is the fluorescence intensity at 593 nm before addition of GPS TBA). The imprinting factor was determined from the MIP:NIP ratio of $$\frac{\Delta F}{F_0}$$

at the saturation point of the titration. The discrimination factor was determined from the ratio of $$\frac{\Delta F}{F_0}$$

for MIPIV@$SiO_2$ response to GPS TBA and 2,4 D TBA or dicamba TBA at the saturation point of the titration.

Characterization

Dynamic Light Scattering Measurements

Dynamic light scattering measurements were performed with a Zetasizer Nano ZS (Malvern Instruments, Worcestershire, UK).

Transmission Electron Microscopy (TEM) Measurements

TEM measurements were carried out on a FEI Talos™ F200S 200kV transmission scanning electron microscope. Images were analyzed with Image J software (http://imagej.nih.gov/ij/).

Specific Surface Area Measurements

BET isotherm data was acquired by $N_2$ adsorption/desorption on an ASAP 2010 instrument (Micromeritics). The external surface area was calculated according to the t-plot method of de Boer using the Harkins and Jura correlation.

Thermogravimetric Analysis (TGA) Measurements

TGA measurements were performed with an instrument from Mettler Toledo (Gieβen, Germany).

Elemental Analysis

Elemental analysis measurements were performed on an ELTRA CS 800 Carbon/Sulfur Analyzer.

Spectroscopic Measurements

UV/Vis absorption spectra were recorded on an Analytik Jena Specord 210 Plus spectrophotometer. Fluorescence spectra were recorded on a Horiba Jobin-Yvon FluoroMax-4P spectrofluorometer. Standard 10 mm path length quartz cuvettes were used for dye and particle titrations, while circular 100 μm path length cuvettes were used to record prepolymerization spectra. Binding constants were determined using BindFit® software (available via http://www-.supramolecular.org; http://app.supramolecular.org/bindfit/).

Thus, a layer structure is suggested comprising a solid substrate having a surface, the surface carrying a layer comprising a molecularly imprinted polymer, wherein the molecularly imprinted polymer is adapted to bind a glyphosate analyte, wherein the glyphosate analyte is selected from glyphosate, a glyphosate degradation product, a metabolite of glyphosate or a metabolite of the degradation product of glyphosate, wherein a fluorescence characteristic of the molecularly imprinted polymer changes upon binding of the glyphosate analyte. Further, a method for detecting a glyphosate analyte in a sample is suggested, comprising: providing the layer structure comprising the molecularly imprinted polymer; providing a fluidic contact of the layer structure with the sample or an organic extract of the sample; measuring a fluorescence property of the layer structure; and estimating a concentration of glyphosate or of the glyphosate related analyte at least semi-quantitatively.

References

Duan G.-W., Zhang J., Xu Y.-M., Yin F. and Fu Y.-Z. (2016). The Preparation of $Fe_3O_4$/Molecular-Imprinted Nano-composite and the Application on the Recognition and Separation of Glyphosate. Inorganic and Nano-Metal Chemistry, 47:481-487

Gomez-Caballero A., Diaz-Diaz G., Bengoetxea O., Quintela A., Unceta N., Goicolea M. A. and Barrio R. J. (2016). Water compatible stir-bar devices imprinted with underivatized glyphosate for selective sample clean-up. Journal of Chromatography A, 1451:23-32

Hibbert D. B and Thordarson P. (2016). The death of the Job plot, transparency, open science and online tools, uncertainty estimation methods and other developments in supramolecular chemistry data analysis. Chemical Communications, 52:12792-12805

Huhn C. (2018). More and enhanced glyphosate analysis is needed. Analytical and Bioanalytical Chemistry, 410: 3041-3045

Lee H. U., Jung D. U., Lee J. H., Song Y. S., Park C. and Kim S. W. (2013). Detection of glyphosate by quantitative analysis of fluorescence and single DNA using DNA-labeled fluorescent magnetic core-shell nanoparticles. Sensors and Actuators B, 177:879-886

Li T., Zhou Y., Sun J. and Wu K. (2012). Ultrasensitive Detection of Glyphosate Using CdTe Quantum Dots in Sol-Gel-Derived Silica Spheres Coated with Calix[6] arene as Fluorescent Probes. American Journal of Analytical Chemistry, 3:12-18

Mazouz Z., Rahali S., Fourati N., Zerrouki C., Aloui N., Seydou M., Yaakoubi N., Chehimi M. M., Othmane A. and Kalfat R. (2017). Highly Selective Polypyrrole MIP-Based Gravimetric and Electrochemical Sensors for Picomolar Detection of Glyphosate. Sensors, 17:2586-2600

Okada E., Coggan T., Anumol T., Clarke B and Allinson G. (2019). A simple and rapid direct injection method for the determination of glyphosate and AMPA in environmental water samples. Analytical and Bioanalytical Chemistry, 411:715-724

Valle A. L., Mello F. C. C., Alves-Balvedi R. P., Rodrigues L. P. and Goulart L. R. (2019). Glyphosate detection: methods, needs and challenges. Environmental Chemistry Letters, 17:291-317

Wang, D., Lin B., Cao Y., Guo M., and Yu Y. (2016). A Highly Selective and Sensitive Fluorescence Detection Method of Glyphosate Based on an Immune Reaction Strategy of Carbon Dot Labeled Antibody and Antigen Magnetic Beads. Journal of Agricultural and Food Chemistry, 64:6042-6050

Abbreviations

ABDV=2,2'-azobis(2,4-dimethylvaleronitrile)
APTES=3-(aminopropyl)triethoxysilane
BHT=butylhydroxytoluene
CPDB=4-cyano-4-(phenylcarbonothioylthio)pentanoic acid
MIP=molecularly imprinted polymer
NIP=non imprinted polymer (for background signal control)
RAFT=reversible addition-fragmentation chain transfer
GPS=glyphosate
GPS THA=singly deprotonated glyphosate, THA salt
MPA THA=singly deprotonated methylphosphonic acid, THA salt
AMPA THA=singly deprotonated aminomethylphosphonic acid, THA salt
BPA THA=singly deprotonated butylphosphonic acid, THA salt
MPPA THA=singly deprotonated 3-(methylphosphinico) propionic acid, THA salt
GPS TBA=singly deprotonated glyphosate, TBA salt
MPA TBA=singly deprotonated methylphosphonic acid, TBA salt
2,4-D TBA=singly deprotonated 2,4-dichlorophenoxyacetic acid, TBA salt
Dicamba TBA=singly deprotonated dicamba, TBA salt
SEM=scanning electron microscopy
THA=tetrahexylammonium ion
TBA=tetrabutylammonium ion
TEM=transmission electron microscopy
TEOS=tetraethylorthosilicate
THF=tetrahydrofuran
II=fluorescent indicator, fluorescent crosslinker
I, III, IV=fluorescent indicator, fluorescent monomer In brief, a layer structure comprising a solid substrate having a surface, the surface carrying a layer comprising a molecularly imprinted polymer, wherein the molecularly imprinted polymer is adapted to bind glyphosate, a glyphosate degradation product, a metabolite of glyphosate or a metabolite of the degradation product of glyphosate is suggested, wherein a fluorescence characteristic of the molecularly imprinted polymer changes upon binding of the glyphosate analyte. Particularly, a fluorescent core/shell particle is suggested, comprising a molecularly imprinted polymer comprising the shell of said particle, wherein the molecularly imprinted polymer is adapted to bind to glyphosate due to an indicator, disposed within the molecularly imprinted polymer. Further, a method for detecting a glyphosate analyte selected from glyphosate (GPS), methylphosphonic acid (MPA), aminomethylphosphonic acid (AMPA), 3-methylphosphinicopropionic acid (MPPA), butylphosphonic acid (BPA), N-methylglyphosate (MGPS), N-(phosphonomethyl) iminodiacetic acid (PMIDA), hydroxymethyl phosphonic acid (HMPA) and bis-(phosphonomethyl)amine (BPMA) by using said layer structure is suggested. The indicator comprises a binding unit which is adapted to bind the glyphosate analyte and to change a fluorescence characteristic upon binding the glyphosate analyte.

The present invention has been explained with reference to various illustrative embodiments and examples. These embodiments and examples are not intended to restrict the scope of the invention, which is defined by the claims and their equivalents. As is apparent to one skilled in the art, the embodiments described herein can be implemented in various ways without departing from the scope of what is invented. Various features, aspects, and functions described in each of the embodiments can be combined with features, aspects, and functions as described in other embodiments.

The invention claimed is:

1. A layer structure comprising a solid substrate carrying a molecularly imprinted polymer comprising a fluorescent indicator, wherein the molecularly imprinted polymer is configured to bind a glyphosate analyte, the glyphosate analyte being selected from: glyphosate, a degradation product of glyphosate, a metabolite of glyphosate, or a metabolite of the degradation product;

wherein a fluorescence property of the molecularly imprinted polymer is configured to change upon binding of the glyphosate analyte, wherein the glyphosate analyte is selected from: Glyphosate (GPS); Methylphosphonic acid (MPA); Aminomethylphosphonic acid (AMPA), 3-Methylphosphinicopropionic acid (MPPA), Butylphosphonic acid (BPA), N-methylglyphosate (MGPS), N-(phosphonomethyl) iminodiacetic acid (PMIDA), hydroxymethyl phosphonic acid (HMPA), and bis-(phosphonomethyl) amine (BPMA); and wherein the molecularly imprinted polymer is an organic polymer comprising elements selected from the group consisting of: C, H, N, O, P, and S; and wherein the fluorescent indicator is configured as a monomer or a crosslinker in the molecularly imprinted polymer, and wherein the monomer or the crosslinker is configured to be at least covalently linked within a polymer network of the molecularly imprinted polymer during a synthesis of the polymer network, wherein the polymer network comprises the molecularly imprinted polymer and wherein the fluorescent entity of the fluorescent indicator is selected from: a Coumarin; a Dipyrromethene or a BODIPY; a Pyrromethane; a Benzofuran; a Pyridine; a Naphthalimide; a Benzoxazole; a Benzoxadiazole; a Benzindole; a Oxazine; a Phenazine; a Perylene; an Azulene; a Squaraine; a Pyrylium perchlorate, tetrafluoroborate or hexafluorophosphate; a Thiopyrylium perchlorate, tetrafluoroborate or hexafluorophosphate; a Ruthenium complex with any combination of three ligands (2,2'-bipyridine) or tri-(1,10-phenanthroline) or two ligands (2,2': 6',2"-terpyridine) and two counterions perchlorate, tetrafluoroborate or hexafluorophosphate; an Osmium complex with any combination of three ligands (2,2'-bipyridine) or tri-(1,10-phenanthroline) or two ligands (2,2': 6',2"-terpyridine) and two counterions perchlorate, tetrafluoroborate or hexafluorophosphate; a bis(2-(pyridin-2-yl) phenyl) iridium complex with any combination of a third ligand (2,2'-bipyridine) or tri-(1,10-phenanthroline) and a counterion perchlorate, tetrafluoroborate or hexafluorophosphate; or wherein the fluorescent indicator comprises a substance comprising a structure according to formula I, II, III or IV:

I

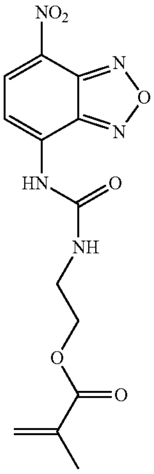

II

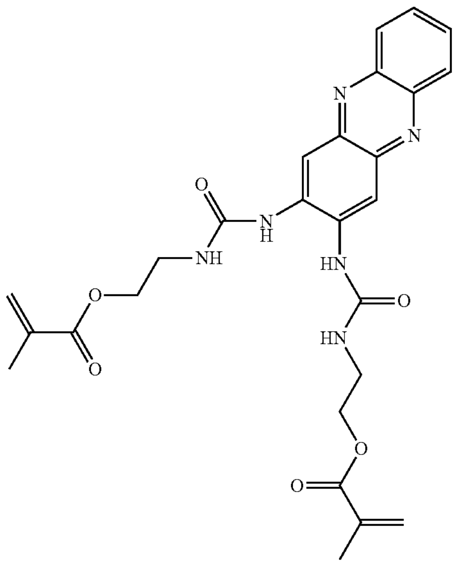

III

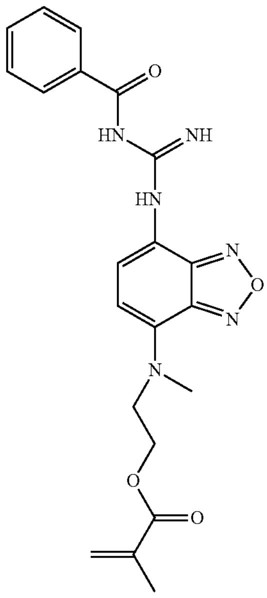

-continued

IV

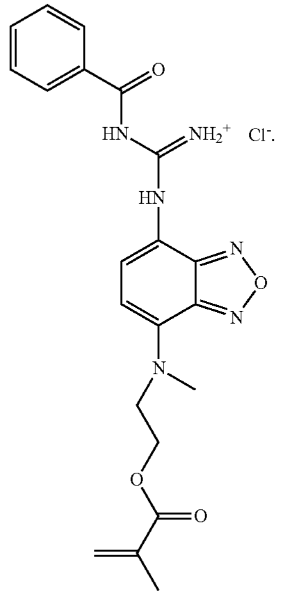

2. The layer structure according to claim 1, wherein the fluorescence is a characteristic of a fluorescent indicator comprising a fluorescent entity, wherein the fluorescent indicator is covalently linked to or within the molecularly imprinted polymer, or is sterically entrapped within the molecularly imprinted polymer.

3. The layer structure according to claim 1, the layer structure according to wherein the fluorescent indicator is configured to be linked with the polymer network during a synthesis of the polymer network, wherein the polymer network comprises the molecularly imprinted polymer, and the fluorescent indicator is selected from a substance comprising a structure according to formula I, III, and IV as indicated above; or is configured to serve as a crosslinker during the synthesis of the polymer network comprising the molecularly imprinted polymer, and the fluorescence indicator is selected from a substance comprising a structure according to formula II as indicated above.

4. The layer structure according to claim 1, wherein the molecularly imprinted polymer is obtainable by using: an acrylamide, a vinyl pyridine, a N-isopropylacrylamide, a 2-hydroxyethyl methacrylate, a methyl methacrylate, a benzyl methacrylate, a methacrylate, a methacrylamide, a N,N-dimethyl methacrylamide, a trifluoromethyl acrylate, a 2-aminoethyl methacrylate, a vinylalcohol, a vinylimidazole, a vinylphenyl boronic acid, an amino-substituted vinylphenyl boronic acid, a vinyl benzaldehyde, and/or a vinyl aniline;

and/or wherein the molecularly imprinted polymer is obtainable using a structural crosslinking agent selected from: ethylene dimethacrylate, ethylene glycol dimethacrylate, N,N'-methylenediacrylamide, divinylbenzene, tetramethylene dimethacrylate, poly(acrylic acid), a bis(-hydroxyethyl) sulfone, trimethylolpropane trimethacrylate, and pentaerythritol triacrylate.

5. The layer structure according to claim 1, wherein the solid substrate comprises a fluorescence, which is distinguishable from the fluorescence of the molecularly imprinted polymer by an excitation and/or by an emission wavelength or wavelength range.

6. The layer structure according to claim 1, wherein a thickness of the molecularly imprinted polymer layer is selected from 2 nm to 100 nm.

7. The layer structure according to claim 1, wherein the solid substrate is selected from a nanoparticle and a microparticle, the nanoparticle and the microparticle forming a core of the layer structure, and wherein the molecularly imprinted polymer is forming a single closed layer which covers the core.

8. The layer structure according to claim 6, wherein a median arithmetic diameter of the core/shell particle lies in a range selected from 20 nm to 10 μm.

9. The layer structure according to claim 7, wherein the core comprises a material selected from: a polymer, a silica, a carbon nanodot, a quantum dot, and/or a ferromagnetic material.

10. The layer structure according to claim 1, wherein the solid substrate comprises a planar or a curved surface of: a channel, a tube, a capillary, a recess, an open cavity, a slot, or a groove, and wherein at least a portion of the planar or curved surface is covered with the molecularly imprinted polymer.

11. The layer structure according to claim 10, wherein the solid substrate is optically transparent for a wavelength which relates to a fluorescence measurement of the molecularly imprinted polymer.

12. A method for detecting glyphosate or a glyphosate related analyte in a sample, the method comprising:

providing a layer structure according to claim 1;

providing a fluidic contact of the layer structure with the sample or an organic extract of the sample;

measuring a fluorescence property of the layer structure; and estimating a concentration of glyphosate or of the glyphosate related analyte in the sample at least semi-quantitatively wherein the glyphosate related analyte is selected from: methylphosphonic acid (MPA); aminomethylphosphonic acid (AMPA), 3-Methylphosphinicopropionic acid (MPPA), butylphosphonic acid (BPA), N-methylglyphosate (MGPS), N-(phosphonomethyl) iminodiacetic acid (PMIDA), hydroxymethyl phosphonic acid (HMPA), and bis-(phosphonomethyl)amine (BPMA).

13. The method according to claim 12, wherein different layer structures each encompassing a molecularly imprinted polymer layer comprising a specificity for different analytes are provided together;

the method further comprising:

measuring the fluorescence properties of the different layer structures; and estimating the concentration of the different analytes.

14. The method according to claim 13, wherein the different layer structures comprise different core/shell nano- and/or microparticles, different areas of a glass slide, different areas of a channel wall of a microfluidic system, or different walls or wells of a microtiter plate; or are fixed thereto.

15. The method according to claim 13, wherein the specificity is directed towards at least one of: glyphosate (GPS); methylphosphonic acid (MPA); aminomethylphosphonic acid (AMPA); 3-methylphosphinicopropionic acid (MPPA); butylphosphonic acid (BPA); N-methylglyphosate (MGPS); N-(phosphonomethyl) iminodiacetic acid (PMIDA); hydroxymethyl phosphonic acid (HMPA); and bis-(phosphonomethyl) amine (BPMA); and wherein the method comprises a multiplex assay.

16. A molecularly imprinted polymer comprising the layer structure of claim 1, and comprising a fluorescence property configured to change upon binding of a glyphosate analyte, wherein the fluorescence property is a characteristic of a fluorescent indicator comprising a fluorescent entity, wherein the fluorescent indicator is configured to be covalently linked to or within the molecularly imprinted polymer, or which is configured to be sterically entrapped within the molecularly imprinted polymer, and wherein the fluorescent indicator is configured to form a hydrogen bond with the glyphosate analyte.

17. The molecularly imprinted polymer according to claim 16, wherein the fluorescent indicator is a fluorescent monomer comprising a structure according to formula I, III or IV; or wherein the fluorescent indicator is a fluorescent crosslinker comprising a structure according to formula II:

I

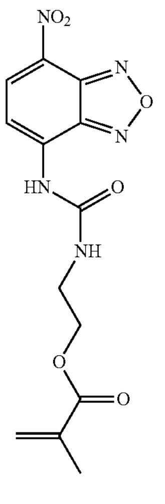

-continued
II
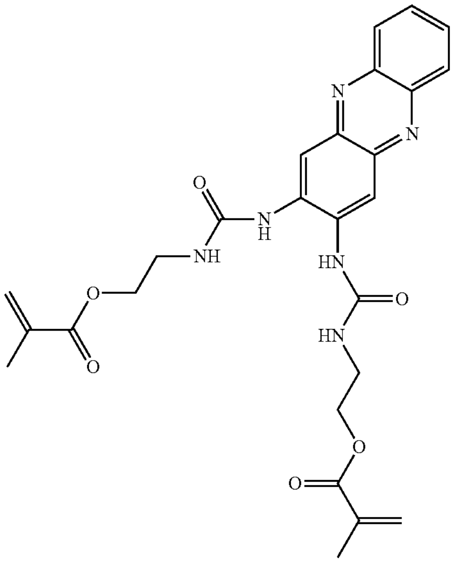
III
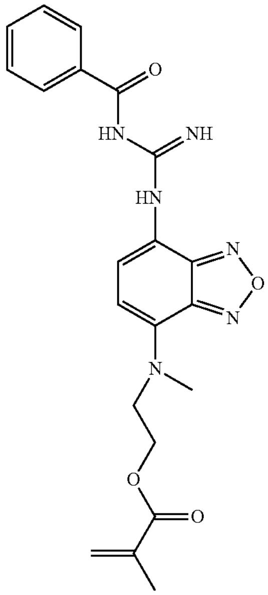
-continued
IV
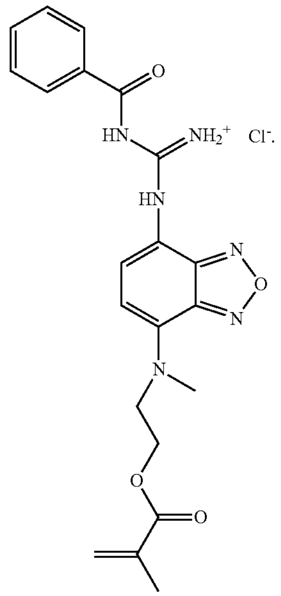
18. A sensor for detection of a glyphosate analyte, comprising a layer structure encompassing a molecularly imprinted polymer according to claim 1, wherein a fluorescence property of the molecularly imprinted polymer is configured to change upon a binding of a glyphosate analyte.
* * * * *